(12) United States Patent
Riess et al.

(10) Patent No.: US 6,639,198 B2
(45) Date of Patent: Oct. 28, 2003

(54) HAND HELD INDUCTION TOOL WITH ENERGY DELIVERY SCHEME

(75) Inventors: Edward A. Riess, Cincinnati, OH (US); Adam G. Malofsky, Symmes Township, Hamilton County, OH (US); John P. Barber, Kettering, OH (US); Gary L. Claypoole, West Chester, OH (US); Robert Carl Cravens, II, Beavercreek, OH (US)

(73) Assignee: Nexicor LLC, Cincinnati, OH (US)

( * ) Notice: Subject to any disclaimer, the term of this patent is extended or adjusted under 35 U.S.C. 154(b) by 0 days.

(21) Appl. No.: 10/302,157

(22) Filed: Nov. 22, 2002

(65) Prior Publication Data

US 2003/0075540 A1 Apr. 24, 2003

Related U.S. Application Data

(62) Division of application No. 09/705,282, filed on Nov. 2, 2000, now Pat. No. 6,509,555.
(60) Provisional application No. 60/163,301, filed on Nov. 3, 1999.

(51) Int. Cl.[7] ................................................. H05B 6/04
(52) U.S. Cl. ....................... 219/660; 219/250; 219/663
(58) Field of Search ................................ 219/618, 619, 219/633, 634, 635, 645, 660, 661, 663, 665, 666, 221, 227, 240, 243, 245, 250, 626, 662

(56) References Cited

U.S. PATENT DOCUMENTS

| | | |
|---|---|---|
| 1,566,500 A | 12/1925 | Northrup |
| 2,378,801 A | 6/1945 | Sidell et al. |
| 2,429,819 A | 10/1947 | Jordan |
| 2,549,930 A | 4/1951 | Riegel et al. |
| 3,272,954 A | 9/1966 | Seulen et al. |
| 3,466,528 A | 9/1969 | Adams |
| 3,562,054 A | 2/1971 | Wolf |

(List continued on next page.)

FOREIGN PATENT DOCUMENTS

AU    321432    3/1975

(List continued on next page.)

OTHER PUBLICATIONS

"Rapid Adhesive Bonding of Composites," NASA Tech Brief, 2 pages (Jan./Feb. 1986).
Stein, Bland A., et al., "Rapid Adhesive Bonding of Advanced Composites and Titanium," AIAA Paper No. 85–0750–CP, AIAA, ASME, ASCE AND AHS, 26th Structures, Structural Dynamics, and Materials Conference, Orlando, Florida, pp. 1–9 (Apr. 15–17, 1985).

(List continued on next page.)

Primary Examiner—Tu Ba Hoang
(74) Attorney, Agent, or Firm—Frederick H. Gribbell

(57) ABSTRACT

An apparatus and system for using magnetic fields to heat magnetically susceptible materials within and/or adjacent to adhesives, resins, or composites so as to reversibly or irreversibly bond, bind, or fasten opaque or non-opaque solid materials to one another. The system makes use of the effect that alternating magnetic fields induce eddy currents and generate heat within susceptors, and the effect that alternating magnetic fields additionally induce magnetic hysteresis that occurs in magnetic materials and thereby generate heat. An induction heating tool is used to emit the magnetic field at its work coil, and an electronic controller measures the energy being used by a power converter that generates the alternating current driving the work coil which creates the magnetic field. The distance between the susceptor and work coil is repeatedly analyzed based upon the power converter's input energy, and the work coil is driven at a repeatedly corrected power level during the heating cycle. Once a sufficient accumulated energy has been delivered to the susceptor, the magnetic field is turned off automatically by the tool, thus preventing overheating of the susceptor.

31 Claims, 26 Drawing Sheets

U.S. PATENT DOCUMENTS

| | | |
|---|---|---|
| 3,574,031 A | 4/1971 | Heller, Jr. et al. |
| 3,609,104 A | 9/1971 | Ehrreich et al. |
| 3,612,803 A | 10/1971 | Klass |
| 3,657,038 A | 4/1972 | Lightfoot |
| 3,671,371 A | 6/1972 | Wolf |
| 3,710,062 A | 1/1973 | Peters, Jr. |
| 3,733,231 A | 5/1973 | Rutkowski et al. |
| 3,737,611 A | 6/1973 | Killian |
| 3,743,808 A | 7/1973 | Kasper |
| 3,746,825 A | 7/1973 | Pfaffmann |
| 3,816,690 A | 6/1974 | Mittelmann |
| 3,823,362 A | 7/1974 | Bailey |
| 3,833,439 A | 9/1974 | Smith |
| 3,845,268 A | 10/1974 | Sindt |
| 3,846,204 A | 11/1974 | Gisler |
| 3,902,940 A | 9/1975 | Heller, Jr. et al. |
| 3,953,700 A | 4/1976 | Sindt |
| 3,953,783 A | 4/1976 | Peters, Jr. |
| 3,996,402 A | 12/1976 | Sindt |
| 4,017,701 A | 4/1977 | Mittelmann |
| 4,018,642 A | 4/1977 | Pike et al. |
| 4,029,837 A | 6/1977 | Leatherman |
| 4,038,120 A | 7/1977 | Russell |
| 4,112,286 A | 9/1978 | Alderman et al. |
| 4,120,712 A | 10/1978 | Sindt |
| 4,123,305 A | 10/1978 | Krzeszowski |
| 4,177,494 A | 12/1979 | Tellert |
| 4,234,824 A | 11/1980 | den Hollander |
| 4,268,737 A | 5/1981 | Paschakarnis et al. |
| 4,277,667 A | 7/1981 | Kiuchi |
| 4,280,038 A | 7/1981 | Havas et al. |
| 4,293,363 A | 10/1981 | Wakabayashi et al. |
| 4,327,268 A | 4/1982 | Frank |
| 4,355,222 A | 10/1982 | Geithman et al. |
| 4,382,275 A | 5/1983 | Glennon |
| 4,410,457 A | 10/1983 | Fujimura et al. |
| 4,420,876 A | 12/1983 | McDermott |
| 4,467,165 A | 8/1984 | Kiuchi et al. |
| 4,481,709 A | 11/1984 | McDermott |
| 4,483,896 A | 11/1984 | Gray et al. |
| 4,506,131 A | 3/1985 | Boehm et al. |
| 4,511,956 A | 4/1985 | Dewan et al. |
| 4,516,104 A | 5/1985 | McDermott |
| 4,521,659 A | 6/1985 | Buckley et al. |
| 4,528,057 A | 7/1985 | Challenger et al. |
| 4,543,555 A | 9/1985 | McDermott |
| 4,567,094 A | 1/1986 | Levin |
| 4,578,553 A | 3/1986 | Yamashita et al. |
| 4,581,158 A | 4/1986 | Lin |
| 4,602,139 A | 7/1986 | Hutton et al. |
| 4,637,199 A | 1/1987 | Steck et al. |
| 4,650,947 A | 3/1987 | Hutton et al. |
| 4,654,495 A | 3/1987 | Hutton et al. |
| 4,668,851 A | 5/1987 | Kupper |
| 4,677,535 A | 6/1987 | Kawabata et al. |
| 4,707,402 A | 11/1987 | Thorsrud |
| 4,749,833 A | 6/1988 | Novorsky et al. |
| 4,762,864 A | 8/1988 | Goel et al. |
| 4,763,093 A | 8/1988 | Cirkel et al. |
| 4,769,519 A | 9/1988 | Hall |
| 4,776,980 A | 10/1988 | Ruffini |
| 4,816,633 A | 3/1989 | Mucha et al. |
| 4,841,706 A | 6/1989 | Resan |
| 4,845,332 A | 7/1989 | Jancosek et al. |
| 4,847,746 A | 7/1989 | Rilly et al. |
| 4,853,832 A | 8/1989 | Stuart |
| 4,897,518 A | 1/1990 | Mucha et al. |
| 4,941,936 A | 7/1990 | Wilkinson et al. |
| 4,950,348 A | 8/1990 | Larsen |
| 4,969,968 A | 11/1990 | Leatherman |
| RE33,467 E | 12/1990 | Steck et al. |
| 4,978,825 A | 12/1990 | Schmidt et al. |
| 4,983,804 A | 1/1991 | Chan et al. |
| 5,025,123 A | 6/1991 | Pfaffmann et al. |
| 5,030,816 A | 7/1991 | Strecker |
| 5,031,088 A | 7/1991 | Tanaka |
| 5,057,370 A | 10/1991 | Krieg et al. |
| 5,075,034 A | 12/1991 | Wanthal |
| 5,093,545 A | 3/1992 | McGaffigan |
| 5,123,989 A | 6/1992 | Horiishi et al. |
| 5,124,203 A | 6/1992 | Leatherman |
| 5,128,504 A | 7/1992 | McGaffigan et al. |
| 5,134,000 A | 7/1992 | Smythe et al. |
| 5,134,261 A | 7/1992 | Larkin et al. |
| 5,170,025 A | 12/1992 | Perry |
| 5,198,053 A | 3/1993 | Duncan |
| 5,222,185 A | 6/1993 | McCord, Jr. |
| 5,225,287 A | 7/1993 | Perry et al. |
| 5,266,764 A | 11/1993 | Fox et al. |
| 5,272,216 A | 12/1993 | Clark, Jr. et al. |
| 5,286,941 A | 2/1994 | Bel |
| 5,286,952 A | 2/1994 | McMills et al. |
| 5,298,194 A | 3/1994 | Carter et al. |
| 5,313,034 A | 5/1994 | Grimm et al. |
| 5,313,037 A | 5/1994 | Hansen et al. |
| 5,317,045 A | 5/1994 | Clark, Jr. et al. |
| 5,328,539 A | 7/1994 | Sato |
| 5,340,428 A | 8/1994 | Kodokian |
| 5,343,023 A | 8/1994 | Geissler |
| 5,350,902 A | 9/1994 | Fox et al. |
| 5,374,808 A | 12/1994 | Coultrip et al. |
| 5,374,809 A | 12/1994 | Fox et al. |
| 5,376,403 A | 12/1994 | Capote et al. |
| 5,378,879 A | 1/1995 | Monovoukas |
| 5,391,595 A | 2/1995 | Clark, Jr. et al. |
| 5,438,181 A | 8/1995 | Volkmann et al. |
| 5,483,043 A | 1/1996 | Sturman, Jr. et al. |
| 5,490,759 A | 2/1996 | Hoffman |
| 5,500,511 A | 3/1996 | Hansen et al. |
| 5,504,309 A | 4/1996 | Geissler |
| 5,508,496 A | 4/1996 | Hansen et al. |
| 5,534,097 A | 7/1996 | Fasano et al. |
| 5,573,613 A | 11/1996 | Lunden |
| 5,639,847 A | 6/1997 | Chiang et al. |
| 5,705,796 A | 1/1998 | Hansen et al. |
| 5,710,413 A | 1/1998 | King et al. |
| 5,714,739 A * | 2/1998 | Irrera et al. .................. 219/626 |
| 5,717,191 A | 2/1998 | Christensen et al. |
| 5,723,849 A | 3/1998 | Matsen et al. |
| 5,773,799 A | 6/1998 | Maxfield et al. |
| 5,799,653 A | 9/1998 | Carlson |
| 5,830,389 A | 11/1998 | Capote et al. |
| 5,837,088 A | 11/1998 | Palmgren et al. |
| 5,874,713 A | 2/1999 | Cydzik et al. |
| 5,877,552 A | 3/1999 | Chiang |
| 5,916,469 A | 6/1999 | Scoles et al. |
| 5,919,387 A | 7/1999 | Buckley et al. |
| 5,925,455 A | 7/1999 | Bruzzone et al. |
| 5,932,057 A | 8/1999 | Remerowski et al. |
| 5,935,369 A | 8/1999 | Remerowski et al. |
| 6,043,471 A | 3/2000 | Wiseman et al. |
| 6,056,844 A | 5/2000 | Guiles et al. |
| RE36,787 E | 7/2000 | Hansen et al. |
| 6,083,558 A | 7/2000 | Bremont |
| 6,100,696 A | 8/2000 | Sinclair |
| 6,110,565 A | 8/2000 | Matthews |
| 6,137,093 A | 10/2000 | Johnson, Jr. |
| 6,229,127 B1 | 5/2001 | Link |
| 6,302,178 B1 | 10/2001 | Givens |

FOREIGN PATENT DOCUMENTS

| | | |
|---|---|---|
| CA | 1110961 | 10/1981 |
| CA | 1301396 | 5/1992 |
| DE | 1761776 | 4/1971 |
| DE | 3040820 A1 | 5/1982 |
| DE | 3710085 A1 | 10/1988 |
| DE | 3831787 | 4/1989 |
| DE | 4101215 A1 | 7/1992 |
| DE | 197 02 348 | 7/1998 |
| EP | 128837 | 12/1984 |
| EP | 0 237 657 | 9/1987 |
| EP | 0 289 632 | 11/1988 |
| EP | 0 461 979 A1 | 12/1991 |
| EP | 0 504 957 | 9/1992 |
| EP | 0 461 979 B1 | 4/1994 |
| EP | 1 136 878 | 9/2001 |
| FR | 842259 | 6/1939 |
| FR | 1558393 | 2/1969 |
| FR | 2 660 559 | 10/1991 |
| FR | 2 663 491 | 12/1991 |
| GB | 979283 | 1/1965 |
| GB | 2325982 A | 12/1988 |
| JP | 57073064 | 5/1982 |
| JP | 57082151 | 5/1982 |
| JP | 59176014 | 10/1984 |
| JP | 62126582 | 6/1987 |
| JP | 62155451 | 7/1987 |
| JP | 63120786 | 5/1988 |
| JP | 63273682 | 11/1988 |
| JP | 63308080 | 12/1988 |
| JP | 1200937 | 8/1989 |
| JP | 1203825 | 8/1989 |
| JP | 2124108 | 5/1990 |
| JP | 2167726 | 6/1990 |
| JP | 04223137 | 8/1992 |
| JP | 4261691 | 9/1992 |
| JP | 4261692 | 9/1992 |
| JP | 5315064 | 11/1993 |
| JP | 6111924 | 4/1994 |
| JP | 7137140 | 5/1995 |
| JP | 7179828 | 7/1995 |
| JP | 09309980 | 12/1997 |
| JP | 10083884 | 3/1998 |
| JP | 11278134 | 10/1999 |
| KR | 92-6673 | 8/1992 |
| NL | 6811765 | 2/1970 |
| WO | WO 93/10962 | 6/1993 |
| WO | WO 93/18247 | 9/1993 |
| WO | WO 97/34247 | 9/1997 |
| WO | WO 98/18877 | 5/1998 |
| WO | WO 99/60824 | 11/1999 |
| WO | WO 00/27941 | 5/2000 |
| WO | WO 01/29142 | 4/2001 |
| WO | WO 01/33909 A2 | 5/2001 |
| WO | WO 01/33909 A3 | 5/2001 |

OTHER PUBLICATIONS

Stein, Bland A., "Rapid Adhesive Bonding and Field Repair of Aerospace Materials," Welding, Bonding and Fastening, NASA Langely Research Center, pp. 419–438 (Oct. 1984).

Buckley, John D., et al., "Equipment and Techniques for Rapid Bonding of Composites," Advanced Composites, NASA Langely Research Center, pp. 155–162 (Dec. 1985).

Stein, Bland A., et al., "Rapid Adhesive Bonding Concepts for Specimen and Panel Fabrication and Field Repair," 16th National SAMPE Technical Conference, Albuquerque, New Mexico, pp. 103–118 (Oct. 1984).

Buckley, John D., et al., "Toroid Joining Gun," International Congress & Exposition, Detroit, Michigan, SAE Paper 850408, pp. 1–11 (Feb. 25–Mar. 1, 1985).

Stein, B. A., et al., "Rapid Adhesive Bonding Concepts," NASA Technical Memorandum 86256, pp. 1–72 (Jun. 1984).

"Owner's Manual," Miller Electric Manufacturing Company, pp. 1–29 (Apr. 1994).

Sales pamphlet, Fluxtrol Manufacturing, Inc., 2 pages.

"The Miller IHC Controller," Miller Electric Manfacturing Company, sales pamphlet, 3 pages.

"Induction Sealing Compak, Jr.," Enercon Industries Corporation, sales pamphlet, 2 pages (Feb. 20, 2001).

"Rhinobond," Olympic Fasteners, sales pamphlet, 2 pages.

"International Search Report," PCT/US01/13393, Nov. 21, 2001 (7 pages).

"International Preliminary Examination Report," PCT/US00/30517, Feb. 11, 2002 (18 pages).

"PCT International Search Report," European Patent Office, Application No. PCT/US00/30517, 11 pages (Jul. 27, 2001).

"Invitation to Pay Additional Fees with Annex", European Patent Office, Application No. PCT/US00/30517, 5 pages (Mar. 12, 2001).

* cited by examiner

HAND HELD INDUCTION TOOL WITH ENERGY DELIVERY SCHEME

RELATED U.S. APPLICATION DATA

This is a divisional application of Ser. No. 09/705,282, filed on Nov. 2, 2000, now U.S. Pat. No. 6,509,555.

This application claims the benefit of application No. 60/163,901 filed on Nov. 3, 1999.

TECHNICAL FIELD

The present invention relates generally to induction heating equipment and is particularly directed to a hand held induction tool of the type which produces a magnetic field in a predetermined direction. The invention is specifically disclosed as an induction heating tool that induces eddy currents in thin foil susceptors to raise the temperature of the susceptors to melt or soften an adhesive coating on the susceptor's surface, for bonding trim to wallboard.

BACKGROUND OF THE INVENTION

Historically, bonding materials quickly without use of mechanical fasteners has been quite difficult. Some of the problem areas which exist include: assembly time, cost of materials and labor, quality of the bond between component structures being assembled, reliability of the process of assembly, the typical requirement of fairly difficult finishing steps, convenience (or lack thereof) of use for the end-users, worker safety issues, and the difficulty in maintaining a good quality of appearance of the finished goods.

In the 1940's, mechanical fasteners dominated the assembly industry, and adhesives were not as important to industry during this period. From the 1930's through World War II, the United States and Germany began to develop plastics and adhesives technology in response to the growing scarcity of natural products. In many cases, particularly early on, adhesives have been used either in combination with mechanical fasteners or where no mechanical fastener could be effectively employed. Beginning in the 1950's, the modern adhesives industry began to develop. Some of today's more common adhesive systems, developed at that time, included heat-curable thermosets (epoxies), thermoplastic hot melts, pressure-sensitive adhesives (PSA's), contact cements, water-based wood glues, and the super glues (cyanoacrylates). These were major disruptive technologies that have evolved over the last 45 years and which have slowly grown the fastening market and have significantly replaced traditional mechanical fasteners in many markets.

Adhesive bonding is generally superior to mechanical fastening, but present technology doesn't allow for cost-effective pre-positioning and rapid development of a strong bond on demand with one step. Pre-positioning of components, prior to fastening, is very important, particularly in non-automated assembly systems. Millwork is an excellent example of such an assembly system. No current adhesive system allows for pre-positioning coupled with instantaneous bonding. Most of today's adhesives are slow to cure, requiring minutes to hours, thus requiring clamping and other direct personal attention by the installer.

It should be noted that the ideal adhesive system is one where the adhesive cures on demand, is reversible on demand, has unlimited shelf life, has no VOC's (volatile organic compounds), and is safe and easy to handle. Currently, the only such systems that exist are the light-curable systems, such as those employing UV (ultraviolet) and visible light. UV and visible light systems are unique in today's adhesives world. They are liquid systems that cure only upon exposure to light. Optically transparent parts can be bonded in seconds or less to virtually any substrate. Such systems, where useful, have virtually replaced all other adhesive or mechanical fastening systems. An example would be automotive headlamp assemblies that do not need to be disassembled. It should be noted that UV-curable adhesives involve chemical handling and are not currently reversible.

There are two basic types of adhesive systems: one group of systems allows for pre-positioning of the parts to be bonded, yet by default, requires long cure times; the other group of systems provides very short, almost instantaneous cure times, but yet prevents pre-positioning of the parts.

Before describing some of the major adhesive systems available, one should be aware of the following general application notes that affect adhesive utility.

(1) Many product assembly sites are often dirty and difficult to keep clean. Certain adhesive systems cannot handle such situations.

(2) Temperature fluctuations at many assembly sites could be extreme, whether for an interior or exterior application. For example, a new home being built in the middle of the winter could see interior temperatures below 0° F. Exterior applications could easily see temperatures even lower. Another typical example could involve automotive body repair, if done inside a non-heated building.

(3) Where humidity may be important, it is clear that the humidity around a manufacturing facility in Arizona would be far lower than that in and around a facility in Florida.

(4) The ability to directly heat many product components to cure adhesives is extremely limited, particularly as many plastic components can melt, and wood-based or cellulose-based millwork can burn.

One family of fast-curing adhesives is called "super glues" (cyanoacrylates). These adhesives allow for an extremely rapid adhesive setting, but cannot in any way be pre-positioned before placement as the adhesive cures during positioning. Thus, there is no room for error. These adhesives are generally the most expensive adhesives. Furthermore, they are difficult to handle, and have a limited shelf life. Finally, there is no way to easily reverse cyanoacrylate, or super glue, bonds. Companies in this industry include Loctite Corporation, Henkel A. G., and National Starch.

Another instant adhesive technology, not often employed in structural applications, is pressure-sensitive adhesive (PSA) tapes. Like super glues, such products allow for extremely rapid adhesive bonding, but again, are extremely limited with regard to pre-positioning and, as with the "superglues," again, there is no room for error. Furthermore, pressure-sensitive adhesives are limited in their ultimate strengths unless they are thermosetting. In the case of a thermosetting PSA, some form of heat- or moisture-activation is required which is generally impractical for non-heat-resistant products, or where humidity controls are unavailable.

The latter two above thermosetting processes are time intensive. Even more importantly, pressure sensitive adhesives can be applied only in very narrow temperature ranges, typically from 55° F. to 90° F. Furthermore, above 90° F., many common PSA's weaken dramatically. As a further note on PSA's, they are incapable of flow without heat to accommodate uneven surfaces, and if exposed to dust or other particulates, they immediately lose much of their potential adhesive strength. Finally, it is extremely difficult, if not impossible in most cases, to disassemble parts that use PSA's. Examples of companies that manufacture PSA's are 3M and Avery-Dennison, which are the two largest of the group. The cost of PSA's can range from being some of the most inexpensive to some of the most expensive adhesives available today.

Hot melt adhesives are another example of an instantaneous or fast-cure system that significantly limits the ability to pre-position parts. Such adhesives are melted either in a large tank or in a small glue gun and are then dispensed as a molten material onto the parts. The parts are then quickly mated, and the bond forms as the adhesive cools. The cooling process can be as short as a few seconds to possibly as long as ten or twenty seconds. As with the other instantaneous adhesives, there is little room for error, particularly where a clean and thin bond line is desired. Such limitations are the reasons that hot melt adhesives are used most extensively in the packaging industry and also for bonding small parts or surface areas. They are particularly useful in highly automated production systems, such as for sealing cereal boxes. Furthermore, such adhesives cannot be reheated after product assembly without significantly or entirely heating the product assembly.

On the positive side, hot melt adhesives are one-component, solid-state, zero VOC systems that have indefinite shelf life and, for the most part, are considered as plastics for regulatory and safety purposes. Furthermore, most hot melt adhesives are moderate to low in cost, especially when compared to the super glues or the light-curable adhesives. Examples of some leading hot melt manufacturers are Henkel A. G., Jowat, National Starch, H. B. Fuller, and Ato-Findley.

Other types of adhesive systems are those which are pre-positionable, but have long cure times. The most well known pre-positionable adhesives are the epoxies. Epoxy adhesives generally have slow cure times, usually on the order of minutes to hours, or even days. Most epoxies are two-part systems that, when mixed, become activated and cure. The catalysts are in one or both parts and their concentrations determine how quickly the epoxy adhesive will cure. In fact, if enough catalyst is added, epoxies can become instantaneous systems that are not pre-positionable. Epoxies are not difficult to handle, but do require special care as exposure can sometimes be detrimental to human health (causing skin irritations and burning).

Epoxies are among the strongest adhesives known, but require heat to achieve ultimate strength. A major problem with two-part epoxies is that cure time can vary dramatically with temperature. In fact, some systems cure so rapidly at temperatures above 90° F. that they become almost unusable. At colder temperatures, e.g., below 60° F., some systems may take days or more to cure. There also are one-component epoxies that cure only upon exposure to heat. Once heated, many one-component systems can cure in less than one minute. Epoxy bonds cannot be easily reversed. Examples of leading epoxy manufacturers include Ciba-Giegy, Shell Chemical, Henkel A. G., and Loctite.

Urethanes are another well-known, pre-positionable adhesive group. Like the epoxies, there are both two-part and one-part systems. After epoxies, urethanes are probably the second strongest class of commonly used adhesives. Two-part systems are the most common and generally take minutes to hours to cure. There are many one-part systems becoming available today which are moisture-curable (the moisture is actually a second part). Both systems have the problem that one component of the two, the isocyanate, is moisture-sensitive. If water gets into the adhesive, or if the humidity is too high, the isocyanate will react with the water, generate a gas, and cause foaming to occur. Even worse, if the moisture gets into a container unbeknownst to the user, and the container is then closed, the container can explode. As a result, two-component and moisture-cure urethanes are generally only used by skilled or specially trained personnel. Furthermore, because of their reactive nature and environmental susceptibility, most urethane adhesive systems require specialized mixing and dispensing equipment that must be cleaned on a frequent basis.

The primary advantage of most urethane adhesives is the availability of room temperature, moisture-curing, one-part systems that possess an overall lower application viscosity. This is as opposed to a two-part, room temperature epoxy that must be mixed, or a one-component hot melt that must be melted. Applications for urethane adhesives range from automotive assembly, to marine and aerospace assembly, to the millwork, furniture, and cabinetry industries.

It is important to note that certain adhesives have already been used with induction devices for many years. For example, such technologies are used for high strength bonds using relatively long cure-time (fifteen minutes to hours) adhesives. Furthermore, this technology generally employs high pressures to facilitate bond formation. This technology is used, for example, by Boeing, in the construction of composite-based passenger aircraft. The adhesive systems employed by Boeing are mainly epoxies. Such adhesives must be pre-positionable, and further must be cured over a long period of time because of the strict performance requirements mandated by the government for passenger and military aircraft.

Another company that employs similar technology is Emabond, a subsidiary of Ashland Chemical. Emabond develops the same types of long-time-cure adhesives (epoxies) as does Boeing, however, Emabond employs particulate susceptors which activate at higher frequencies that require operator shielding for safety. Emabond equipment is primarily geared toward automotive component assembly. A special piece of induction equipment is typically required for any two automotive components to be assembled.

Emabond employs a number of adhesive technologies, including epoxies, urethanes, and hot melt adhesives. Most of the adhesive systems used by Emabond are heat-activated by particulate susceptors, not foil susceptors, at higher frequencies that are known to be dangerous to human health (e.g., above 5 MHz). Moreover, the Emabond systems, primarily for the automotive industry, are part specific and are designed to bond generally irregular surfaces. The particulate susceptors allow for the use of liquid adhesives that can easily conform to these irregularities.

One method of bonding structures together utilizes susceptors made of an electrically conductive material that is heating by an alternating magnetic field to activate an adhesive material that resides on at least one surface of the susceptor. The magnetic field induces electrical currents, known as eddy currents, in the electrically conductive media. Exposure of such electrically conductive media to a magnetic field causes a temperature rise (heating) by what is termed the Joule effect. The Joule effect relates to heat generation due to the flow of electrons in a conductor. Distributions of these electrical currents and the heat they produce are not uniform in a conductive medium, such as a susceptor, exposed to an alternating magnetic field. The magnitude of heat, in Watts, is the sum of the heat contributions of all eddy current paths within the susceptor, each of which contributes heat that is equivalent to the product of its electrical resistance in Ohms and the square of its electron current in Amperes.

Within non-ferromagnetic susceptors, induced eddy currents have maximum intensities at the surfaces nearest the incident alternating magnetic field and have reduced intensities within the material, decreasing exponentially as a function of depth. This phenomenon is known as the skin effect, or the Kelvin effect, and the depth at which the eddy current falls to 37% is known as the depth of penetration. Most susceptors employed in the present application are comprised of a thin conductive sheet of uniform (or purposely non-uniform thickness) where, for the low frequencies usually used, the depth of penetration is far greater than the material thickness. Eddy currents at all depths within these susceptors are thus approximately equal, except where purposeful variations in susceptor thickness, or where openspace across the width of the susceptors cause variations in current density. In such cases, currents are forced to be non-uniform in specific regions to create more uniform heat generation or less uniform heat generation, depending on the specific application.

The magnitude of heat generated within a susceptor comprised of a conductive sheet of uniform thickness, is related to several factors. These factors include susceptor permeability, resistivity, size and shape, and the magnitude, frequency, size, and shape of the incident AC magnetic field. Variations of many of these parameters interrelate and affect the current distributions and densities that affect the sizes and locations of useful heat sources within the susceptors.

A Canadian patent by Krzeszowski, CA 1,110,961, (which is similar to U.S. Pat. No. 4,123,305) discloses a method for inductively heating a thermo-fusible material interposed between a carpet and a floor. An inductive heating tool is used to raise the temperature of a relatively thin-foil susceptor, which in turn activates the thermo-fusible adhesive material to create a bond, and thus "glue" the carpet to the floor. Krzeszowski discloses the use of a sheet of the thermo-fusible adhesive material, which is first placed upon the floor, followed by the carpet. Krzeszowski discloses the use of both continuously perforated sheets of aluminum as the susceptor material, or solid aluminum sheet. In one embodiment, a "vapour-barrier" sheet of aluminum (i.e., without perforations) is glued onto a slab of plaster, and then its other side is glued to a slab of expanded polystyrene, thereby creating a moisture barrier panel. One preferred aluminum sheet material disclosed in Krzeszowski is "ALBAL brand, reference 623," either with or without perforations.

The Boeing Aircraft Company owns several patents in the field of inductively heated susceptors. Virtually each patent extols the value of "even heating" of the susceptor to form a very high-strength and uniform bond. Of course, for aircraft structures, high strength bonds can be critical. Such patents include U.S. Pat. No. 3,996,402 (by Sindt), U.S. Pat. No. 5,717,191 (by Cristensen), U.S. Pat. No. 5,916,469 (by Scoles), and U.S. Pat. No. 5,500,511 (by Hansen). These patents use susceptors having various openings, and in some cases the openings are so large and numerous that the susceptor has an appearance of a screen-like material. All of the susceptors specified by the above Boeing patents have thickness dimensions that exceed 0.003 inches (3 mils). Such devices are not particularly useful in "quick" bonding of substrates.

Previous induction heating devices suffer from an inability to be made truly portable, i.e., lightweight, while simultaneously delivering the energy necessary to form bonds in short periods of time. It would be desirable, especially for higher-speed, lower-strength bonding applications, to provide an induction adhesive activation device with corresponding susceptor design that accumulates the heat in the susceptor and the adhesive while simultaneously withholding significant conduction losses to the substrates until all of the adhesive had either melted, begun chemical reaction, flowed adequately, or all three occurred.

Such a system would be valuable if the bonds developed were as strong as typically required for as wide a range of applications as possible, and it would be even more valuable if the susceptor adhesive device were optionally reversible by design. Such an induction adhesive activation device would ideally have improved energy efficiencies, sufficient to enable operation with a battery, be lightweight, support high duty-cycle operation (>40%) for many hours at a time, and require no liquid cooling.

It would be advantageous to provide an induction-based adhesive technology that can bond nearly instantaneously on demand, and which is not directed toward a pre-positionable adhesive, thereby allowing for simplified, more rapid production, and eliminating the requirement of high-energy systems such as those that operate at high frequencies that are known to be dangerous to human health.

SUMMARY OF THE INVENTION

Accordingly, it is an advantage of the present invention to provide an inductive heating apparatus having a work coil that is driven by an electrical current, in which an electrical current at a power converter stage is increased to a predetermined magnitude, whereupon the voltage magnitude is measured and used to determine a "distance value" that substantially represents the actual distance between the work coil and a susceptor, then based upon that distance value, the current and voltage magnitudes are adjusted so as to cause said work coil to emit a magnetic field at a predetermined desired power level that will induce eddy currents in the susceptor's electrical conductor to cause a temperature rise.

It is another advantage of the present invention to provide an inductive heating apparatus having a work coil that is driven by an electrical current, in which both a current magnitude and a voltage magnitude of a power converter stage are sampled over multiple sampling time intervals, and the average current and voltage magnitudes are used to calculate a power level being generated, and the power level is then adjusted according to a profiled energy delivery scheme until achieving a predetermined accumulated energy for the profiled energy delivery scheme, which ends the power cycle.

It is a further advantage of the present invention to provide a susceptor apparatus consisting of a strip-like structure having a length, width, and thickness, in which the structure includes at least one layer of an electrically conductive material and at least one layer of an adhesive material proximal to at least one of its outer surfaces, wherein the electrically conductive material generates an eddy current when exposed to a magnetic field of a predetermined minimum intensity, and the layer of electrically conductive material exhibits a thickness in the range of 0.10 through 3 mils.

It is yet another advantage of the present invention to provide a susceptor apparatus consisting of a strip-like structure having a length, width, and thickness, in which the structure includes at least one layer of an electrically conductive material and at least one layer of an adhesive material proximal to at least one of its outer surfaces, wherein the electrically conductive material generates an eddy current when exposed to a magnetic field of a predetermined minimum intensity, and the at least one layer of an electrically conductive material comprises at least two individual layers of electrically conductive material, in which each of the electrically conductive layers is separated from one another by an insulative layer.

It is still another advantage of the present invention to provide a susceptor apparatus consisting of a strip-like structure having a length, width, and thickness, in which the structure includes at least one layer of an electrically conductive material and at least one layer of an adhesive material proximal to at least one of its outer surfaces, wherein the electrically conductive material generates an eddy current when exposed to a magnetic field of a predetermined minimum intensity, and the structure contains at least one fusible portion that melts more quickly than other portions of said structure when its temperature is raised.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for controlling energy delivered by a work coil comprises: providing a heating apparatus having a work coil, and an electrical circuit that provides an electrical current to the work coil; emitting a magnetic field from the work coil, increasing a first electrical characteristic of the electrical circuit to a predetermined first magnitude, and substantially at the predetermined first magnitude, determining a second magnitude of a second electrical characteristic of the electrical circuit to determine a distance value; and based substantially upon the distance value, adjusting the first electrical characteristic and the second electrical characteristic to emit the magnetic field at a predetermined desired power level useful at the distance value.

In accordance with another aspect of the present invention, a method for controlling energy dissipated in a susceptor being delivered by a work coil comprises: providing a heating apparatus having a work coil, and an electrical circuit including a power converter; emitting a magnetic field from the work coil, and directing the magnetic field toward a susceptor that contains an electrically conductive portion that produces eddy currents due to the magnetic field; adjusting a first electrical characteristic of the power converter to a first predetermined magnitude, determining a second electrical characteristic of the power converter substantially at the first predetermined magnitude, then determining a distance value substantially corresponding to a physical distance between the work coil and the susceptor; and based upon the distance value, automatically adjusting the first and second electrical characteristics of the power converter to thereby emit the magnetic field at a power level sufficient to raise a temperature of the electrically conductive portion of the susceptor.

In accordance with yet another aspect of the present invention, a heating apparatus is provided, comprising: an electronic circuit including a power converter stage, and a work coil, the electronic circuit being configured to control a current magnitude and a voltage magnitude at an input of the power converter stage; the electronic circuit being configured to adjust one of the current magnitude or voltage magnitude at the input of the power converter stage to a first predetermined magnitude, and to use the other magnitude to determine a distance value; and based upon the distance value, the electronic circuit is further configured to adjust the current magnitude and voltage magnitude at the input to the power converter stage so as to cause the work coil to emit a magnetic field at a predetermined desired power level.

In accordance with still another aspect of the present invention, a heating apparatus is provided, comprising: a work coil and an electronic circuit, the electronic circuit, upon actuation of a cycle, being configured to determine both a current magnitude and a voltage magnitude input to a power converter stage over a plurality of sampled time intervals, then being configured to average the current and voltage magnitudes to calculate a power level being consumed by the power converter stage; and the electronic circuit being further configured to adjust the power level according to a profiled energy delivery scheme until achieving a predetermined accumulated energy for the profiled energy delivery scheme, and terminating the heating cycle.

In accordance with a further aspect of the present invention, a susceptor apparatus is provided, comprising: a substantially thin structure having a length, width, and thickness, the structure including at least one layer of an electrically conductive material, the structure including at least one layer of an adhesive material proximal to at least one of its outer surfaces, and in which the at least one layer of an electrically conductive material comprises a first layer of electrically conductive material, a second layer of electrically conductive material, and a layer of electrically insulative material positioned therebetween; and the structure being of a characteristic by which the at least one layer of electrically conductive material generates an eddy current when exposed to a magnetic field of a predetermined minimum intensity.

In accordance with yet a further aspect of the present invention, a susceptor apparatus is provided, comprising: a strip-like structure having a length, width, and thickness, and having at least one edge, the structure including at least one layer of an electrically conductive material, the structure including at least one layer of an adhesive material proximal to at least one of its outer surfaces; and the structure containing at least one fusible portion that melts more quickly than other portions of the structure when its temperature is raised.

In accordance with still a further aspect of the present invention, an apparatus is provided having at least one structure made of a magnetic material having a predetermined shape to create at least two magnetic poles at times when a magnetic field flows therethrough; an electrically conductive winding that is wrapped around at least one of the magnetic poles; and the structure is sub-divided into at least two portions, a first of portion having a substantially curved end of a concave shape, and a second portion having a substantially curved end of a convex shape that substantially mates against the concave curved end.

In accordance with still another aspect of the present invention, a method of adhesive bonding by induction heating includes: providing a susceptor structure having a length, width, and thickness, the structure including at least one layer of an electrically conductive material and including at least one layer of an adhesive material proximal to at least one of its outer surfaces, the structure being of a first characteristic by which said at least one layer of electrically conductive material generates an eddy current when exposed to a magnetic field of a predetermined minimum intensity, and the structure being of a second characteristic by which the at least one layer of electrically conductive material exhibits a thickness in the range of 0.01 mils (0.25 microns) through 3 mils (76 microns); and exposing the susceptor structure to a magnetic field during a heating event for a time interval in the range of 0.05–10 seconds, inclusive, and at an average power density in the range of 10–5000 Watts per square inch, inclusive.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Figure 1:
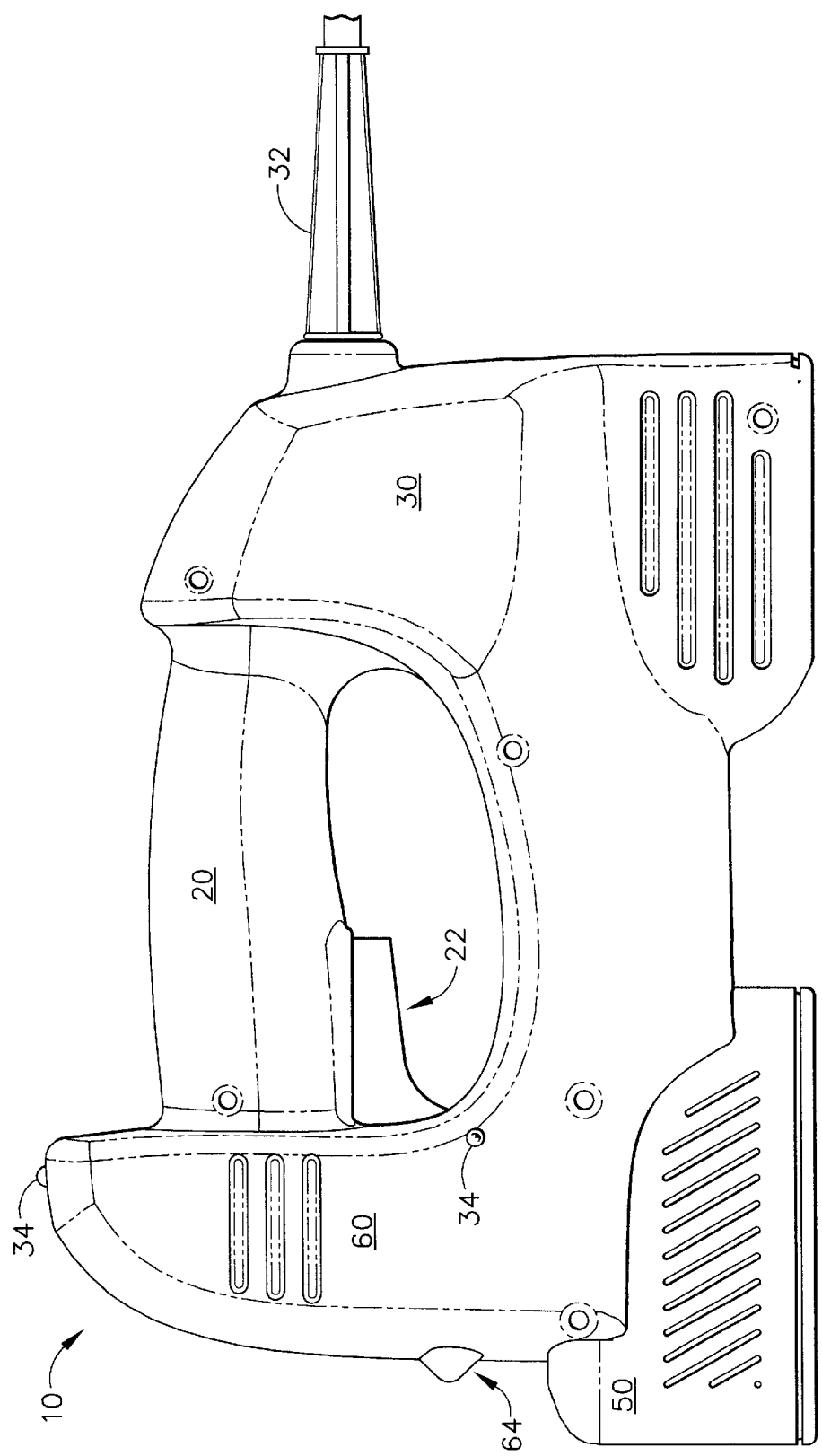
FIG. 1 is a side elevational view of the outer case of a hand held induction heating tool, as constructed according to the principles of the present invention.

Reference will now be made in detail to the present preferred embodiment of the invention, an example of which is illustrated in the accompanying drawings, wherein, except for electrical component designations (e.g., C1, R1), like numerals indicate the same elements throughout the views.

In a preferred embodiment, the present invention enables the use of hot melt adhesive systems in millwork because the problem of "open time" is eliminated. Furthermore, reheating of adhesive and disassembly of millwork is possible when using the present invention. Virtually any hot melt adhesive system currently in use today for millwork can be employed with the present invention. This eliminates the need to develop new hot melt adhesive systems for most millwork applications—particularly interior applications. A corollary to this is that there are many suppliers from which to choose, and adhesive prices, even from a chosen strategic supplier, should be competitive.

In an alternative susceptor/substrate structure of the present invention, a strip of susceptor material could be permanently bonded along a surface of a (first) substrate material at the factory, and then later used for assembly on the construction job site to a (second) substrate material using the temperature-activated adhesive coating of the susceptor. In such a system, the susceptor would initially be bonded in the factory to the first substrate using, e.g., an epoxy or perhaps a very high temperature hot-melt adhesive. Of course, the idea is to choose an adhesive that will not later become molten or softened when the induction heating tool is used on that susceptor.

On the job site, the (first) substrate material is brought into close physical proximity to, or makes physical contact with, the (second) substrate, at the surface (or edge) where the susceptor has been located. The induction heating tool is then used to bond the temperature-activated adhesive on the susceptor's surface to the (second) substrate.

It should be noted that this alternative construction susceptor could be easily disassembled by a new use of the induction heating tool. One advantage in this methodology is that the susceptor would only de-bond at the surface of the second substrate upon this reverse assembly procedure—the first substrate and susceptor would not detach.

The present invention acts as a remotely usable induction heating tool, in which heat is developed in susceptors at distances of at least three (3) inches from the work coil, at preferred locations and with controlled spot sizes. Another aspect of the present invention is that susceptors can be made with sections having fusible links, the openings of which are detectable by recognizing reduced power consumption. This allows an alternative embodiment induction heating tool to determine the susceptor's temperature rate-of-rise, the "knowledge" of which enables the tool to automatically raise the remainder of the susceptor to any arbitrary temperature, (preferably below its melting point), irrespective of the susceptor's distance from the tool.

In the present invention, predominantly non-magnetic susceptors are used. When such a susceptor is exposed to an alternating magnetic field, eddy currents are created within the susceptor, which in turn generate "repulsive" magnetic fields. Within a non-magnetic susceptor having a thickness on the order of 10 mils or greater, the repulsive field so generated is strong enough to allow only a small fraction of the incident field from penetrating the susceptor. In such a case, the incident magnetic field is somewhat splayed, illustrated by magnetic lines of force diverging much more quickly from the magnetic pole that is sourcing this field, as compared to the profile of divergence without this repulsive force (see FIG. 12).

Under these conditions, the magnitude of the incident magnetic field that is left to penetrate a relatively thick susceptor is additive with the magnitude of the repulsive field produced by the eddy currents, leaving a resultant magnetic field that produces little Joule heating. When thinner susceptors are used, however, their resistances are higher and the counteracting fields produced by their eddy currents are necessarily smaller. As thinner and thinner foil susceptors are used, a point is reached at which $I^2R$, or the square of the current multiplied by the effective resistance, is a maximum, and the amount of Joule heating reaches its peak value.

When using ever-thinner foils, the effective resistance of the electrically conductive material can be plotted as rising linearly, inversely proportional to its thickness. The amount of Joule heating that is produced by these thinner foil susceptors, however, relates non-linearly to this increased resistance. The Joule heating rate is approximately an exponential function of the foil susceptor thickness as, synergistically, the opposing magnetic field generated by the eddy currents decreases, and the resistance of the susceptor simultaneously rises in resistance. This fact is not addressed in the prior art literature.

In some applications of the present invention, susceptors having controlled widths are used in conjunction with work coils having predetermined ferrite diameters. A corresponding optimization of geometry produces what can be termed the "edge effect." The effect of controlled susceptor widths along with controlled foil thickness to concentrate current flow on one side or both sides of, and along narrow segments of, a susceptor, create controlled and efficiently heated areas of elevated temperature, or "hot spots." The ability to concentrate such heat development at a distance from a coil that otherwise imparts power to a broad area within a conductive medium is a new and useful application of projected induction heating. This ability is a second synergistic result of the crowding of eddy current paths into selected circular areas, and the crowding of current paths at one or both edges of susceptors.

The above edge effect allows the induction heating tool of the present invention to heat a smaller overall area than is otherwise possible with non-optimized components. This provides heating, and thus bonding, speed and efficiency, and allows the susceptor's heated areas along one or both edges in an area to be just large enough to achieve the required bond strength. The induction heating tool irradiates an area of a susceptor that is sufficiently large to intercept the required magnetic energy, and yield eddy current concentrations that can yield speedy and efficient heating in a minimum area required for the particular application.

Within non-magnetic susceptors, maximum heating efficiency generally takes place with uniform values of susceptor thickness in a preferred range of 0.0001 inches (0.1 mils or 2.5 microns) to 0.003 inches (3 mils or 76 microns). The unique thickness at which this occurs for each susceptor is most particularly dependent upon the physical parameters of: (1) frequency of the incident magnetic field, (2) the geometry of, or most particularly the ratio of the susceptor width to the width of the ferrite core sourcing the incident magnetic field, (3) the susceptor's material resistivity, and (4) the distance from the incident magnetic field.

Alternate susceptor materials include magnetic materials, where magnetic permeability is greater than 1.0. This permeability causes a natural focusing of the magnetic field since it causes densification of the magnetic field near the susceptor, as represented by a crowding of magnetic field lines of force. This helps to focus the magnetic energy of a work coil that is directed outward, with the associated advantage that the repelling magnetic field and the consequent repulsion force do not exist. Similar optimization of these susceptors for the production of localized heating is also readily achievable with the proper manipulation of susceptor width and thickness.

Materials to be bonded that are coated with susceptor material that is non-uniform in shape make use of the possibility of minimizing the use of susceptive material and maximizing the effects of shapes that heat most efficiently in various applications and work distances. In such cases, the susceptive materials are placed at specific locations along the materials to be bonded, and to help identify these areas, a printed peel-off coating can be attached to the outer surface where, after application is completed, it can be detached and discarded. The peel-off coating has the additional advantage of protecting finished surfaces from dirt, grease, and even disfigurement such as dents and scratches. In the absence of such printed peel-off coating identifiers, a variation in the tool that annunciates measured electrical parameters enables the tool to function as a susceptor-finder under low-power conditions so that normal tool activation can be initiated at the proper locations.

It has been determined that, with respect to a variety of metals and alloys subjected to magnetic fields within the frequency range of about 50 kHz to 150 kHz, that for non-magnetic susceptors maximum heating efficiency generally takes place with uniform values of susceptor thickness within the range of 0.00001 inches (0.01 mils=0.25 microns) to 0.002 inches (2 mils=51 microns), and for metals and alloys having a resistivity approximately equal to that of pure aluminum, maximum heating efficiency generally takes place more particularly within the range of 0.00002 inches (0.02 mils=0.51 microns) to 0.001 inches (1 mil=25 microns), and most particularly within the range of 0.00005 inches (0.05 mils=1.3 microns) to 0.0007 inches (0.7 mils= 17.8 microns).

Results of testing have shown that, as frequency increases, the optimum susceptor thickness generally decreases. Aluminum susceptors of varying thickness have been tested, and the optimum thickness using a 130 kHz RF magnetic field was found to be near 0.5 mils (13 microns). This optimum thickness is quite broad and operation at 0.3 mils (7.6 microns) does not result in a significant penalty. On the other hand, the optimum susceptor thickness when using an 80 kHz magnetic field was found to be greater than 1.5 mils (38 microns), and at frequencies above 100 kHz, the optimum thickness was found to be between 0.3–0.5 mils (7.6–13 microns).

The susceptor base resistance increases with frequency, as expected. To increase efficiency, the operating frequency could be selected to be as high as possible, limited by drive head and tank circuit losses.

An example of test results used a work coil constructed of a relatively large "U" core, wound with 8 turns. The tank circuit was operated at 220 volts RMS, and delivered 59 W per pole to the susceptor. The temperatures were measured and the results recorded at 0.74 seconds heat cycle time using an optical pyrometer with a time constant of 5 milliseconds. The energy deposited in the susceptor at that time was 44 Joules. The temperatures did not exceed 250° C. and were above 100° C. over areas of about 2.5 cm² per pole.

Work coil optimization is similarly important to the efficiency of energy transfer at a distance. For example, a small U-core such as a Magnetics® OR44131-UC will not have the "reach" of a core that is specifically optimized for a particular distance and susceptor geometry. As noted above, although only one magnetic field source, or pole, is involved in analysis of eddy current generation and Joule heating, a minimum of two such poles are always involved in the directing of these incident fields. In one preferred case, for example, the core dimensions that resulted in the greatest energy transfer efficiency had dimensions of about 1.75 inches in height (for a U-core), 3.25 inches width (across both legs of the U-core), and a core area for the poles made of a rectangular shape and having outer dimensions of about one (1) inch by one-half inch. The one inch dimension was in the direction of one particular susceptor axis.

This cross section needed to be about 3 cm² (½ in²) to keep losses to an acceptable level in the core, and the poles needed to be far enough apart to limit interaction between the pole fluxes and maximize flux linking to the susceptor. With the inverter running at a maximum of 300 volts RMS, the drive head needed to have 8 turns of the work coil to deliver 180W of power.

Calculations for designing the core in the above example, after defining a base set of component parameters, included the following:

1) The base 1-turn drive core inductance is Lo and the inductance with N turns was:

$$L = Lo * N^2$$

Lo, was measured as:

$$Lo = 82 \text{ nH}$$

2) The base susceptor resistance was Ro and, with N turns on the core, it reflected to the primary winding as:

$$R = Ro * N^2$$

For the base susceptor, the measured resistance was:

$$Ro = 500 \,\mu\Omega$$

3) The base-drive current, Io, was determined from the susceptor power transfer required and the susceptor resistance as:

$$Io = (P/Ro)^{1/2}$$

For the baseline case and a power transfer of 180 Watts:

$$Io = 600 \text{ A-turn RMS}$$

4) The base-drive tank capacitance was Co and for N turns was:

$$C = Co/N^2$$

Co was set from the operating frequency, $\omega$, as:

$$Co = 1/(\omega^2 * Lo)$$

for the base case $\omega$ was 817000 rad/sec and:

$$Co = 18 \,\mu F$$

5) The base tank operating voltage was Vo and for N turns was:

$$V = Vo * N$$

Vo was given by:

$$Vo = (Lo/Co)^{1/2} * Io$$

For the base case $$Vo = 40 \text{ volts RMS}$$

The power supply operated at a maximum tank circuit voltage of about 300 volts RMS, which required about eight (8) turns on the core (300 V/40 V) and it would have an inductance of about 5.2 $\mu$H (82 nH*64). The capacitance was to be about 280 nF (18 $\mu$F/64) for 130 kHz operation. Tank current was to be about 75 Amperes RMS. Power transfer to the susceptor was about 180 Watts.

The core was to operate at about 0.15 T (1.5 kG). For Magnetics® "R"-type material at 130 kHz the losses were predicted to be about 310 mW/cm³. The core volume was about 39 cm³, making the expected core losses about 12 W. The Litz wire had a resistance of 5 m$\Omega$/m. At 75 Amperes RMS and one meter of wire, the wire losses were predicted to be 28 W. Total drive head losses were predicted to be under 50 W, and the actual measured losses in the test unit were very close to 50 W.

An analysis of susceptor optimization was performed to understand how to maximize power transferred to a susceptor. From very basic physical principles, a relationship was developed between susceptor power and the key problem parameters:

$$P \propto \sigma t (\mu_0 \omega m_0/y)^2 [1/(1+\sigma t \mu_0 \omega y)^2]$$

Where:

P is the total power transferred to the susceptor, $\sigma$ is the electrical conductivity of the susceptor, t is the thickness of the susceptor, $\mu_0$ is the permeability of free space, $\omega$ is the frequency of the excitation, $m_0$ is the magnetic moment of the tool pole, and y is the separation between the pole and the susceptor.

From this relationship, it was expected that the expression, $\sigma t \mu_0 \omega y$, in the second half of the equation defined a critical condition. Analysis proved that the critical value for this expression was about 10. That is: for $\sigma t \mu_0 \omega y << 10$, the power relationship reduced to:

$$P \propto \sigma t (\mu_0 \omega m_0/y)^2$$

and for $\sigma t \mu_0 \omega y >> 10$ it reduced to:

$$P \propto (m_0/y)^2 [1/\sigma t]$$

Further analysis revealed that for $\sigma t \mu_0 \omega y \approx 10$, an optimum susceptor heating condition was achieved. The optimum can be understood by inspecting the first equation and noting the dependence of susceptor power on each parameter. In the above equation,

- $\sigma$ is the electrical conductivity of the susceptor. If electrical conductivity is zero then the power is zero. Power will increase as conductivity increases, but if conductivity becomes very large then the power drops to zero again. This implies that there is an optimum conductivity that will maximize power transfer.

- t is the thickness of the susceptor. The susceptor thickness displays the same dependencies as conductivity. Therefore, there is also an optimum thickness that maximizes power transfer. In fact, by further inspection, it can be shown that the product of conductivity and thickness is the key susceptor parameter. For all practical purposes, two susceptors, one having half the conductivity of the other but twice the thickness, will absorb exactly the same amount of energy from a given induction field. In short, it will perform exactly the same.

- $\mu_0$ is the permeability of free space. Permeability is fixed in free space. The effect of ferromagnetic susceptors requires a different approach and is not covered by this analysis.

- $\omega$ is the frequency of the excitation. Power increases with increasing frequency at low frequencies (i.e., when $\sigma t \mu_0 \omega y << 10$). At high frequencies, the power becomes independent of frequency. There is, therefore, no optimum frequency that will maximize power transfer. One would always want to operate at the highest frequency possible, consistent with oscillator performance, component losses, and magnetic-field-radiation safety.

- $m_0$ is the magnetic moment of the tool pole. Power transfer increases as moment squared.

- y is the separation between the pole and the susceptor; power transfer decreases with increasing separation.

Further testing of aluminum susceptors revealed that an optimum thickness of aluminum for certain conditions was about 0.5 mils (12.5 $\mu$m—microns), and that a generally optimum-thickness region is somewhat broad with little variation in heating efficiency over a range from 8 $\mu$m to 20 $\mu$m. Power transfer was a maximum for a standard separation distance of about ⅛ inch (3 mm) and for a 0.0005-inch (12.5 $\mu$m) aluminum susceptor. Decreasing the susceptor thickness to 0.0003 inches (7.6 $\mu$m) resulted in a drop in power transfer of about 35%. Increasing the thickness to 0.0015 inches (38 $\mu$m) resulted in a drop in power transfer of about 30%.

Susceptors made of brass were also tested, and these exhibited a maximum power transfer at an optimum thickness of about 60 $\mu$m, almost exactly 5 times greater than for aluminum. The product of conductivity and thickness is a key parameter, and for a given frequency and separation, any susceptor material could be optimized by simply selecting the appropriate thickness to optimize the product of thickness and conductivity. A higher conductivity brass may provide a greater power transfer at a lower thickness.

For each operating frequency, there is an optimum susceptor. The optimum susceptor thickness-conductivity product varies inversely with frequency. The maximum power transfer, over a particular range of distance between work coil and susceptor, increases approximately linearly with frequency.

Another important relationship is the energy transfer efficiency as a function of susceptor width. Direct correlation of power transfer is difficult since narrow susceptors have less material to heat (susceptor, substrate and adhesive).

Susceptors made of steel were also tested, and the results for steel show that enhanced power transfer could be achieved with its use. However, ferromagnetic materials behave differently from non-ferromagnetic materials. For the latter, the thickness of the susceptor is very small compared to the electrical diffusion depth. For example in aluminum, the diffusion depth at 130 kHz is about 400 $\mu$m, almost 40 times the thickness of the baseline susceptor. For iron with a permeability of 2000, the diffusion depth at 130 kHz is about 20 $\mu$m, about the same as, or less than, the thickness of these susceptors. Therefore, one would expect ferromagnetic materials to be diffusion limited, and power transfer could not be practically dependent on susceptor thickness.

The susceptor selection and optimization process can be understood from the optimization relationship: $\sigma t \mu_0 \omega y \approx 10$. The susceptor optimization parameter is the product, $\sigma t$. The conductivity and thickness can always be selected to satisfy the optimization criteria and maximize power transfer to the susceptor. The separation parameter, y, is driven by the application and not by a tool or susceptor design parameter. The operating frequency, $\omega$, is a tool design parameter and is selected as a tradeoff between susceptor power transfer and tool losses (size and cost). Ferro materials are diffusion limited and power transfer is controlled by a different mechanism.

The heating of the susceptor typically is non-uniform. There is intense heating along the edges of the susceptor in the region of the pole piece, while the center may not be heated at all. Some test results show that heating was not nearly as rapid as expected given the predicted power transfer to the susceptor and the heat capacity of the susceptor. The concentration at the edge did not seem as pronounced as expected. The reason for these observed differences was thermal conduction, both directly into the substrate (adhesive and wood) and laterally in the susceptor.

Conduction into wood substrates was very important, since the edge temperature of the aluminum susceptor, with no conduction to wood on either side, would reach over 200° C. However, susceptors bonded to wood take much longer to heat, and as a result, they do not become nearly as hot under the same magnetic field conditions and time intervals. The energy absorbed by the wood must come from the induction heating tool, and it contributes nothing directly to melting adhesive.

Testing showed that a 0.5 mil (13 micron) "standard" aluminum susceptor is very nearly optimum for a 0.75-inch (19 mm) separation and 130 kHz operation. The resistance of the standard susceptor at 0.75 inches from the ferrite core of the work coil is about 110 $\mu\Omega$ per pole. Results using an adhesive that melts or softens below 100° C. indicated that the heating system requires a power transfer to the susceptor of between 50 W and 100 W per pole to achieve a good bond in 0.5 seconds. The use of lower conductivity materials would not reduce the power requirements; thicker susceptors would be required to reach optimum power transfer conditions.

Other variations of work coils are useful for optimizing the creation of either the hot spots mentioned above, or uniformly heated areas of a foil susceptor. Although only one magnetic field source, or pole, is involved in the above discussions of eddy current generation and Joule heating, a minimum of two such poles are always involved in the directing of these incident fields. The poles are generally set apart to effect limited interaction between them, and this encourages the preponderance of magnetic field lines, or components of magnetic field lines which have vectors that are more nearly parallel to the axes of the cores. In some cases, an increase in the ratio of components more nearly parallel to these axes, to the components that are more nearly perpendicular to these axes (i.e., those more nearly parallel to the susceptor)—where the efficiency of eddy current generation is at a minimum—can be accomplished by using ferrite cores that produce such effects, such as "E" or "U" cores that project the magnetic source that is opposite in polarity to that in the center of the above-mentioned incident fields, outside the boundaries of the susceptors in particular applications. This is done so that near the areas where the heat generation is to be maximized, the components of the magnetic field that are more nearly parallel to the axis of the ferrite source are maximized to produce eddy current maxima.

The induction heating tool of the present invention in its preferred embodiments is sufficiently small and of low weight to be portable, and can be used on the job site as a hand-held device, either with a battery power source or plugged into an AC line voltage outlet. The tool can automatically deliver a prescribed amount of energy to a hot-melt-adhesive-coated susceptor to achieve a bond between two objects, at any distance up to at least 0.75 inches (19 mm), in less than one-half second, when using an adhesive that has a melt or soften temperature of below 100° C. In typical operation, it is programmed to deliver an energy level in the range of about 50–200 joules in this time period over two susceptor areas, each about 2.5 cm$^2$. Adhesives that melt or soften between 100°–200° C. will typically bond within 1.5 seconds.

When using the preferred thin-foil susceptors of the present invention, the thickness of such aluminum susceptors (those in which the susceptor contains aluminum as an alloy or layer) preferably is in the range (inclusive) of 0.01–2 mils (2.5–51 microns), or more preferably 0.01–0.75 mils (0.25–19 microns), or most preferably 0.01–0.55 mils (0.25–14 microns). When using susceptors made of other electrically conductive materials, the preferred thickness is in the range (inclusive) of 0.01–3 mils (0.25–76 microns), or more preferably 0.05–2 mils (1.3–51 microns), or most preferably 0.01–1 mils (0.25–25 microns).

The above susceptors are heated by an alternating magnetic field, which produces a power density in the susceptors, and is applied for relatively short time intervals. The preferred values are as follows:

the heating cycle time duration is in the range of 0.1–10 seconds (inclusive), or more preferably 0.1–5 seconds (inclusive), or most preferably 0.1–2 seconds (inclusive);

the power density is in the range of 10–5000 Watts per square inch of susceptor (inclusive), or more preferably less than 1000 Watts per square inch, or most preferably less than 500 Watts per square inch; and the operating frequency of the alternating magnetic field is in the range of 1 kHz—1 MHz (inclusive), or more preferably 10–500 kHz (inclusive), or most preferably 10–300 kHz (inclusive).

The "heat" energy is supplied by the work coil (an electrical inductor) in the form of a magnetic field. The work coil is literally an electrically conductive wire wound onto two identical ferrite posts that become the legs of a three-piece U-core. In the preferred embodiments, the work coil wiring is made up of Litz wire, which has very little reactive losses due to skin effect at the radio frequencies of operation of the tool.

The two flat ends of the ferrite core emit the AC magnetic field. When this field is presented to an electrically conductive material (i.e., the susceptor), free electrons within the material are set in motion. This electron motion within the conductive medium tends to mirror the electron motion in the coil. This flow of current through the susceptor's electrical resistance produces a dissipation of power that results in the generation of heat.

When the temperature of the susceptor rises it causes the adhesive coating to melt, or at least soften, and the adhesive flows on the susceptor surfaces. At the end of the heating cycle, the adhesive rapidly cools due to heat loss into deeper and cooler levels of the materials being bonded (called the substrates), and a strong, permanent bond is produced that will remain strong unless the susceptor is later reheated with a similar induction tool.

The energy that creates the magnetic field is derived from a variable-output power oscillator circuit (typically referred to as an inverter) operating at a frequency of about 130 kHz in the preferred embodiment. Electrical power for this inverter is supplied by a variable-voltage power converter which is controlled by a microprocessor. Power delivered to the susceptor is sensed by a microprocessor through active monitoring of the power converter's input voltage and current, in a "feed-forward" control configuration. By initiating each heating cycle at low power and quickly ramping the applied voltage to achieve a particular current magnitude that will deliver a programmable number of joules in about one-half second, the control circuit automatically adjusts its output power to achieve constant energy delivery.

In a second preferred embodiment, such adjustments can occur at a rate of about 11,000 each second, thereby easily compensating for input voltage variations, including much of the AC ripple on the DC power rails. A look-up table is used in a second preferred embodiment to compensate for variations in circuit power losses, thus allowing the tool to accurately operate over the entire operating distance range. The tool can be programmed in the field using a laptop computer to deliver different amounts of energy in different time periods to meet other application requirements (such as those with different types of susceptors or substrates, or ambient temperature variations), and for research purposes. The tool can automatically control the power level in repetitive firing cycles to maintain a substantially constant rate of energy dissipation in the susceptor itself during the overall time interval while the tool emits a magnetic field, even if the distance between the susceptor and work coil changes during the overall time interval.

The control circuit monitors the work coil temperature and activates a fan when the work coil's temperature exceeds a programmable level. It also operates four high-output LED's that are used for illumination of the work surface, extinguishing these whenever the tool has been dormant for more than a programmable time interval, e.g., thirty (30) seconds. Further, it provides tactile feedback to the user by initiating a noticeable vibration when the heating cycle is complete. It also stores information on thousands of activations, including activation time period, calculated energy-output level, time since previous activation, and work coil temperature.

As noted above, Litz wire is used to lower the work coil's effective resistance to allow the work coil to run at a relatively low temperature. Litz wire is composed of numerous individually insulated strands of wire and offers increased effective cross-sectional area due to the "skin effect" which relates to the tendency for higher-frequency currents to flow on outer conductor surfaces. Since energy transfer is somewhat proportional to frequency, the operating frequency is balanced against core losses to determine the frequency that yields the optimum efficiency for the components used. In some bonding applications, susceptor dimensions are also controlled to maximize the tool's efficiency (as discussed above). The optimized susceptor allows the inventive system to heat, at a distance, a smaller overall area than is otherwise possible with non-optimized components. This allows achievement of speed and efficiency of heating and bonding.

The present invention offers many advantages, such as reduced assembly times, which in the past typically required hours, but which now can be done in minutes or seconds. Other advantages include: elimination of adhesive open-time constraints; elimination of hot melt safety issues; elimination of dangerous VOC's; elimination of need for surface refinishing; reduced assembly costs; improved bond quality; improved process reliability; improved process convenience; bond reversibility where desired; and allowance for the use of adhesives to bond opaque materials where quick set time and pre-positioning of the material is highly desirable.

The adhesive products used with the susceptors that are available for use with the heating induction tool of the present invention add value to assemblies through improved appearance and reliability for the end user, typically at a reduced cost to, and at a greater convenience for, the assembler, installer, or manufacturer, by: enabling the use of virtually any material; enabling the use of low-cost substrates with high quality finishes; eliminating the need for mechanical fasteners; allowing for the pre-finishing of virtually any material; and eliminating the need for post finishing.

The present invention improves overall product quality and reliability in the field of bonding as compared to that offered by mechanical fasteners, particularly where adhesives are not used today, by: eliminating the use of mechanical fasteners; increasing specific bond or connection strength between two components; allowing for the use of any material other than metal (although metal can be used in some applications); and reducing product manufacturing costs.

Manufacturing costs can be reduced by: eliminating or accelerating finishing steps, eliminating or accelerating assembly steps, eliminating the need for an adhesive with a mechanical fastener, significantly accelerating adhesive set time, allowing for reversal of product assembly (optionally where damage of the parts needs to be minimized), allowing for more economical materials selection, allowing for more economical adhesive use, and providing more compact equipment that takes up less floor space, requires lower power, and requires less maintenance than large-scale production equipment.

Manufacturing costs can also be reduced by: allowing for the pre-application of adhesives, which avoids the need to comply with strict federal and state regulatory requirements, allowing for the elimination of VOC-emitting adhesives, eliminating chemical handling and odors at the end user's site by pre-applying the adhesive, and reducing overall process costs.

Referring now to the drawings, FIG. 1 shows a hand held induction heating tool, generally designated by the reference numeral 10. The induction heating tool 10 consists of certain major portions, including a handle portion 20, a bottom case portion 30, a top case portion 60, and a work coil "head" portion 50.

The handle portion 20 includes a finger-operated trigger at 22. The bottom portion 30 includes a power cord fixture to receive a power cord 32, that typically would plug into a standard 120 volt AC outlet. The top portion 60 includes some LED's 34, used for providing warning or status indications to the user/operator of the tool 10. The top portion 60 also includes some LED's at 64 to illuminate the work piece, if necessary. Additional lighting LED's 64 are included in the bottom portion 30, which can be viewed in FIG. 2.

In some configurations of the present invention, the work coil "head" 50 is interchangeable with other heads of various sizes and output power ratings, for the same, or other induction heating applications (such as the heating of large susceptors used to bond laminates and other sheet goods).

Figure 2:
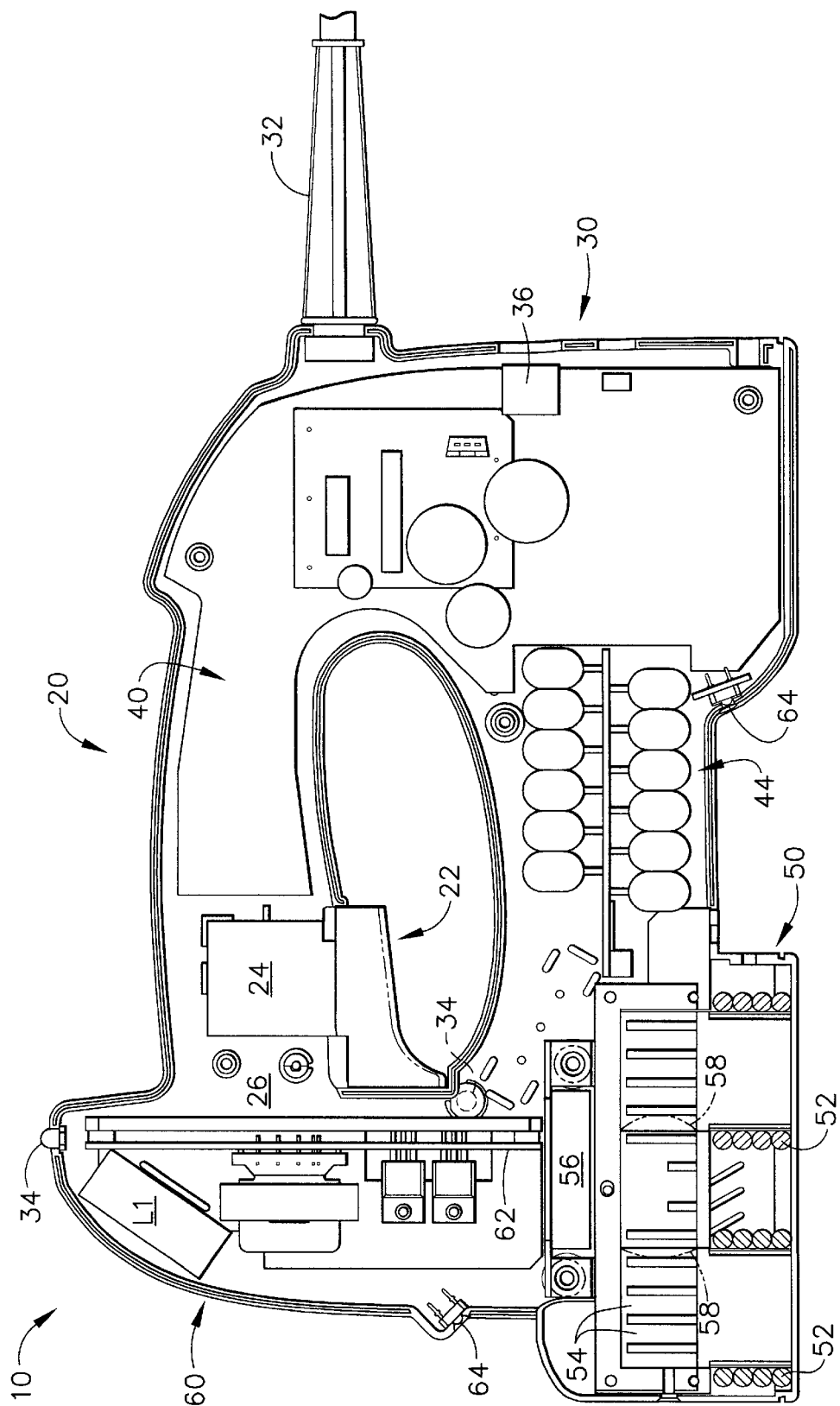
FIG. 2 is a side elevational view in partial cross-section of the induction heating tool of FIG. 1.

Referring now to FIG. 2, the same type of hand held induction heating tool 10 is again illustrated, this time in partial cross-section so as to be able to view some of the major components that are contained within the case. For example, the trigger 22 is mechanically in communication with a trigger switch 24. As can be seen when comparing FIGS. 1 and 2, the trigger structure 22 can be of various shapes and sizes.

FIG. 2 also illustrates a feedback solenoid 26 that is contained within the handle portion 20, although in some embodiments a "buzzer" motor that drives an off-center cam buzzer device, or other vibrator device, is utilized in lieu of the feedback solenoid 26.

The rear handle portion 20 also includes a printed circuit board at 40, which includes the voltage regulator sections and the processing and control circuitry, examples of which are found schematically in FIGS. 3A–3B and 14A–14B. The regulation and control circuitry could be combined with power components, if desired, but in the illustrated embodiment of FIG. 2, an inverter printed circuit board sub-assembly at 62 is illustrated as a separate component that is contained within the top portion 60.

The bottom handle portion 30 also includes a communications port 36 that corresponds roughly to the communications port 116 on FIG. 3, or corresponds to a connector for an infrared communications port 560 on FIG. 14.

A power supply is included to provide 12 volts DC, and adjacent to this 12 VDC power supply is a printed circuit board that contains several parallel capacitors at 44. These capacitors 44 are in close proximity to the work coil subassembly 50, and the work coil itself is a power inductor made up of an U-core at 54, preferably made of ferrite, and containing multiple windings of an electrical conductor at 52, such as Litz wire or other copper wire. The work coil and capacitors at 44 create a resonant circuit that will oscillate at a predetermined frequency, when energized.

The work coil head 50 includes ferrite core pieces in one of the preferred embodiments, as noted above. In one construction of this ferrite material, the core 54 is subdivided into three separate pieces along the curved lines 58 on FIG. 2. This construction allows the work coil to undergo additional vibration and shock mechanical loads with a lesser chance of breakage in the relatively brittle ferrite pieces, by allowing the three separate ferrite core pieces to "pivot" along these curved lines 58. The magnetic circuit remains intact, since there is no purposeful air gap in core 54 at these curved lines 58.

During prolonged use, the work coil area may get quite warm, and therefore, a fan 56 is provided to lower the temperature in the work coil area (i.e., within the interchangeable work coil head 50).

The induction heating tool of the present invention is designed to accept a variety of work coils, each of which is used for a specific application. Each work coil contains resonating capacitors so that the majority of the coil current will not flow through connectors.

The power supply of another alternative embodiment induction heating tool uses a "swinging choke" that varies its inductance value as coil current is varied. The coil, or choke, diminishes in inductance, and therefore, energy storage capacity, as current drawn by the susceptor is increased. This property enables the switching transistors to operate at a more constant voltage level as the current increases, rather than experiencing a rise in peak voltage as current is increased, thereby preventing excessive voltage levels to be experienced by these transistors. The means of achieving this swinging choke characteristic is to create the usual gap in the core that is required to cause saturation at lower levels of magnetic flux.

Extra fine Litz wire is used in the work coil, which produces less heat loss in the electrical conductors of the coil. Ferrite material comprises the cores of the work coils. Curved ends of this ferrite material (at reference numeral 58) act as joints against which connecting (sometimes brittle) ferrite pieces or sections can move without transmitting high torsion and tensile forces to minimize potential breakage, while still maintaining good magnetic coupling.

Some of the other important aspects of the induction heating tool of the present invention include: the tool is portable; it can be battery operated; the tool's energy delivery within the operating range of the tool can be kept nearly constant; the tool will shut down after identifying programmable (adjustable limit) error conditions such as overtemperature, under-power, and over-power (the latter two by discriminating between an "in-range" susceptor and an "out-of-range" susceptor, including no susceptor, and one that draws too much power); the tool can be programmed to deliver a profiled power curve to control the temperature rise of a susceptor; multiple output energy levels can be programmed; the tool can operate in a "continuous" (re-triggered) mode and automatically deliver energy bursts after adjustable delay times; and operating data can be stored for later analysis including, for each energy delivery burst, time since last energy burst, work coil temperature, peak current, maximum and minimum voltage, and error condition(s), if any; annunciation of operating modes, levels and error conditions is easily interpreted from a multiple-segment bar graph display and/or from downloaded data.

In one mode of operating the induction heating tool of the present invention, the power curve is profiled at a rate that substantially increases the power output near the beginning of a heating event when the tool is operated in conditions of low ambient temperature. As discussed above, temperature fluctuations at many assembly sites could be extreme, especially in cold conditions in more-northern latitudes. The profiled power output could overcome some of the effects of the cold on the adhesive of the susceptor by providing "extra" power near or at the beginning of the power ON heating event to begin raising the susceptor's temperature more quickly, as compared to the power profile that would otherwise be used in more moderate conditions. Of course, the overall accumulated energy delivered must be also considered, and it may be that the increased power output levels should remain somewhat "increased" throughout the entire heating event in really cold conditions.

Similarly, in conditions of relatively high ambient temperatures, the profiled power curve could be modified to substantially decrease the power output.

In addition to the above, the induction heating tool of the present invention will automatically shut down under several conditions, including: an under-power condition, when confronting an "air load;" an over-temperature condition at the work coil; a "timed out" condition, where the load power is too low, but greater than the "air load" power condition; or when the programmed energy level is reached. In one mode of a preferred embodiment, the delay to shutdown upon an "air load" condition is 75 msec, and is not user settable; the "timed out" shutdown condition is programmable by the user in one msec steps; and the over-temperature limit is programmable in degrees C.

In the first preferred embodiment, a microprocessor 114 is utilized in the electronic circuit of the induction heating tool. One exemplary integrated circuit microprocessor is a Philips 80C550 microprocessor, which contains 4K of onboard ROM and 128 bytes of RAM. To maintain variable values, including user settings, in a non-volatile memory, an EEPROM chip is provided. Operating parameter storage is contained in a 2K×1 serial EEPROM, such as the bank of EEPROM's at 140 on FIGS. 3A–3B. Such stored operating parameters include maximum tool power output, maximum voltage and current values, low-load and overload current and power levels, multiple operating power levels, current power level, and other common parameters, as required.

Figure 3A:
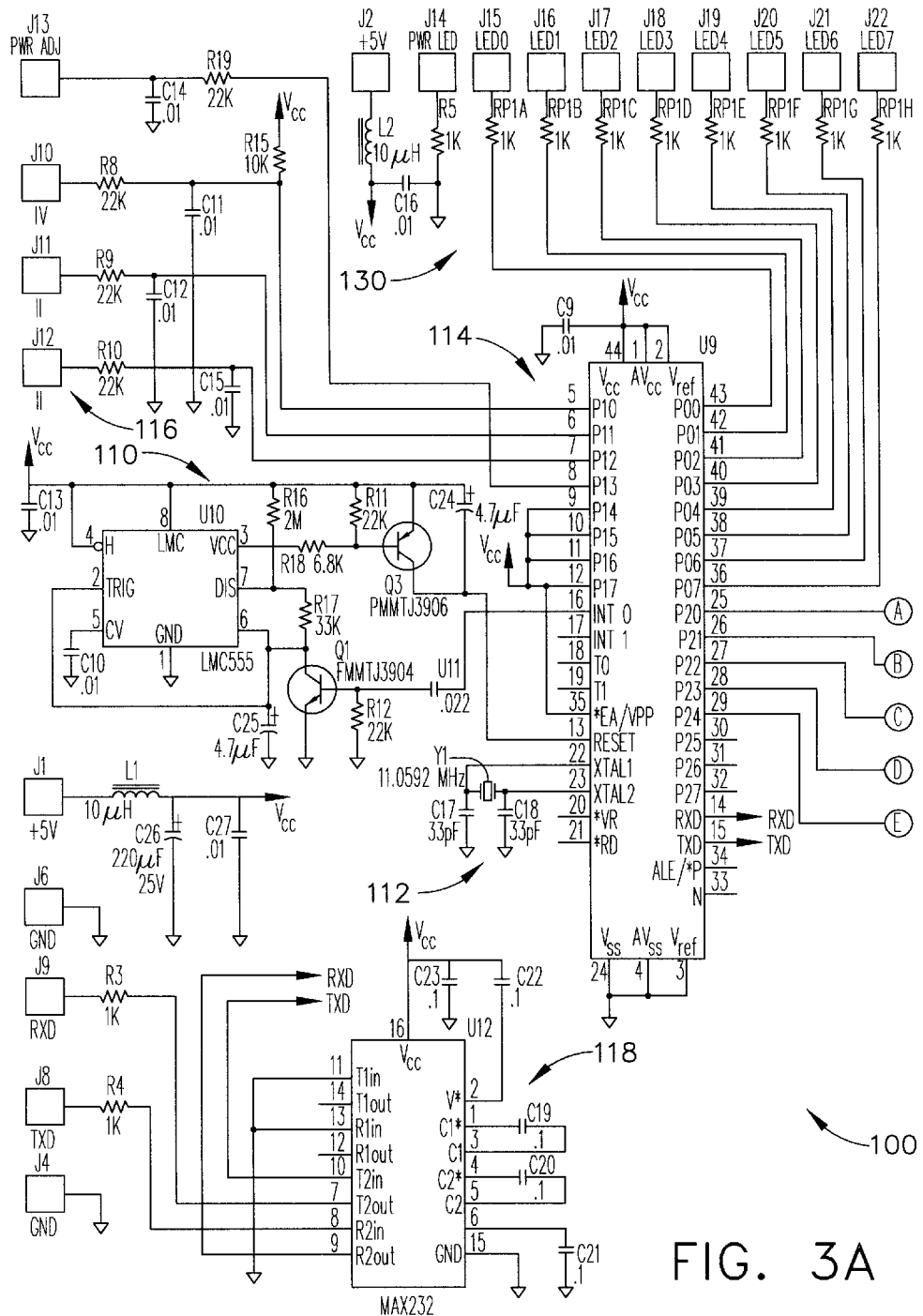
FIGS. 3A–3B are an electrical schematic diagram of processing circuit and memory circuit elements of a first embodiment of the induction heating tool of FIG. 1.
Figure 3B:
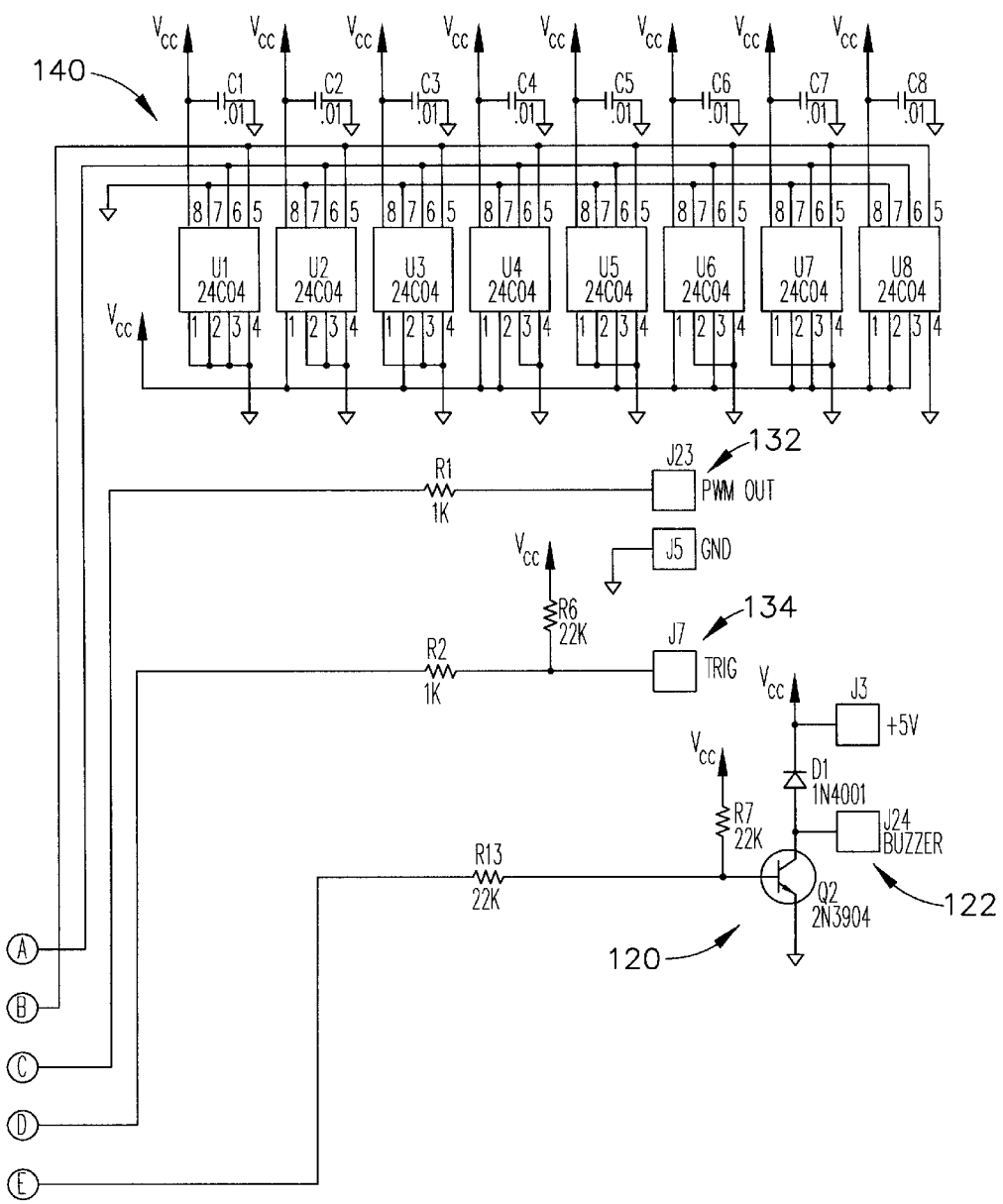

Referring now to FIG. 3 (FIGS. 3A–3B), an electrical schematic diagram 100 depicts the controller component of a first preferred embodiment of the induction heating tool 10. In this exemplary circuit, a Philips microprocessor 114 (U9) is used, part number 80C550. Several serial EEPROM memory chips (U1–U8) are provided at 140, which store operating data, if desired, and which store operating parameters or limits, some of which can be user-settable. Other interfacing circuit components are provided, such as a crystal oscillator circuit 112 (Y1, C17, C18) and a small filter capacitor C9 across the +5 VDC power rail.

It will be understood that the microprocessor 114 could be provided with on-board memory, such as EPROM or EEPROM to store operating parameters and perhaps some accumulated data. In such a microprocessor, the serial EEPROM memory chips at 140 could be eliminated in models of the heating tool that do not require historical operating data to be stored and later downloaded to a host computer.

Other filter capacitors across the +5V rail are used in various locations on the printed circuit board 40 that contains this circuit (e.g., C1–C8, C13, C16, C23). The +5V rail is signal-conditioned by an inductor L1 and capacitors C26–C27.

An RS-232 level converter circuit 118 is provided (U12, C19–C20, C21–C22, R3–R4) which allows the microprocessor 114 to communicate with a host computer (not shown on FIG. 3). In addition, an external watchdog timer circuit at 110 (U10, U11, Q1, Q3, C10, C24–C25, R11–R12, R16–R18), and a status indicator LED array 130 (LED0–LED7) are provided. A power ON LED indicator at J14 is also provided.

The circuit on diagram 100 includes digital inputs and outputs, such as the RS-232 input data stream and output data stream (at the RxD and TxD pinouts on U9 and U12), and a trigger switch signal 134 through R2 (along with R6) from the operator control switch (e.g., switch 24 on FIG. 2). One of the other digital outputs include a signal that controls a signaling device (e.g., a buzzer or solenoid) to alert the user/operator of the induction heating tool 10 that the end of the heating cycle has been reached. The interfacing components for this function are the circuit 120, including R7, R13, Q2, and D1. The buzzer output drive signal is at 122.

The multiple LED's of the LED array 130 are also driven by further digital outputs of the microprocessor 114. These LED's are physically grouped as a bar graph display.

There are also certain analog inputs at 116 on diagram 100, including inverter voltage, inverter current, and work coil temperature, using R8–R10, C11–C12, and C15. A power adjust analog input signal is also provided, using R19 and C14. An analog output is provided as a PWM proportional signal 132 (using R1).

The controller circuit of diagram 100 provides two modes of operation, in which the first mode is a "programming and data download mode." The tool 10 is connected via the RS-232 interface 118 to a host computer that can upload operating parameters to the tool, and download the contents of the EEPROM memory circuit 140 from the tool. In this mode, the tool 10 can be powered through the RS-232 cable.

In the second operating mode, called "normal," upon a power-up the software program first reads in operating parameters from the EEPROM memory circuit 140. If the data read has an error, a set of hardcoded default values is used. The processor registers and memory are also initialized.

A main operating loop is now entered, in which the tool continuously monitors the analog inputs and maintains a running average of inverter voltage and current. The work coil temperature is also monitored, and an error condition is declared if any analog input value goes outside of predetermined limits.

When the trigger switch 24 is actuated, the tool 10 begins a "susceptor find" algorithm, and the inverter 250 is energized with short current pulses, and the inverter current is monitored. When the tool 10 is brought within working distance of a susceptor, the inverter current will rise, indicating that the tool is properly oriented to make a bond. The LED indicator 130 is flashed to alert the user/operator of this condition.

A heating cycle now commences, in which the inverter is turned on at a predetermined level, and its input voltage and current are multiplied mathematically to give input power. The power drawn is integrated over time to provide a running measure of energy used by the inverter. The control software corrects this value for inverter and work coil losses, and compares the corrected energy level to a predetermined limit. When this limit of total energy is reached, the inverter is shut off and the LED indicator and a buzzer or other tactile signaling device are enable to alert the user/operator of a successful bond.

The tool 10 can be operated in a repetitive mode, in which the heat cycle is repeated with a programmable delay between "heat shots." This allows the user/operator to move the tool 10 along a trim item and make numerous joints or bonds without being required to pull the trigger once for each joint/bond.

The background (watchdog) timer 110 is started at the beginning of each bonding cycle. If this timer 110 should time out before the required energy is accumulated in the susceptor, an error signal is generated and the LED display 130 indicates this condition. Other error conditions monitored by this controller circuit 100 include inverter overcurrent and work coil over-temperature. The LED display 130 can provide a unique pattern for each of the error conditions.

At the end of each heating cycle, the peak inverter voltage, current, and work coil temperature can be saved in the EEPROM memory circuit 140, as well as the "shot number" and the time interval since the last shot. This data is available to be downloaded to the host computer (as discussed above) in order to monitor tool usage and operating conditions.

In the first preferred embodiment, as noted above, tool operating parameters are accessible through a serial port connection (at 116 on FIGS. 3A–3B) to a PC (not shown on FIG. 3). A custom computer program running on the PC provides supervisory control and data recovery functions. Data recording can be stored in, for example, seven of the 256Kx1 serial EEPROM's (at 140), which allow up to 224 Kbytes of non-volatile data storage. Possible contents of the data record being stored in the non-volatile memory include: time since last application of the tool (using, e.g., a 10 msec resolution); work coil temperature; peak current; minimum and maximum voltage; and error conditions, if any.

In the first preferred embodiment, two modes of operation are supported as noted above: continuous (re-triggered) and one-shot. Each mode can select one of several preset delivery schemes, each of which can be either a maximum energy delivery or a profiled energy delivery.

The continuous or re-triggered mode will repeatedly self-trigger an energy delivery cycle for as long as the trigger is pulled. Overload and low-load error conditions will not terminate this cycle unless allowed to persist for a preset number of sampled time intervals. In the case of errors, the inverter 250 (see FIG. 6) will be pulsed on at minimum duty cycle until a timeout occurs or the tool senses a proper load condition, in which case it will continue as normal. The cycle terminates instantly on trigger release. A parameter is included to determine the dead time between cycles.

The single shot mode performs exactly one power cycle per trigger pull. Any error condition will immediately terminate the cycle.

The maximum-energy mode dictates the power output level of the induction heating tool (in a range of 10% to 100%) and the target energy to be supplied to the load (e.g., a susceptor). A maximum powered-output time is also provided. When the tool is triggered, it will sample both current and voltage during the ON time of the inverter, average these values over multiple (e.g., eight) consecutive readings, and calculate the power delivered to the load (susceptor). If this power is less than a low-load limit, then a low-load error condition is registered, and operation is suspended until the trigger is released and again pulled. If the power or current levels exceed safe limits, then an overload error will be registered, and again the tool will be disabled until again triggered.

Once the maximum energy level is reached or exceeded, the cycle is ended as discussed above. If the maximum time is reached before this maximum energy level is reached, a timeout error is posted and operation is halted. A new cycle is automatically started after timeout in the continuous operation mode.

Profiled energy delivery uses a table of multiple (e.g., up to ten) steps. Each step is defined as power to be delivered during successive 50-millisecond (or other time interval) steps, and power level is defined in percent of full power. Low-load and overload conditions apply as described above. During the profiled power delivery, the tool will deliver power as per the step's power value for the time specified, then advance to the next step. A maximum energy level can also be provided in a maximum energy mode; if this parameter is set to zero, no tracking of energy delivered will be performed. The cycle is terminated when the entire power profile has been performed. If this value is non-zero, the energy delivery will be terminated if this value is exceeded.

In either power delivery scheme, inverter output power is delivered in 50-msec (or other time interval) minimum steps. A 50% duty cycle could be, for example, 50 msec ON, followed by 50 msec OFF. Resolution of power duty cycle can be any predetermined time interval, such as 1 msec. In a preferred mode, the actual power level is determined by the OFF time—for example, 50 msec ON and 1 msec OFF would be 50/51%, or a 98% duty cycle. 100% duty cycle is obtained by beginning the next 50 msec ON period immediately following the end of the present period.

In one mode of the first preferred embodiment, all error conditions registered are saved in the data memory (i.e., EEPROM's 140), and linked to a data record in which they occurred. Distinct codes for the various errors are used; for example, one code each for overload, no load, timeout, over-temperature, and other error conditions. When an error condition is registered, an on-board LED bar graph (see 212 on FIG. 5) will flash all of its eight segments at a two (2) Hertz rate, while the trigger 22 remains depressed. The error indication ceases on trigger release, and generally will not prevent subsequent operation.

An exceppion to the above statement is a work coil over-temperature condition. In this case, a distinctive LED pattern is displayed on the on-board LED bar graph 212; a "chasing" LED that travels from the lowest bar to the highest, and repeats by returning to the lowest bar, using a two (2) Hertz stepping rate. This type of display will continue until the work coil temperature falls to a safe level. Operation of the heating tool 10 will be disabled during over-temperature conditions.

In normal operation, the bar graph 212 has no indication until the trigger 22 is pulled. The operating mode chosen (potentially one of eight possibilities in a preferred mode) will be displayed as the corresponding LED "bar" illuminated. In the one-shot mode, this indication remains during the operating cycle, then extinguishes at the end of the cycle to indicate that the cycle is complete. In continuous mode, the LED bar 212 will flash on at the beginning of each cycle and extinguish at the end of each cycle.

An alternative scheme that can be incorporated in the heating tool 10 is one in which the bar graph registers the operating mode (potentially one of eight, as above) during non-triggered periods, and instead registers actual peak output power while the unit is operating. In this circumstance, peak operating power would be indicated on the "bar graph," with all appropriate bar graph elements simultaneously illuminated.

Figure 4:
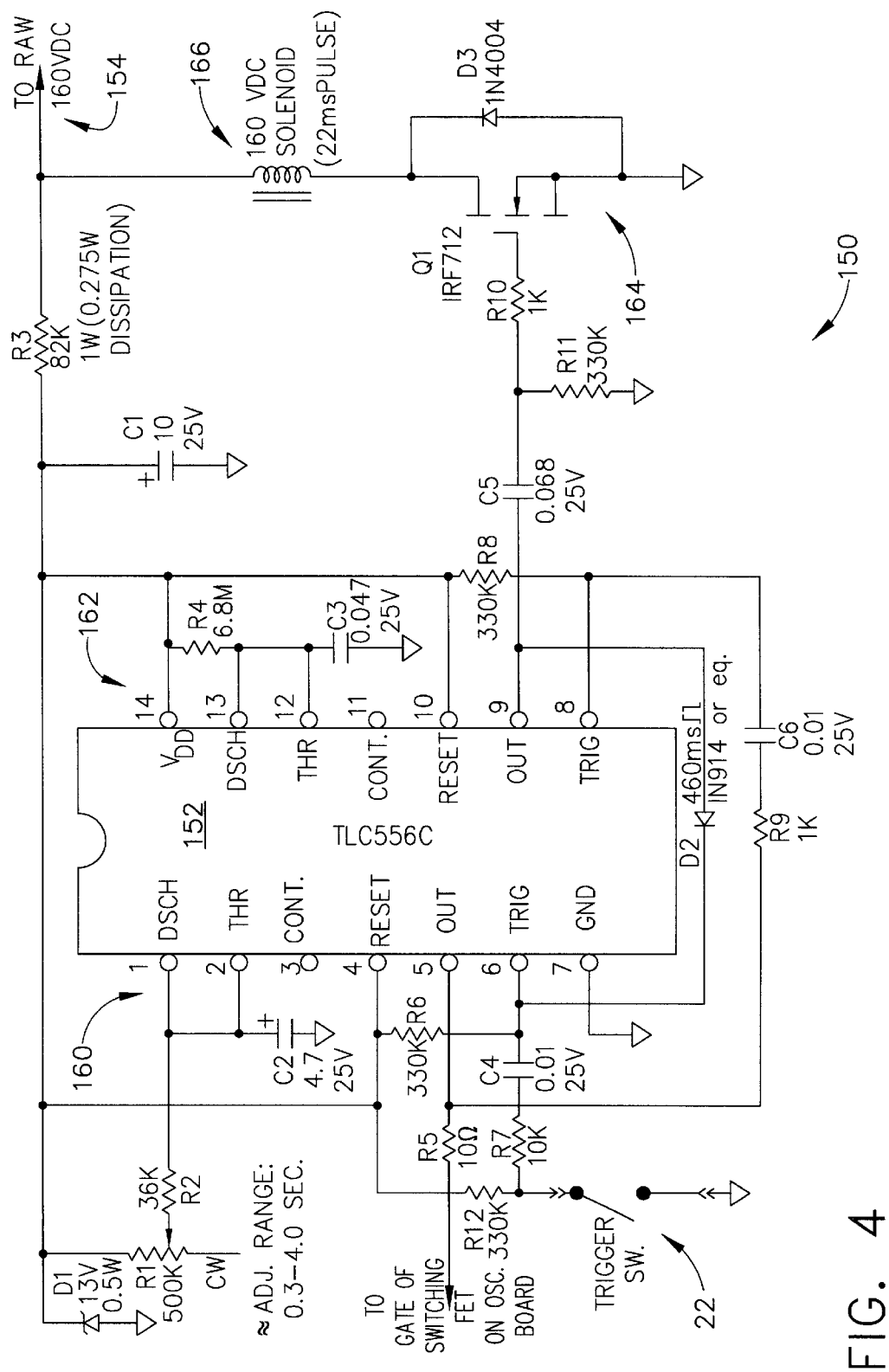
FIG. 4 is an electrical schematic diagram of a pair of timers used as an alternative control circuit of the first embodiment of the present invention.

Referring now to FIG. 4, an electrical schematic diagram 150 shows a dual 555-type timer chip that is provided at 152 to replace the controller of FIGS. 3A–3B, in an alternative embodiment. This integrated circuit device (called a "556" chip) contains two separate timers 160 and 162, and on FIG. 4 the first timer is illustrated along the left-hand side of the pin-outs (i.e., pins 1–6), while the second timer is illustrated along the right-hand side pin-outs (i.e., pins 8–13). Pins 7 and 14 are for the power supply rail and DC common.

On the first timer side, the timing elements include an adjustable resistor (or potentiometer) R1, which is connected to a 13 volt Zener diode D1. Connected to the wiper of potentiometer R1 is a fixed resistor R2 which is connected to the discharge terminal at pin 1. This is also connected to the threshold terminal at pin 2, which in turn is also connected to a capacitor C2. The potentiometer R1 is used to vary the time duration of the first timer 160, and hence the energy output of the work coil of the heating induction tool 10.

This first timer 160 also has a reset pin, a trigger pin, and an output pin. Resistor R7 and capacitor C4, along with capacitor charging resistors R6 and R12, make up the timing elements that act as a simple "one-shot" circuit that starts this first timer 160 when the trigger switch 24 is activated. This trigger switch on the schematic diagram of FIG. 4 corresponds to the trigger switch 22 illustrated in FIGS. 1 and 2.

The trigger input of the second timer 162 is fed from the output of the first timer 160, through a resistor R9 and a capacitor C6 (comprising a second simple one-shot in which R8 is a pull-up resistor). This begins the operation of the tool-inhibit timer 162, which acts to disable timer 160 for a preset time interval, to limit the operational duty cycle of the tool. This inhibit signal from timer 162 is fed to timer 160 through diode D2. With regard to the second timer 162, its threshold is set by the +13 VDC rail and through a resistor R4, which has a small timing capacitor C3.

The output pin of the second timer 162 connects to a third simple one-shot formed by a capacitor C5 and resistor R11 to drive through R10, into the gate of a MOSFET transistor Q1. This power transistor Q1 actuates a solenoid 166, and operates with a diode D3 to act as a driver 164 for the solenoid. The solenoid 166 and MOSFET driver 164 switch raw 160 volts DC, that is provided as a medium-voltage DC power rail at 154. This 160 VDC power rail 154 drives through a resistor R3, with filtering provided by a capacitor C1 to provide the 13 volt DC power rail controlled by the Zener diode D1.

The output signal of the second timer 162, as discussed above, creates a minimum OFF time between the stop of one cycle of operation of the work coil and the start of the next operation cycle of the work coil. This prevents a "quick" re-triggering action that otherwise might cause the work coil to rise in temperature too quickly. The output of the second timer 162 also provides pulses to trigger the solenoid 166.

Figure 5:
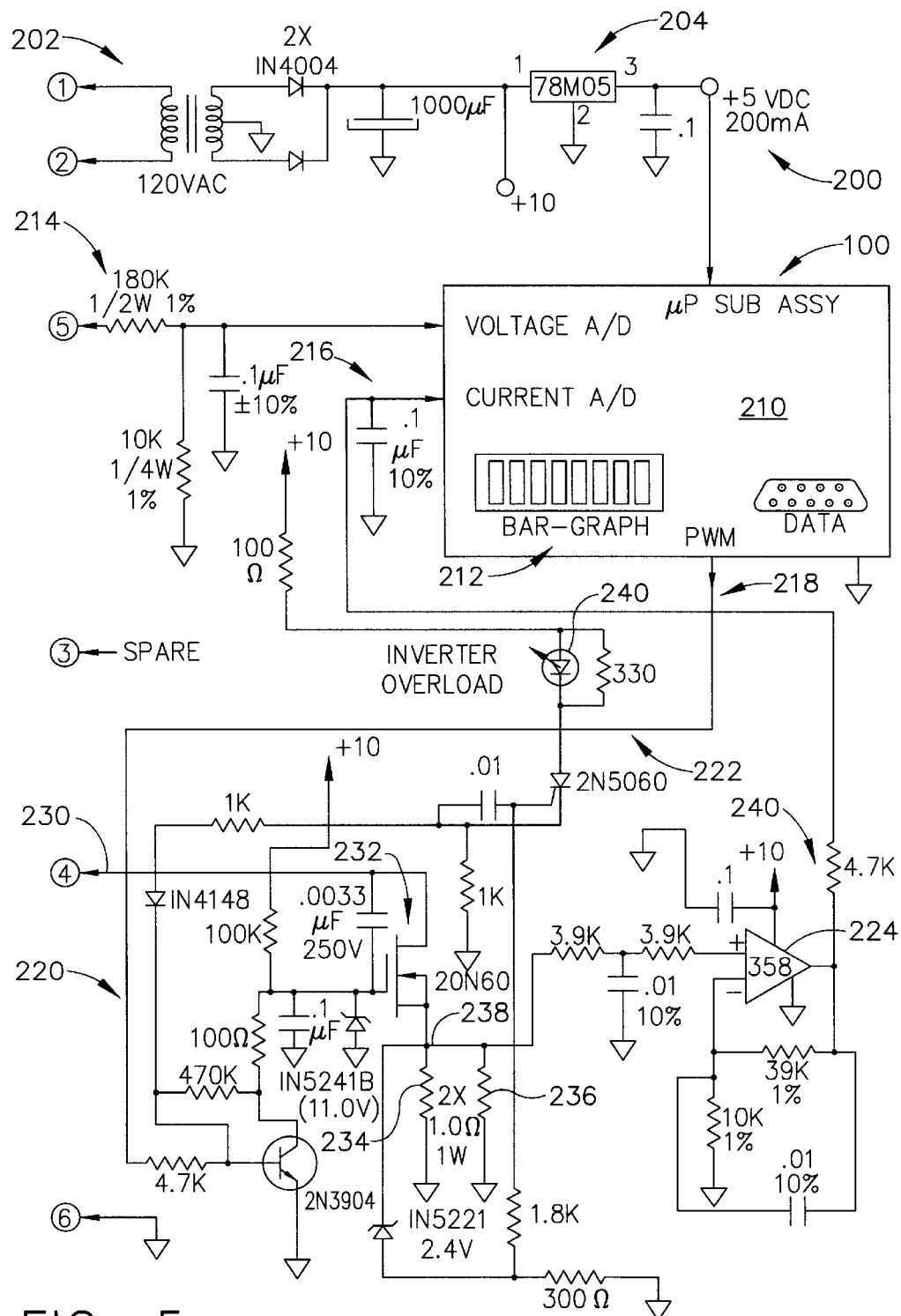
FIG. 5 is an electrical schematic diagram of an interface sub-assembly of the first embodiment.

Referring now to FIG. 5, an electrical schematic diagram 200 is provided representing an interface sub-assembly. A 120 VAC input is utilized, and is connected to a power input stage 202. This power input stage 202 includes a step-down transformer, a bridge rectifier, a filter capacitor, and a voltage regulator 204. The output of this voltage regulator 204 is a +5 volt DC rail.

A microprocessor sub-assembly 210 (which corresponds to FIGS. 3A–3B) is provided that includes a multi-segment bar graph 212 that generally comprises a series of LED's.

Microprocessor sub-assembly 210 also includes at least two A/D converters (analog-to-digital converters) that are used to detect levels of DC voltage and current. One of these inputs at 214 represents the input voltage at the power oscillator (inverter 250), which is signal-conditioned by some resistors and a filter capacitor before arriving at one of the A/D converter inputs within the microprocessor sub-assembly 210.

The load current (of inverter 250) travels through a portion 220 of this interface sub-assembly circuit, starting at a point 230, as indicated on FIG. 5. This load current travels through an FET transistor at 232, and then through two "sense" resistors 234 and 236. The "sense" voltage at the point 238 on FIG. 5 is sent through a 2.4V Zener diode to the gate of a 2N5060 SCR which can latch ON in an overcurrent condition, providing a turn-on of the 2N3904 transistor and a subsequent turn-off of the FET transistor at 232, thereby causing the tool to shut down.

The "sense" voltage 238 is provided to an amplifier stage 224, and the output of this amplifier stage 224 is provided to another of the A/D converters of the microprocessor sub-assembly 210 at a point 216 on FIG. 5. This represents the current being drawn by the power oscillator (i.e., the inverter 250 depicted in FIG. 6).

The microprocessor circuit of the microprocessor sub-assembly 210 outputs a digital signal at 218 that comprises pulse-width modulated data, also referred to as "PWM data." This pulsed signal travels through a transistor inverter/level-shifting/biasing circuit to drive the gate of the FET transistor 232. This PWM signal 218 consequently controls the duty cycle of the load current that travels from point 230 through the "sense" resistors 234 and 236. An inverter overload signal is provided at 222 when the above-mentioned SCR is latched, and an LED 240 can be provided to give a visual indication of an overload condition to the human user.

Figure 6:
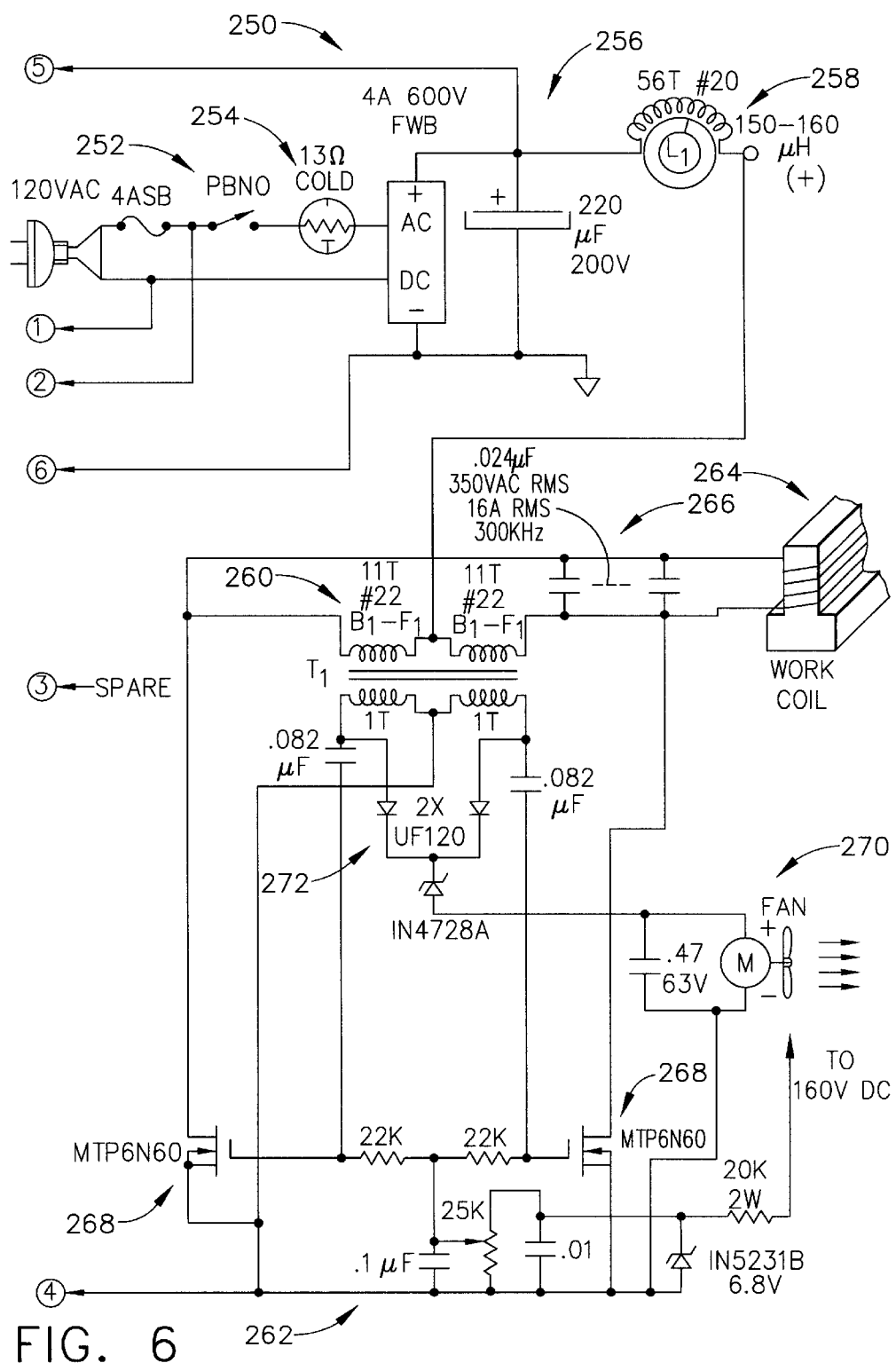
FIG. 6 is an electrical schematic of an inverter sub-assembly of the first embodiment.

Referring now to FIG. 6, an electrical schematic diagram 250 is provided showing some of the components for an inverter sub-assembly for the induction heating tool 10. A 120 VAC input power supply is used and provided through a fuse and switch circuit at 252. Switch 252 is replaced by a jumper wire when any control circuit is employed. A thermistor 254 is provided in this power circuit, as an inrush current limiter. The 120 VAC is provided to a rectifier and capacitor stage at 256 to convert the voltage from AC into direct current.

A multiple winding transformer 260 is provided as a feedback transformer. One of the windings of this transformer 260 carries some of the current provided to the work coil 264, although most of the reactive current that runs through work coil 264 is shared with the capacitors 266 on FIG. 6, which generally correspond to the capacitor board sub-assembly 44 on FIG. 2. In this manner, the coil of the transformer 260 does not need to carry the full AC current that travels through the work coil 264.

The waveform on the output leg of an inductor 258 is similar to a full-wave-rectified, unfiltered waveform. The excursions at this inductor lead, which feeds the center tap of the feedback transformer 260, are from nearly zero volts, a level that is reached at the times the FET's 268 are switching, to about 209 volts, the level reached when the work coil peak-to-peak voltage is maximum.

The FET drain leads have waveforms similar in shape to the output leg of inductor 258 except that every second "hump" is replaced by a value of nearly zero volts as the corresponding FET 268 is driven into an "ON" condition for almost a full half cycle.

At the time the output of inductor 258 is at its peak of 209 volts (in an unloaded tool) and, as mentioned above, one of the FET's 268 is ON (i.e., conducting current), one side of the work coil is forced to be at zero volts with respect to the circuit ground. The other side of the work coil is then about 209 volts above the center tap of the feedback transformer 260 primary, or at about 418 volts above ground. This produces a maximum voltage of about 418 V peak across the work coil, a voltage that diminishes to zero at the time the FET's 268 are made to switch OFF. But since normal operation of the oscillator causes the ends of the work coil to be pulled to ground sequentially, this produces a voltage doubling effect at the work coil.

Referring now to FIG. 6, note that the schematic diagrammatically depicts a work coil 264 that is connected in parallel to the feedback transformer's effectively-center-tapped primary, the FET drain leads, and the bank of resonating capacitors 266 that provides the high current levels for the work coil. The work coil has two ends, and for the first half of a given sine wave cycle, the first end is grounded through the FET 268 attached to it while current, from inductor 258, feeds the primary center tap and flows through half of this primary to the first end. While this occurs, the other side of the primary (of transformer 260) is caused, through autotransformer action of the primary, to rise to a value that is always about twice the voltage of the center tap. In this way, the second end of the work coil 264 is brought to a peak voltage of about 418 volts at the midpoint of this half cycle.

As discussed elsewhere herein, the coil/capacitor combination comprises a high-Q tank circuit making the driven impedance, seen by the second end of the feedback transformer 260 primary, quite high. During this half of the cycle, the second end has increased in voltage with respect to the first end from zero to about 418 volts, and then decreased to about zero volts. At that point, however, the second end is then grounded through the other FET 268, and current from inductor 258 (which has reached a maximum at this time) begins to flow through the other half of the primary to the second end; through similar transformer action, the voltage at the first end (with respect to the second end) rises from zero to 418 volts and then back to zero to complete the second half of this cycle.

During the second half of this cycle, the first end goes positive with respect to the second end (or the second end becomes negative with respect to the first end). Thus, if the coil voltage is measured with a floating oscilloscope having its ground lead attached to the first end, the waveform is very nearly a pure sine wave, in which the voltage waveform is about 836 volts peak-to-peak, across the tank circuit of capacitors 266 and work coil 264.

The primary center tap exceeds the DC input level during its excursions. This is caused by the fly-back action of inductor 258 as the current through it is continued for a short time after the voltage across it has reached zero, about 45° into this cycle. This forces the output of inductor 258 to become more positive than its input, thus elevating the center tap voltage even farther until the magnetic field around inductor 258 has completely collapsed. The value of inductor 258 is generally chosen to have the correct inductance to supply the needed current to the primary center tap at the 90° point in the cycle, to yield the best voltage peak for optimum circuit operation.

A fan motor 270 is driven from the low voltage side of the transformer 260, through a diode circuit 272. This fan can be optionally provided to cool the work coil 264 inside the head 50 of the induction heating tool 10 of the present invention.

Figure 7:
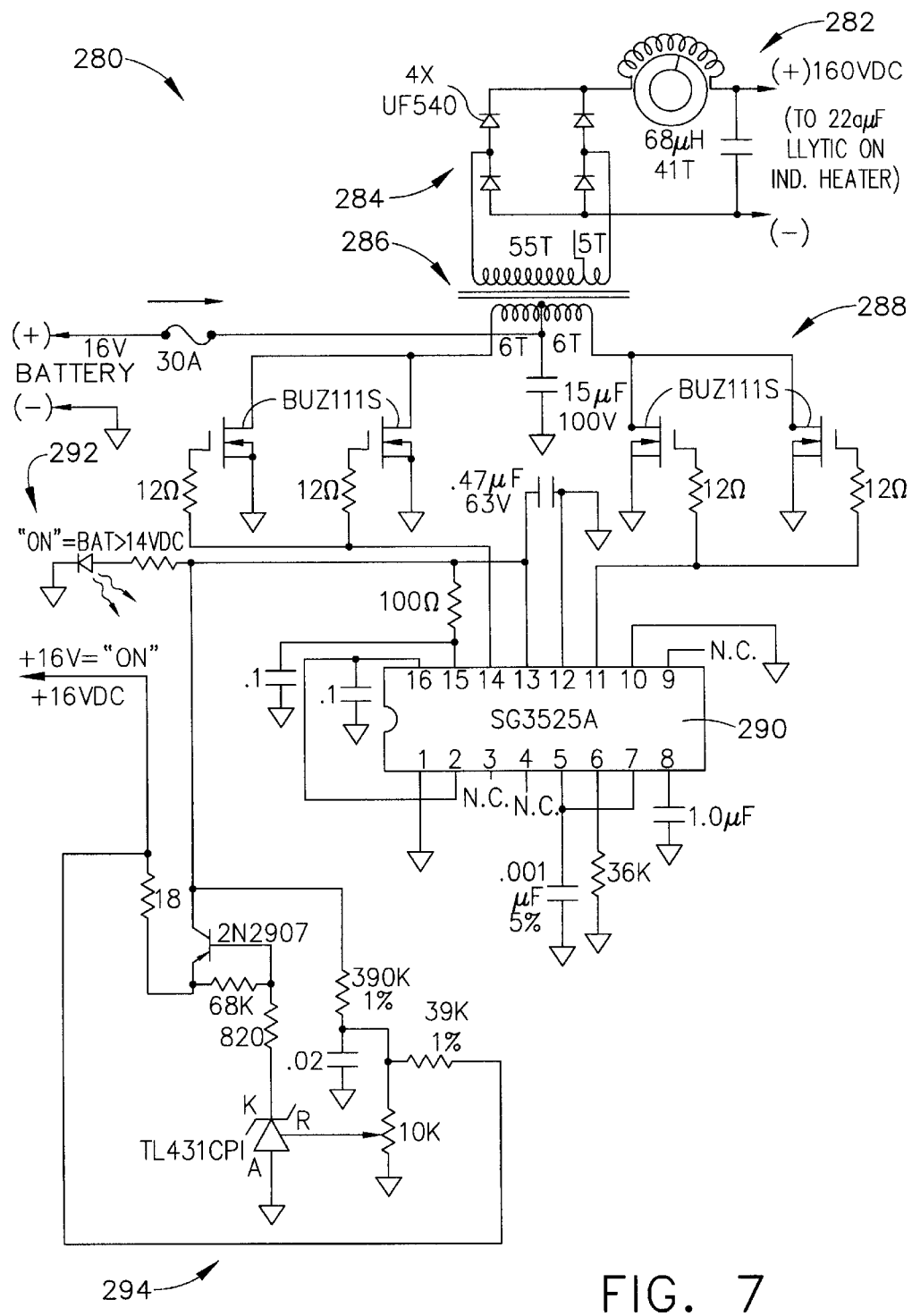
FIG. 7 is an electrical schematic diagram of another inverter sub-assembly which allows the induction heating tool to be powered by a battery.

Referring now to FIG. 7, an electrical schematic diagram 280 is provided showing the output stage of a 50% duty cycle inverter circuit used to create 160 volts DC from a battery input. The battery current runs through a fuse to the center tap of a transformer 286. The transformer 286 is used to generate the much greater voltage level required to create the +160 VDC output at 282. On the high voltage side of transformer 286 is a set of rectifier diodes 284, as well as an inductor and capacitor filter circuit at the +160 VDC output at 282.

On the low voltage side of transformer 286 is a pulse-width modulator circuit controlled by a PWM controller chip 290. The power switching transistors are FET devices, depicted at 288, along with their biasing resistors and filter capacitor. An LED indicator 292 is provided which illuminates when the battery voltage is sufficiently high. In a preferred embodiment of this circuit, the battery output voltage is 16 VDC, and the LED indicator 292 remains ON so long as the battery's voltage remains above 14 VDC.

A voltage comparison and hysteresis circuit at 294 enables and disables the PWM controller chip 290, switches the current for LED 292, and also sets the hysteresis for this voltage level indication. Using the values indicated on FIG. 7, the hysteresis is set to about 1.5 VDC. This means that in a circumstance where a battery undervoltage condition is detected (i.e., the battery voltage falls below 14 VDC), the inverter output is disabled, and remains "locked out" until the battery voltage later rises to above 15.5 VDC.

The battery-supplied inverter circuit provides the +160 VDC needed for the high voltage requirements of the present embodiments of the induction heating tool 10 that are described herein. It will be understood that other power converter circuits could be used to create a +160 VDC output from a +16 VDC input voltage, and further that all supply voltages described herein could be significantly altered in value without departing from the principles of the present invention.

Figure 8A:
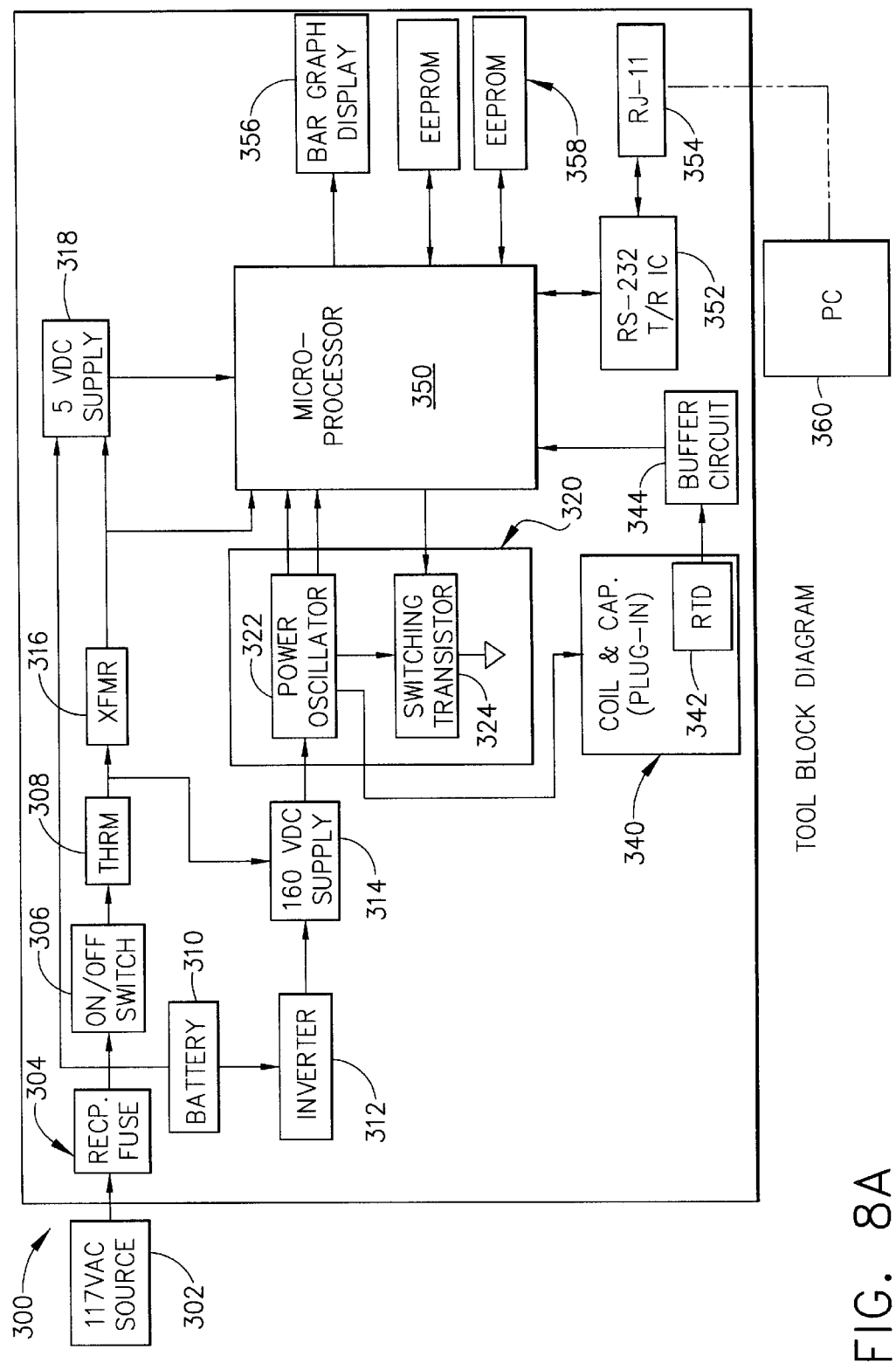
FIG. 8A is a block diagram of the main electrical components of the first embodiment of the induction heating tool of the present invention.

FIG. 8A is a block diagram 300 of the major electrical components of the first embodiment induction heating tool 10 of the present invention. Starting with a power source of 117 VAC (also sometimes referred to herein as a 120 VAC alternating current source) at 302, the line power is connected to a fuse at 304, then an ON-OFF switch at 306, and a thermistor at 308. This line voltage then drives into a transformer 316 and also into a 160 VDC power supply 314.

The heating induction tool 10 of the present invention can also be battery operated, and in that circumstance there would be no 117 VAC (or 120 VAC) source. Instead, a battery 310 is utilized, which provides direct current into an inverter stage at 312 (see FIG. 7, for example). This becomes the power source for the 160 VDC power supply 314. Either the battery 310 or the transformer 316 provides power for a +5 VDC power supply 318. This +5 volt supply provides power to a microprocessor stage 350.

The output of the 160 VDC power supply drives a power oscillator stage 322, which is the DC-to-AC inverter. A single printed circuit board 320 can contain both inverter 322 and a switching transistor 324, which is equivalent to the FET circuit at 232 on FIG. 5.

The output of inverter 322 drives a work coil and a set of power capacitors, which in combination are a tank circuit designated by the reference numeral 340. A temperature sensor at 342 (referred to herein as an RTD, or Resistive Temperature Detector) is provided at the work coil, and the output of the temperature sensor 342 is directed to a buffer circuit 344, which in turn drives an input of the microprocessor circuit 350. This typically would be an analog signal, so an A/D converter is required, either in the buffer circuit 344 or on board the microprocessor stage 350.

The first embodiment induction heating tool utilizes a multiple-segment bar graph display 356, and also uses multiple EEPROM memory chips 358. In addition, this first embodiment tool uses an RS-232 serial communications port at 352, which has an RJ-11 jack at 354. This allows the induction heating tool to be in communication with a remote computer, such as a PC at 360 on FIG. 8A.

Figure 8B:
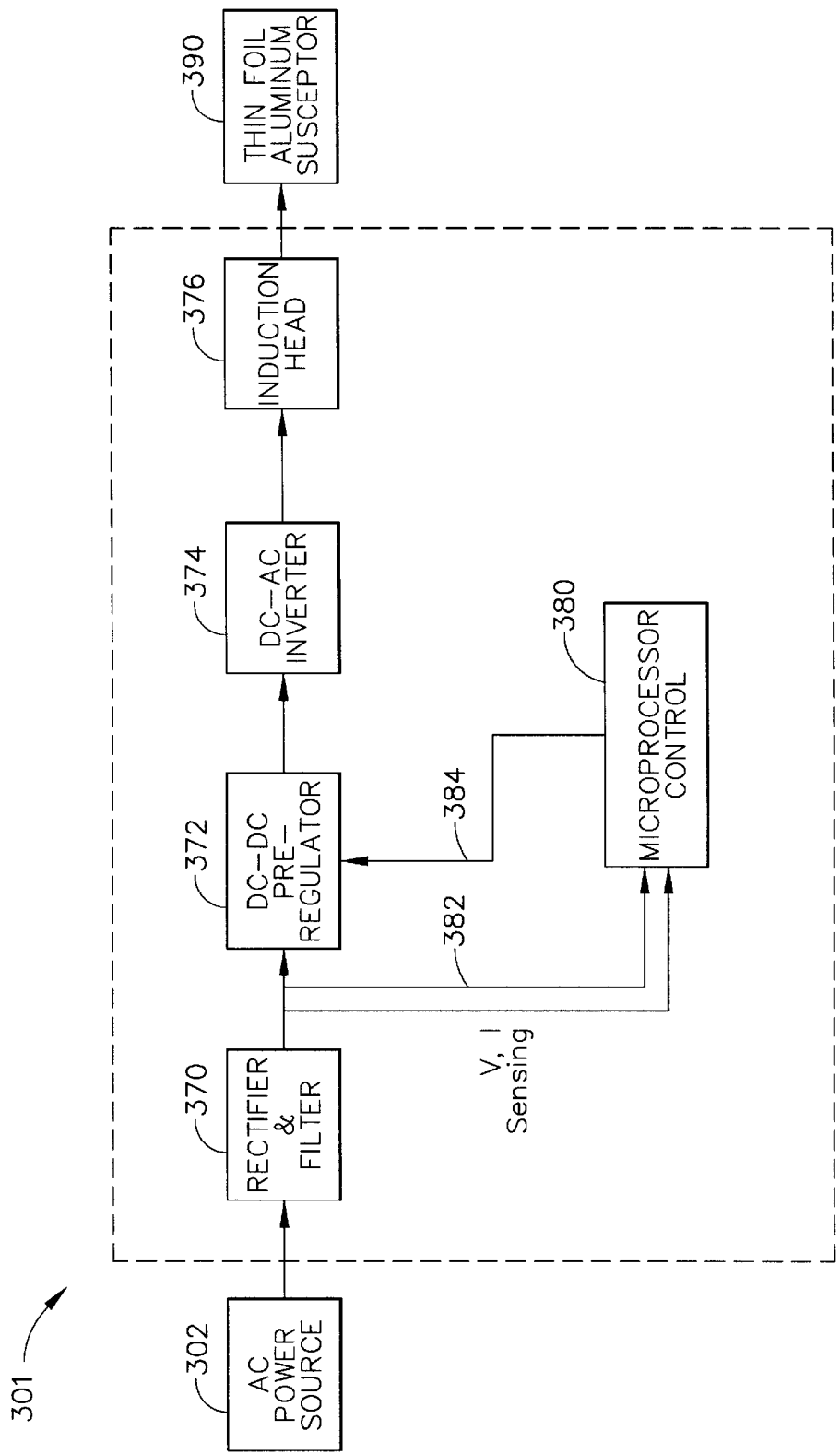
FIG. 8B is a block diagram of the main electrical components of a second embodiment of the induction heating tool of the present invention.

Referring now to FIG. 8B, a block diagram 301 is provided illustrating some of the major electrical components of the second embodiment hand held induction heating tool 10. An AC power source, such as 120 VAC line voltage, is provided to supply power to a rectifier and filter stage at 370. A DC—DC pre-regulator 372 receives direct current from the output of the rectifier/filter stage 370, and a DC-AC inverter 374 receives a controlled voltage level from the pre-regulator 372. The output of the inverter 374 is used to drive an induction head 376, which is essentially the same as the head sub-assembly 50 depicted on FIGS. 1 and 2.

The induction head 376 generates a magnetic field via a work coil (not shown on FIG. 8B, but which is part of the induction head), and this magnetic field is directed toward an aluminum susceptor 390 which includes at least one relatively thin "foil" layer of electrically conductive aluminum (but which could easily use a different material for its electrically conductive "foil" layer or layers).

A controller 380 utilizing a microprocessor is provided to detect the voltage and current parameters 382 at the input of the pre-regulator 372. Controller 380 is responsive to the sensed parameters 382, and generates a pulse-width modulated (PWM) control signal 384, having properties determined by the controller. Other methodologies could be used other than a PWM control signal, and moreover, the controller could use a logic-state machine in lieu of a microprocessor, if desired. Furthermore, the entire interface and control circuit could be constructed entirely of analog components, which is an alternative embodiment described in reference to FIG. 16.

Referring back to FIG. 8B, during operation the rectifier/filter stage 370 receives AC power from the AC power source 302. The DC—DC pre-regulator 372 pulse-width modulates the DC power signal from the stage 370 to provide a DC "power" signal of the proper magnitude to allow the DC-AC inverter 374 to energize the induction head 376 with sufficient high frequency AC power to induce heating in the thin foil Aluminum susceptor 390.

In one mode of the second preferred embodiment, the DC-AC inverter 374 operates at a nearly fixed frequency (typically in the kilohertz range). The sensed voltage and current at 382, which is at the input of the pre-regulator 372, is fed "forward" to the controller 380, which uses the sensed voltage and current to determine the proper operating parameters of the induction head 376 and provides the DC—DC pre-regulator 372 with control instructions or commands 384. The voltage and current produced by the pre-regulator 372 is varied, as necessary, to keep the input power (i.e., the input voltage and current being detected at 382) at a substantially constant value.

As described in the flow chart of FIGS. 17A–17D, the substantially constant input power consumed at the pre-regulator 372 is sufficient to generate a magnetic field at the work coil (of the induction head 376) so as to quickly induce substantial eddy currents in the foil susceptor 390, thereby causing the susceptor to quickly rise in temperature. The amount of time that the eddy currents are induced by the magnetic field is controlled by controller 380, and this time is limited to an interval that both insures that a "good" bond is created by the adhesive affixed to the foil susceptor 390, and insures that the foil is not overheated to a point that it entirely melts (or explodes), which potentially could cause the adhesive material to burn.

Figure 14A:
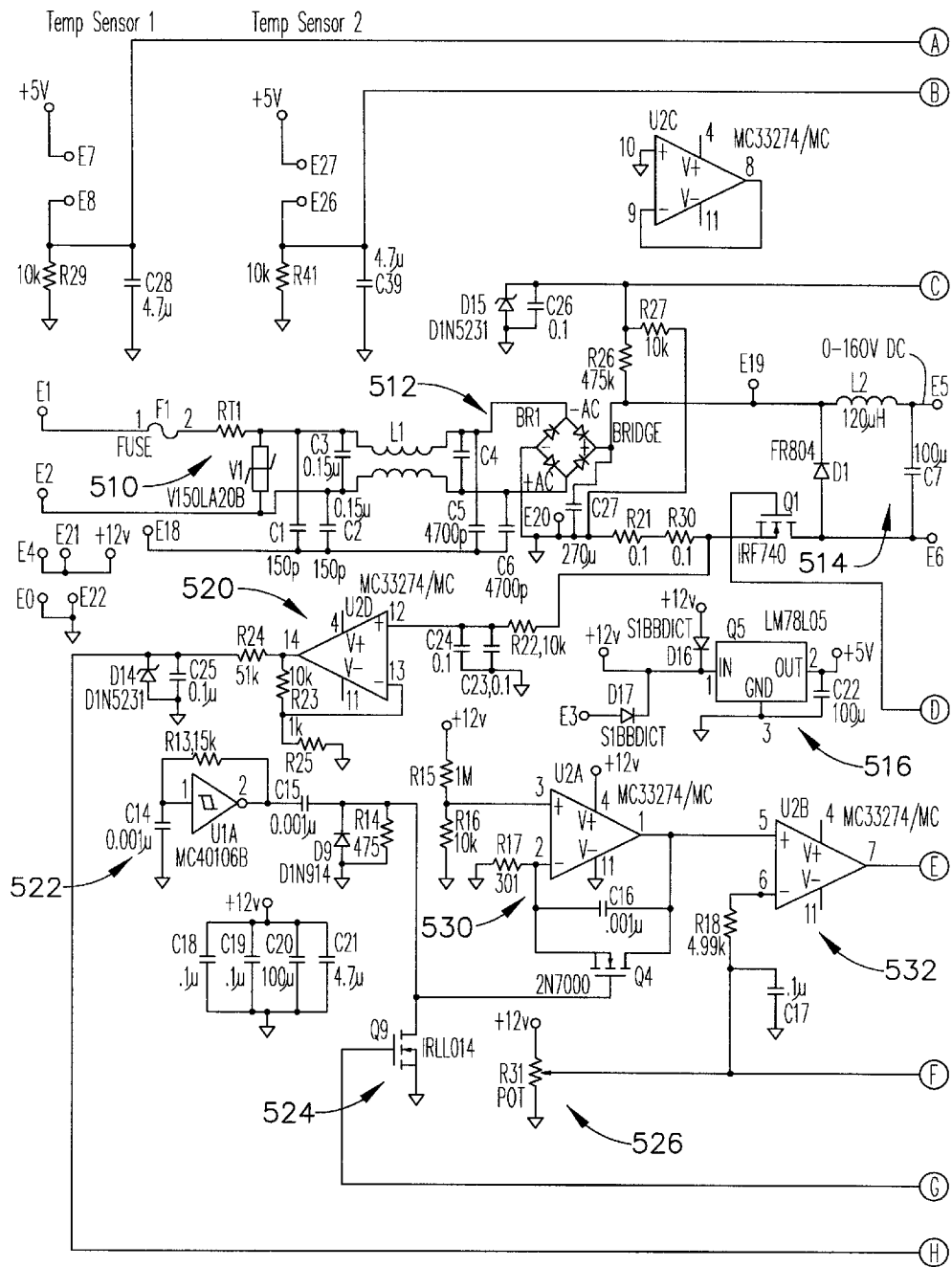
FIGS. 14A–14B are an electrical schematic diagram showing the logic and memory components, as well as the power and interfacing components, of a second embodiment of the induction heating tool of the present invention.
Figure 14B:
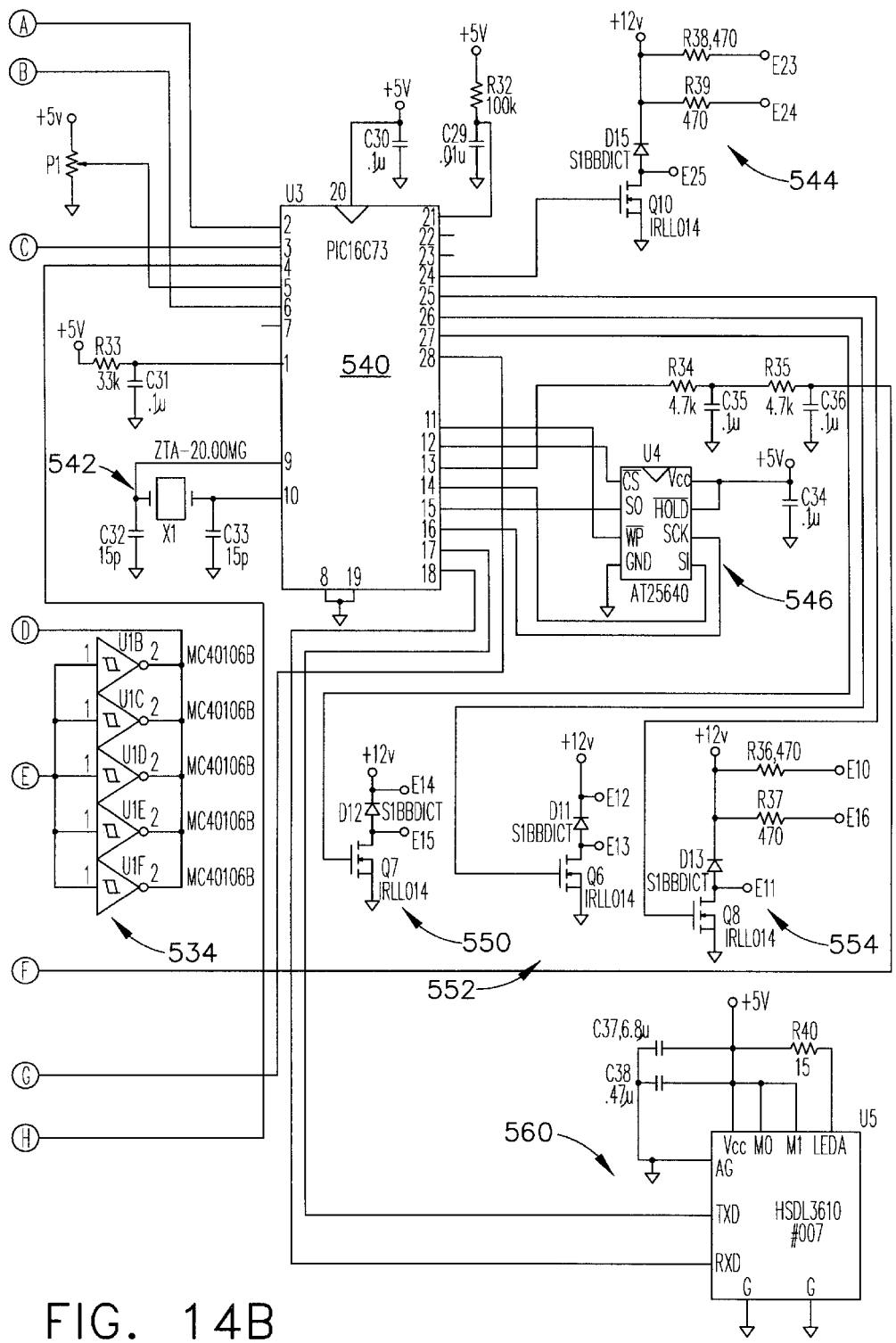

An example circuit constructed according to the general principles of this block diagram is illustrated on FIGS. 14A–14B, and this circuit is described in greater detail. It will be understood that portions of this block diagram of FIG. 8B could be significantly modified without departing from the principles of the present invention. For example, the power supply could be a battery, or even a solar panel. On the other hand, the "feed-forward" characteristics of the block diagram, by use of the current and voltage information provided at 382, is a unique design in the field on induction heating tools, which allows the present invention to forego the use of more expensive sensors, such as a current transformer to detect the high currents of the induction head.

While the above discussion of FIG. 8B describes a "feed-forward" configuration for controlling the power supplied to the induction head 376, it will be understood that a "feedback" configuration could nevertheless be used in accordance with some of the other principles of the present invention. The "ramp control" and "distance detection" aspects of the present invention (which are described below in greater detail) are novel features that could be combined with a feedback control system to effectively operate the induction head 376 (which contains the work coil). For example, on FIG. 8B the voltage and current sensing information comes from the input side of the pre-regulator 372, while the control action takes place "downstream" from that point (i.e., at the control signal 384), thus making this a "feed-forward" device.

However, if the voltage and current sensing information were to instead come from a location that is downstream from the control point (i.e., the control action would then take place "upstream" from the sensing point), then a "feedback" configuration would result. This could easily be done by looking at the voltage and current at other locations in the circuit, such as the output side of the pre-regulator 372, the output side of the inverter 374, or the output side of the induction head 376. One word of caution is in order; the power input to the pre-regulator 372 can quickly increase if one is using such a feedback configuration. This increasing power can become quickly destructive if steps are not taken to control the current input at the pre-regulator 372; by the time the feedback information has been provided to the controller 380, it could be too late to prevent an overcurrent condition at the pre-regulator input. Therefore, it is best to provide some type of current limiting circuitry when using the feedback configuration.

In eddy current induction heating applications where the heated piece, or susceptor, cannot be placed inside the work coil where the magnetic field strength is maximum, power transfer efficiency is reduced. In the present invention, the susceptor foil is quite thin, and relatively little power is required to create significant eddy currents that result in development of high temperatures.

Figure 12:
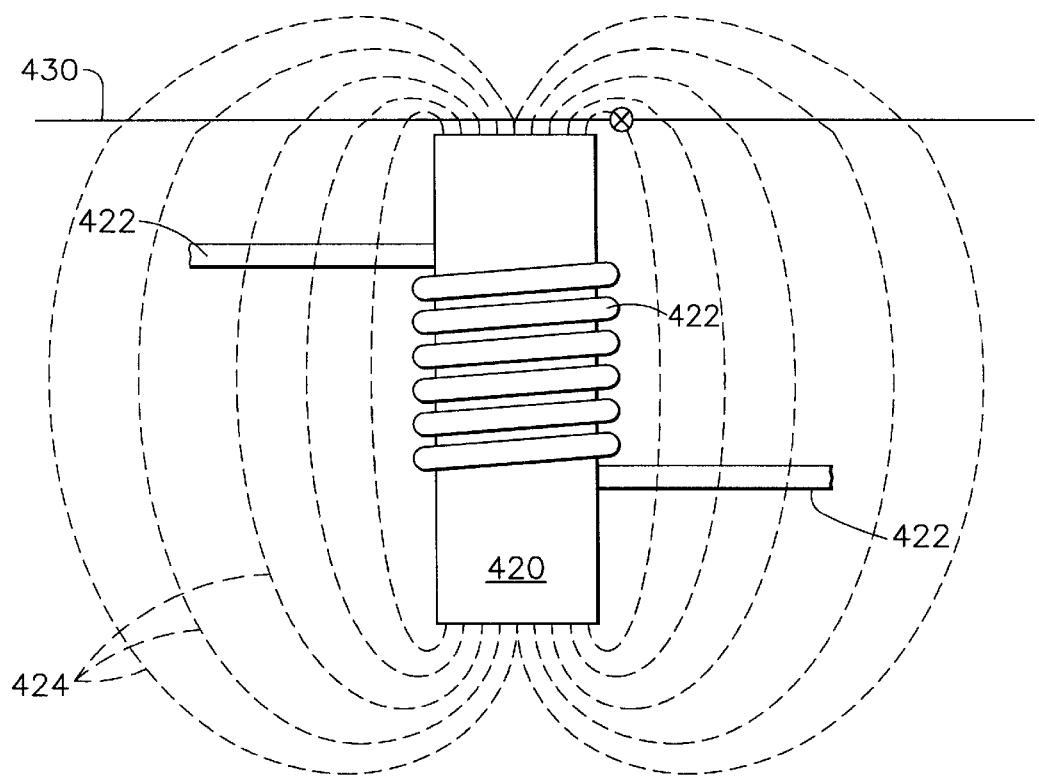
FIG. 12 is a diagrammatic view of the side of a work coil that emits magnetic field lines into a susceptor.

The heating of a thin susceptor may be understood in terms of the currents induced in it by the time-varying magnetic flux from the drive head pole piece. From Maxwell's equations for electromagnetic fields, the electric field induced by a time-varying magnetic flux is given by:

$$\int E \cdot dl = d\Phi dt,$$

where the integral of the electric field E is taken around any closed path in space and Φ is the magnetic flux linked through that path. In FIG. 12, the flux 424 generated by a simple cylindrical electromagnetic pole 420 is illustrated. It is cylindrically symmetric around the axis of the pole. The induced electric field lines 400 are therefore cylindrically symmetric, as shown in FIG. 9 which is viewed looking down on the centerline of the pole piece.

When a relatively thin susceptor 430 is placed in the region near the pole piece as shown in FIG. 12, the magnetic flux penetrates through the susceptor, and an electric field is induced in the susceptor according to Maxwell's equation. The electric field causes circulating, or eddy, currents to flow in the susceptor. The current density is a product of the electric field and the resistivity of the conductor material. The current density can be represented as a vector in the same direction as the electric field. If the susceptor is wide with respect to the magnetic flux distribution and perpendicular to the axis of the pole piece, then the electric field 400 and the resulting current density distributions will be nearly circular, as shown in FIG. 9.

In FIG. 12, a cylindrical ferrite rod 420 is magnetically driven by an alternating current flowing through a wire-wound coil 422 wrapped around the rod. The combination of the ferrite rod 420 and coil 422 comprises one implementation of a "work coil." The susceptor 430 is considered to be an infinite uniform sheet at the distances of this discussion. The susceptor 430 is illustrated in this view edge-on, and is spaced apart from the proximal end of the rod 420 at a distance of about one-eighth inch (about 3 mm). When an alternating current is driven through the electrically conductive coil 422, a magnetic field is created, represented by "lines" of force generally indicated by the curves 424.

Figure 9:
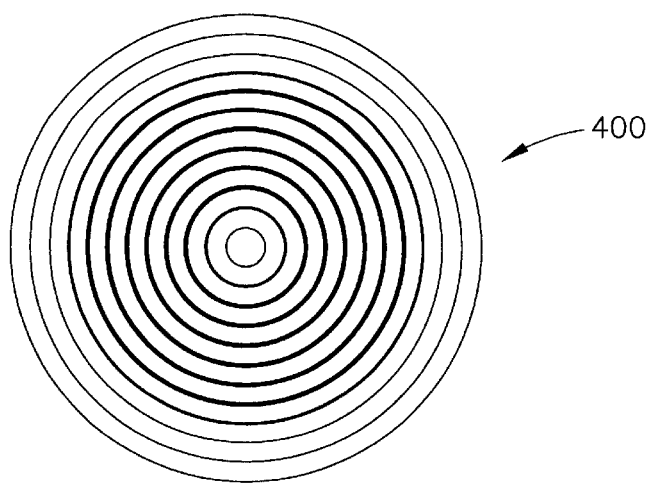
FIG. 9 is a diagrammatic view of current densities in an infinite sheet susceptor used in the present invention.
Figure 13:
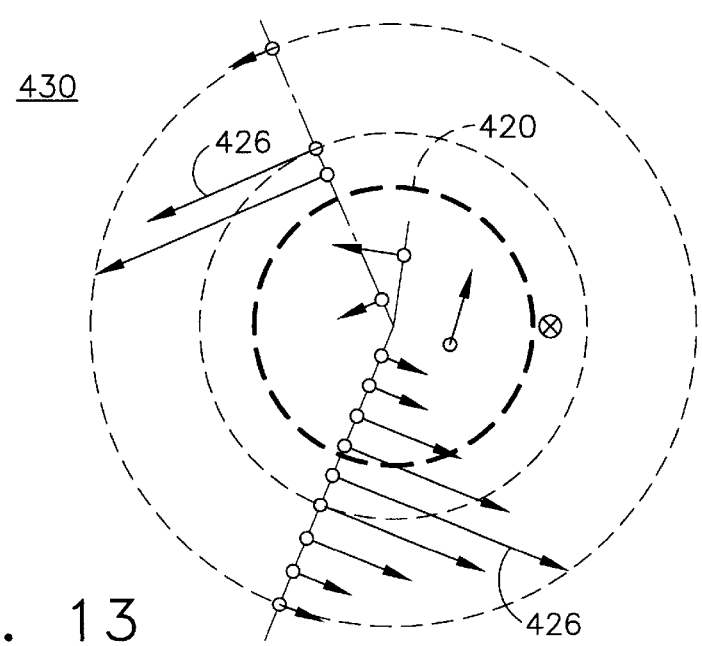
FIG. 13 is a top view of an infinite sheet susceptor illustrating approximate relative forces on free electrons within a susceptor immediately above, and axially centered on, a magnetic dipole.

In FIG. 9, the flux linked by closed circular paths near the centerline of the pole piece will link only a small magnetic flux, and the resulting electric fields and current densities will be low—approaching zero at the centerline. For closed paths of larger radius, the flux linked will be larger and the current density will also be larger. A maximum is reached at the closed path having a radius approximately equal to the pole piece radius at about the point where the flux begins to return in the reverse direction through the susceptor (near the crossed dot symbol $\otimes$ in FIG. 12) and, from that point out the electric field and current density will decrease. A notional distribution of the electric field and current densities 426 is shown in FIG. 13. The power dissipation in the susceptor varies as the current density squared and is proportional to the resistivity of the susceptor material. The susceptor is thus heated in a ring or "donut" pattern that reflects the electric field distribution induced by the flux distribution.

Figure 10:
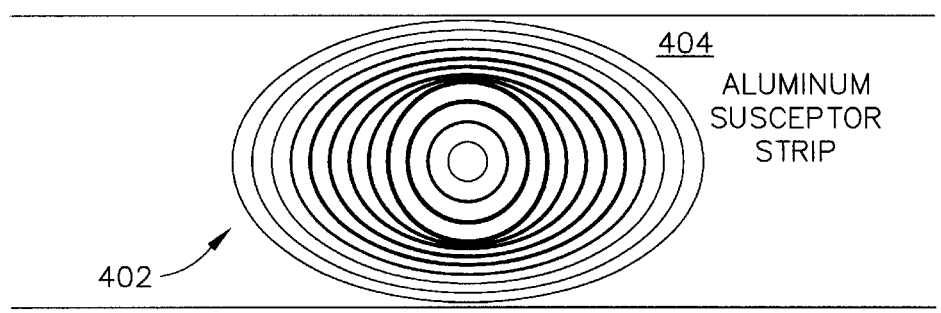
FIG. 10 is a diagrammatic view of the current densities in a relatively smaller-width susceptor used in the present invention.

If the susceptor is relatively narrow with respect to the magnetic flux distribution (see FIG. 10), then the induced electric current must all return along the edge of the susceptor 404, and the electric field lines 402 become somewhat distorted, as shown in FIG. 10. The current density along the edge can be significantly higher than it is elsewhere in the susceptor 404, and the edge is preferentially heated.

Figure 11:
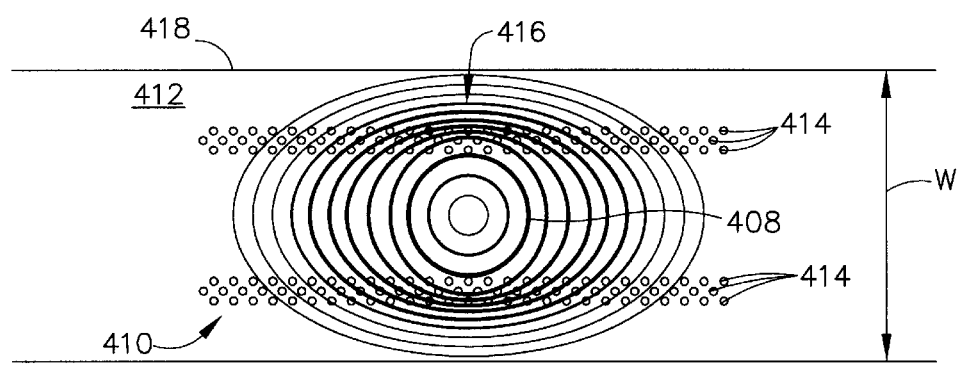
FIG. 11 is a diagrammatic view of current densities in a susceptor that is relatively smaller in width and includes holes or cut-outs, as used in the present invention.

To diminish uneven heating, the oval current paths 402 can be modified to have resistivities in the susceptor regions between the edges and the center that are made higher by the introduction of small holes or openings 414 (see FIG. 11) placed along the length of a susceptor 412. The above-noted Boeing patents use openings in susceptors to address this issue. The electric field lines 410 are not greatly affected near the center of the susceptor, e.g., the lines at 408 or closer to the center.

Closer to the edge, however, the current densities are somewhat reduced by the greater resistively created by holes 414, in the area generally designated by the reference numeral 416. To accomplish this, current density reduction is desired from about the third representative ring 408, outward. For one approach, this requires that holes 414 be placed along the length of the strip in parallel lines, but not near the edge 418 where increased resistivity would cause even further heating disparity across the width "W" of susceptor 412. Another approach is to locate a single row of holes/openings along the centerline of susceptor 412.

Referring now to FIGS. 14A–14B, an electrical schematic 500 of a second preferred embodiment of the present invention is illustrated. Line voltage power from a 120 VAC electrical outlet enters a printed circuit board (not shown in a structural drawing) at terminals E1 and E2, then through a fuse F1, and a current limiting thermistor RT1, and across a varistor V1. This is the beginning of a power input circuit 510. The AC power is filtered by capacitors C1–C6 and an inductor L1 to remove differential-mode noise and common-mode noise. A full bridge rectifier BR1 rectifies the filtered 120 VAC, which is again filtered by a bulk capacitor C27 to remove much of the 120 Hz ripple.

A regulated positive 5 VDC power supply is provided at 516, and mainly consists of a standard linear voltage regulator chip at Q5. Its input power supply is the +12 VDC rail that drives most of the analog chips in the circuit 500. Polarity protection diodes D16 and D17 are provided, as well as a filter capacitor C22 at the +5 VDC output rail. In an exemplary construction, additional filter capacitors C18–C21 are provided across the +12 VDC rail at various physical locations on the printed circuit board of this second preferred embodiment.

The voltage across C27 forms a DC input voltage to a buck converter 514 which is formed by a switching MOSFET Q1, a free-wheeling diode D1, an inductor L2, and a filter capacitor C7. The MOSFET Q1 switches at approximately 75 kHz and has a controlled duty cycle varying from 0% to 100%. The voltage across C7 is equal to the MOSFET duty cycle times the voltage across C27. A duty cycle of 0% implies that the switch is completely off and the output voltage across C7 is 0V. A duty cycle of 100% implies that the switch is completely on and the output voltage across C7 is ideally equal to the voltage across C27. At 100% duty cycle, the buck converter supplies about 160 volts DC at the terminals E5 and E6 (across C7). At lower duty cycles, the apparent voltage supplied by buck converter 514 will be less than 160 VDC, and this apparent voltage will be substantially equivalent to 160 volts times the duty cycle at a particular time interval.

It will be understood that the voltage output from buck converter 514 is a variable DC voltage. However, it will be understood that an appropriate output could be provided using other circuit topographies of power converters, without departing from the principles of the present invention.

When the MOSFET Q1 turns on, current flows from C27 through the inductor L2, thereby charging C7 and also flowing through the load (at terminals E5 and E6) parallel to C7. The return path to C27 is through current sense resistors R21 and R30. When the MOSFET Q1 turns off, the stored energy in the inductor L2 discharges and a free-wheeling current flows through C7 and the parallel load in a circular path through the free-wheeling diode D1 until the MOSFET Q1 turns on again. This repetitive action provides a variable DC output voltage at the output of C7 and across the load at E5–E6 (which are the same connecting points as J3 and J6 on FIG. 15).

The MOSFET Q1 is controlled by a combination of analog and digital circuitry comprising a 75 kHz clock at 522, an integrator 530, a comparator 532, and a high-current MOSFET gate driver 534. The 75 kHz clock comprises a Schmidt Trigger inverter U1A, a timing capacitor C14, and a timing resistor R13. The resulting square-wave signal is modified by C15, R14, and D9 to provide 75 kHz spikes that trigger a transistor Q4 to reset the integrator 530 comprised of an op-amp U2A, an integrator capacitor C16, an integrator resistor R17, and bias resistors R15 and R16.

The output of U2A is a 75 kHz saw-tooth waveform that is used as the positive input to the pulse-width-modulating comparator 532 that uses an op-amp U2B. The negative input to pulse-width-modulating comparator 532 is an analog signal between 0V and 5V that is generated by a microprocessor U3 (at 540), and filtered by R18 and C17. The comparison of the microprocessor-generated analog signal and the saw-tooth waveform provides a 75 kHz square wave at the output of pulse-width-modulating comparator 532 that has a duty cycle proportional to the level (or magnitude) of the analog signal. This square wave output signal is buffered by Schmidt Trigger inverter stages U1B–U1F at 534 to provide a high-current square-wave drive signal to the gate of MOSFET Q1.

The DC voltage across C27 is scaled by resistors R26 and R27 and filtered by a capacitor C26. A Zener diode D15 limits the voltage across C26 to 5.1 VDC in case of a surge condition. The voltage across C26 is sensed by an input port on the microprocessor U3. The current flowing through the MOSFET Q1 is also flowing through resistors R21 and R30, while a resistor R22, and capacitors C23, and C24 filter the voltage drop across the combination of R21 and R30 before being directed to an op-amp U2D.

An amplifier stage 520 comprising op-amp U2D, and resistors R23 and R25 multiplies the filtered voltage from the current shunt by a gain of five. A resistor R24 and capacitor C25 filter the current-sense signal again. A Zener diode D14 limits this voltage in case of a high current condition. The current-sense signal is then sent to an input port on the microprocessor 540. Microprocessor 540 (U3) detects the current and voltage at the input to the buck converter 514 to predict and/or characterize the power supply and to provide the proper analog control signal to the pulse-width-modulating comparator U2B, at 532.

An unused stage of the quad op-amp chip U2 is depicted at U2C. Its positive input is connected to DC common, and its negative input is directly connected to its output.

Two temperature sensor inputs are provided to the microprocessor 540, in which thermistors (not shown in the schematic 500) are connected at terminals E7–E8 (for the first thermistor) and E27–E26 (for the second thermistor). These temperature analog signals are signal-conditioned by R29 and C28 for the first thermistor, and R41 and C39 for the second thermistor. One thermistor monitors the temperature of the head 50 of induction heating tool 10, while the other thermistor monitors the ambient air temperature at the case of tool 10.

The processing circuit on FIGS. 14A–14B comprises the microprocessor 540 (U3), along with a crystal oscillator X1, and capacitors C32 and C33, which make up the clock circuit 542. Also included in the processing circuit are various other interfacing or filter resistors and capacitors, such as R33, C31, C30, R32, and C29. Further, a filter converts a digital output from the microprocessor 540 to an analog signal used to control the duty cycle of the MOSFET Q1. This filter is made up of resistors and capacitors R34, R35, C35, and C36.

A memory circuit 546 is also provided for use by the processing circuit. In this second preferred embodiment, a serial EEPROM designated U4 is used. This single chip contains sufficient memory storage capacity to hold the important variables utilized by the induction heating tool, although certainly additional memory chips could easily be added to store greater amounts of operating data, if desired. A small filter capacitor C34 is provided on the +5 VDC power rail at the EEPROM chip.

It will be understood that the microprocessor 540 could be provided with on-board memory, such as EPROM or EEPROM to store operating parameters and perhaps some accumulated data. In such a microprocessor, the serial EEPROM memory chip U4 could be eliminated in models of the heating tool that do not require historical operating data to be stored and later downloaded to a host computer.

A serial communications port 560 is provided, comprising an infrared serial interface chip U5, and associated interface passive components R40, C37, and C38. The use of this type of infrared communications port allows a host computer (e.g., a PC or workstation) to be connected to the induction heating tool 10 without any possibility of transferring an undesirable voltage into the host computer while the tool 10 is operating on line voltage.

A variable resistor R31 (e.g., a potentiometer) is provided for setup purposes. The circuit power operation can be manually controlled by this pot R31 without the microprocessor even being installed in the circuit, if desired for experimentation or setup purposes. Once production units are being assembled, pot R31 may well be eliminated from the circuit board if it becomes redundant.

A power control potentiometer P1 is provided so the user can adjust the output power by about ±20%, and this adjustment can be made between each "shot" of the induction heating tools, if desired. An FET transistor Q9 at 524 is provided as a safety shutdown device. Q9 can disable the PWM clock at U1A, if necessary.

The microprocessor 540 also controls four digital outputs at 544, 550, 552, and 554. These outputs (via an FET transistor, part number IRLL014) drive: (1) the fan 56 (see FIG. 2); (2) the tactile feedback solenoid or buzzer device 26 (see FIG. 2); (3) the LED's at 34 on FIG. 2, which provide status and "fault" information; and (4) the LED's at 64 on FIG. 2, which provide illumination of a work piece for a user working in a dark room. The status or fault LED's 34 are typically provided in red, while the illumination LED's 64 are typically provided in both blue and yellow colors.

The signal line at pin 3 of microprocessor 540 carries an analog signal that represents the input voltage magnitude of the buck converter 514. This information is used in the software control program, as discussed in reference to FIGS. 17A–17D, at the step 758. The signal line at pin 4 of microprocessor 540 carries an analog signal that represents the input current magnitude of the buck converter 514. This information is used in the software control program, as discussed in reference to FIGS. 17A–17D, again at the step 758.

It will be understood that many of the circuit components found in the schematic diagram 500 could be replaced by a logic state machine circuit, or other similar logic device available today, or available in the future. Such a substitution of components or an enhancement of logic and interface components is contemplated by the inventors. Moreover, the entire circuit could be implemented with an analog circuit, an example of which is discussed in detail below, with reference to FIG. 16.

Figure 15:
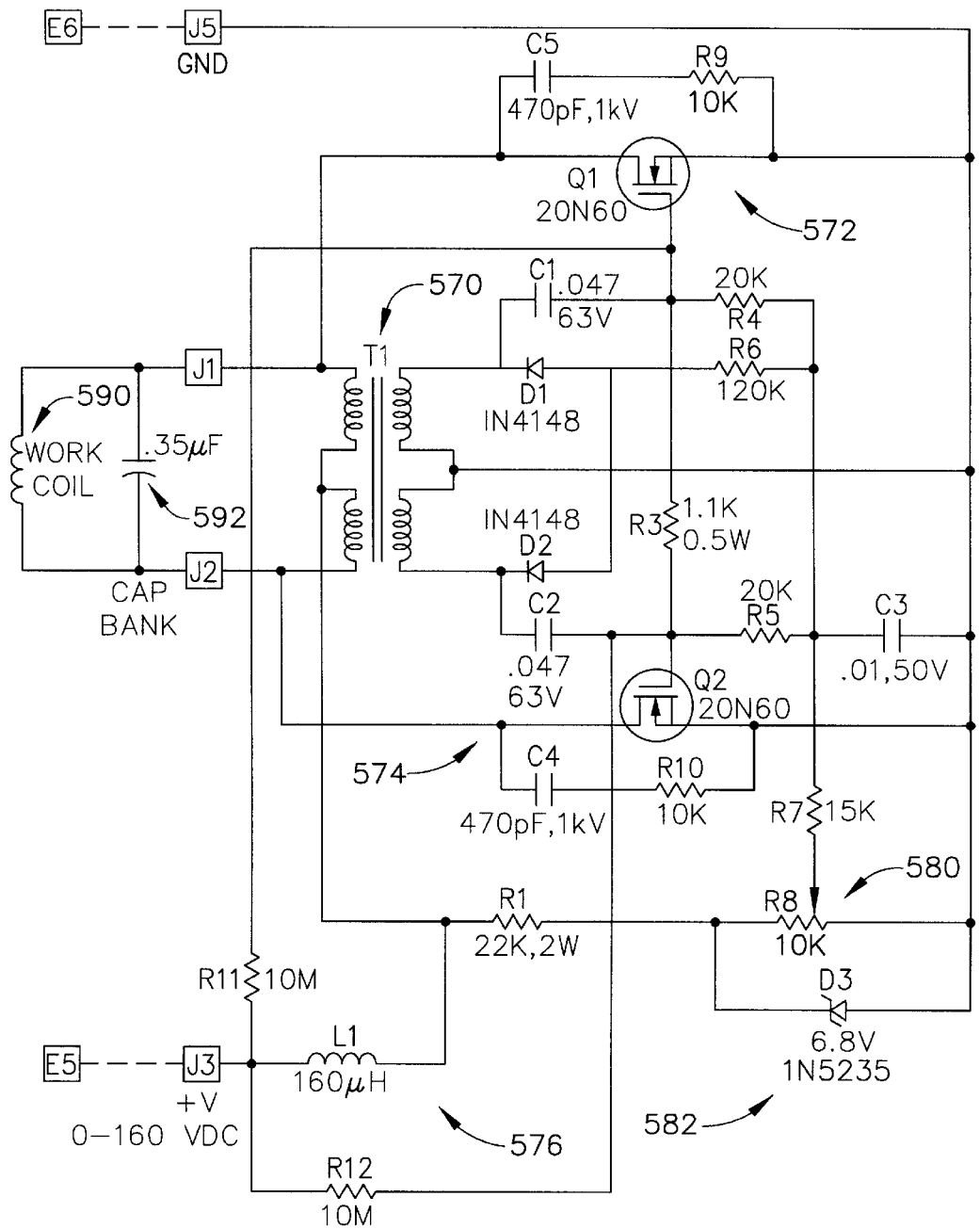
FIG. 15 is an electrical schematic of a high frequency oscillator used as an inverter in conjunction with the electrical schematic of FIGS. 14A–14B.

Referring now to FIG. 15, the current-source parallel-resonant inverter power oscillator stage comprises an input current smoothing choke L1, MOSFET transistors Q1 and Q2, and a feedback transformer T1 which provides a voltage-multiplying function to increase the resonant tank voltage and also provide dual inverted MOSFET gate drive signals. The MOSFET's Q1 and Q2 each require a series resistor-capacitor snubbing circuit. For Q1, the snubbing circuit 572 includes C5 and R9; for Q2, the snubbing circuit 574 comprises C4 and R10. It will be understood that, if desired, these "power" components could be mounted on a separate printed circuit board (or other structure) from the "logic board" described in the schematic drawing of FIGS. 14A–14B that contains mainly low power components.

The gate drive signals from the transformer T1 of the inverter power output portion 570 are conditioned by the bias networks comprising D1–D3, C1–C3, R1, and R3–R8. R8 is an adjustable resistor element, such as a potentiometer at 580, and D3 is a Zener diode used at 582 to create a bias voltage source.

A set of bias resistors R11 and R12 provide extra bias voltage to the MOSFET gates when the DC input voltage to the oscillator is low to aid in the starting of the oscillator. The DC input to the inverter enters through terminals (on this board) J3 and J5. The resonant tank is connected between terminals J1 and J2.

The resonant tank circuit is made up of a high qqality-factor inductor 590 in parallel with a capacitor (or capacitors) 592. The inductor 590 is the "work coil," which transfers energy to the susceptor (not shown on this drawing). The values of the inductor and capacitor(s) are chosen, in one configuration of this second preferred embodiment, to achieve a 130 kHz resonant frequency in order to more effectively transfer energy to the chosen susceptor. In this embodiment, the overall capacitance is about 0.35 $\mu$F, and multiple physical capacitors are used in parallel with one another (see the capacitor board 44 on FIG. 2). The work coil 590 on this schematic diagram of FIG. 15 essentially comprises the electrically conductive windings 52 (on FIG. 2) of Litz wire.

It will be understood that different component values and types of electronic logic gates and analog stages could be used in the circuits of FIGS. 14 and 15 without departing from the principles of the present invention. As stated above, the illustrated embodiment comprises a second preferred embodiment, and many other, but similar, embodiments could be constructed that would operate in a similar manner.

It will be further understood that the operating frequency stated above of 130 kHz is a desired operating frequency for a particular construction of the second preferred embodiment of the present invention, however, this is a "design frequency" only and when production units are built, their actual operating frequencies will not likely be exactly 130 kHz, due to component value variations if for no other reason. Moreover, the induction heating tool of the present invention is able to operate over a very wide range of frequencies (such as below 1 kHz to greater than 1 MHz), without departing from the principles of the present invention. It is contemplated that various styles of susceptors could be effectively actuated by a single induction heating tool producing a magnetic field at a single output frequency, however, it also is contemplated that certain styles of susceptors may work better with one or more induction heating tools that operate(s) at more than one frequency to induce the eddy currents in the susceptors. In this circumstance, the operating head 50 (see FIG. 1) could be made to be interchangeable, if desired, to change the output frequency of the induction heating tool.

Figure 16:
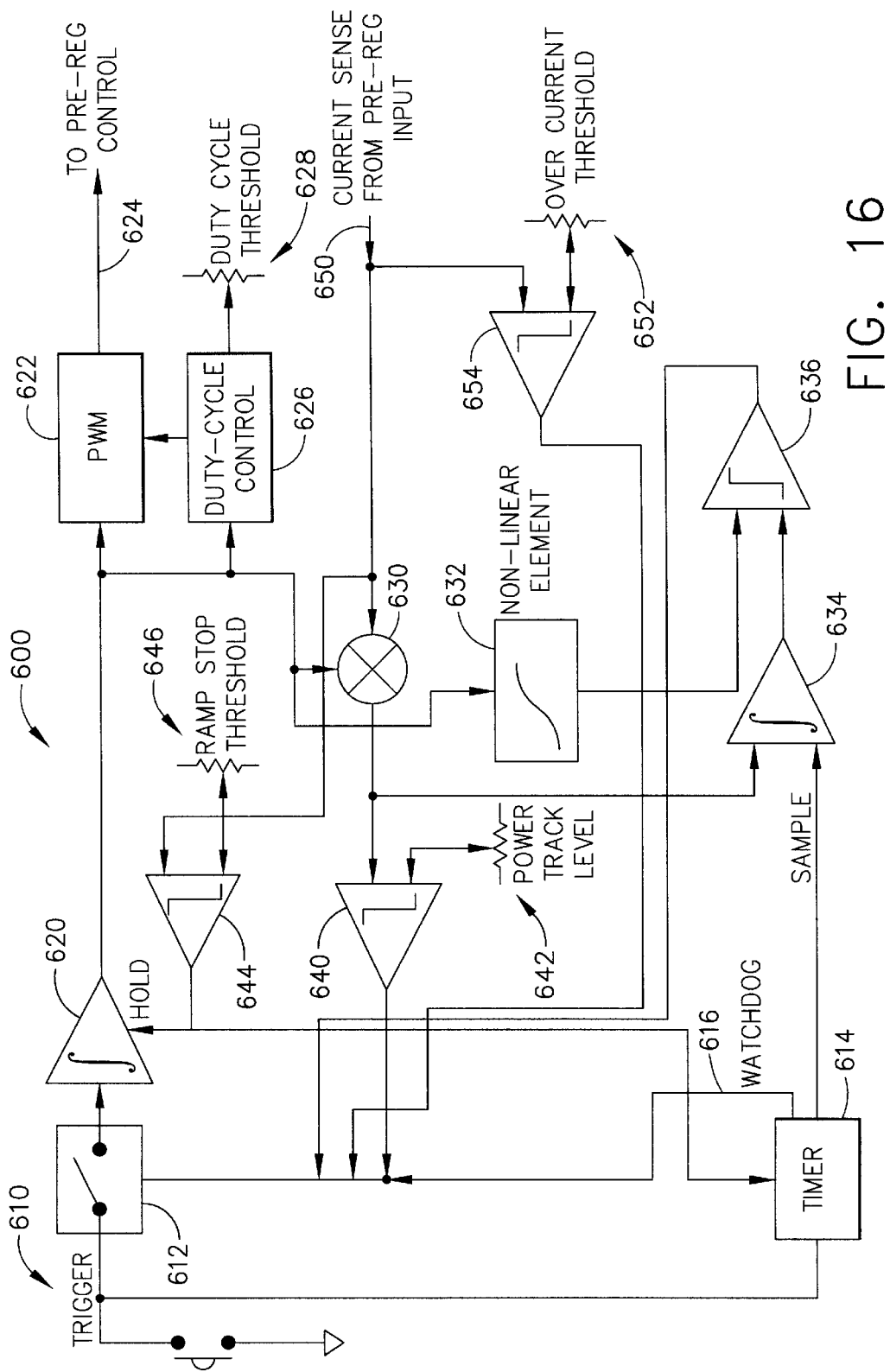
FIG. 16 is a block diagram of an analog embodiment of the electronics for an induction heating tool as used in the present invention.
Figure 17A:
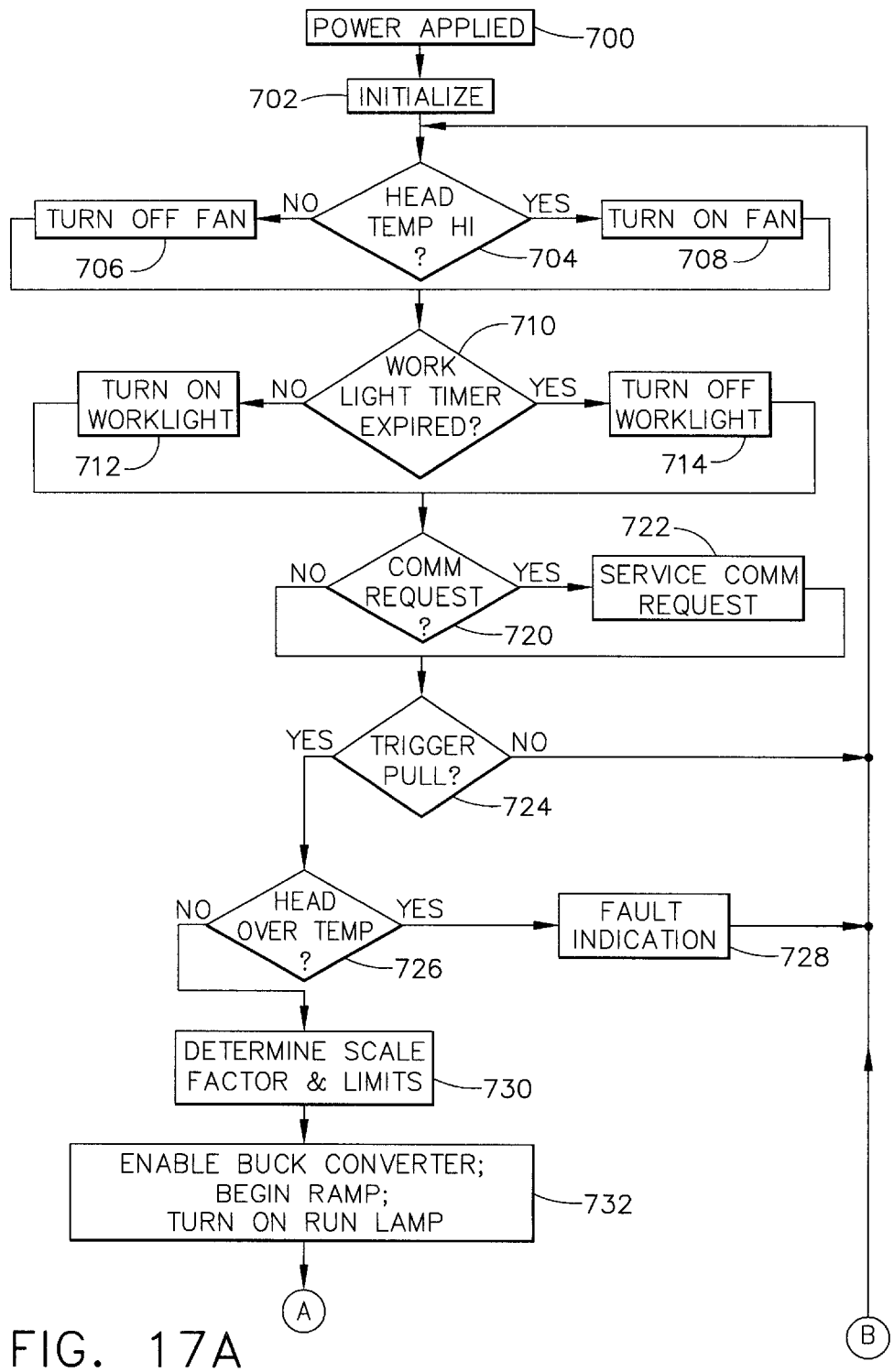
FIGS. 17A–17D are a flow chart of the major logical operations performed by the processing circuit of the second embodiment of the induction heating tool of the present invention.
Figure 17B:
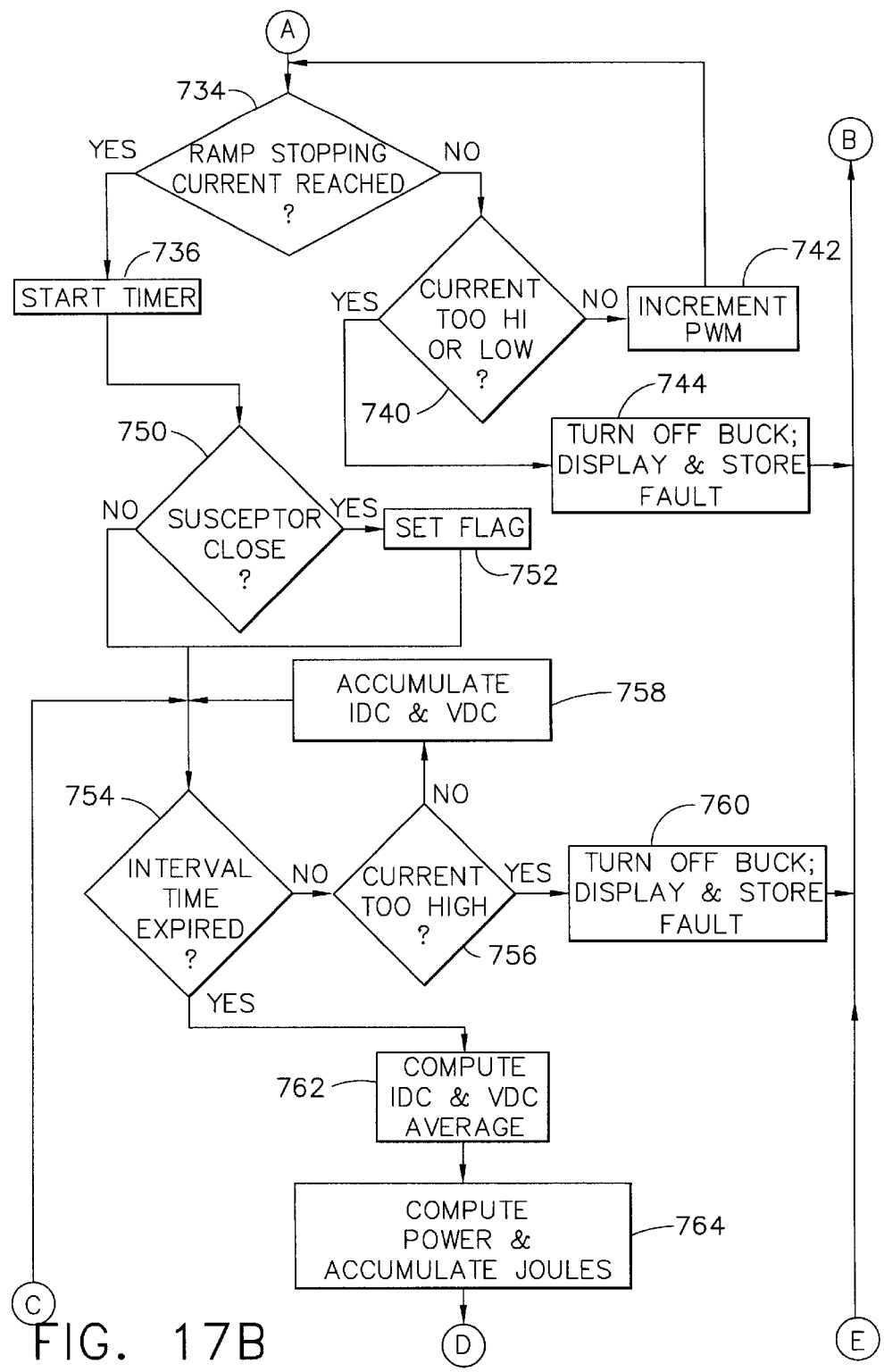
Figure 17C:
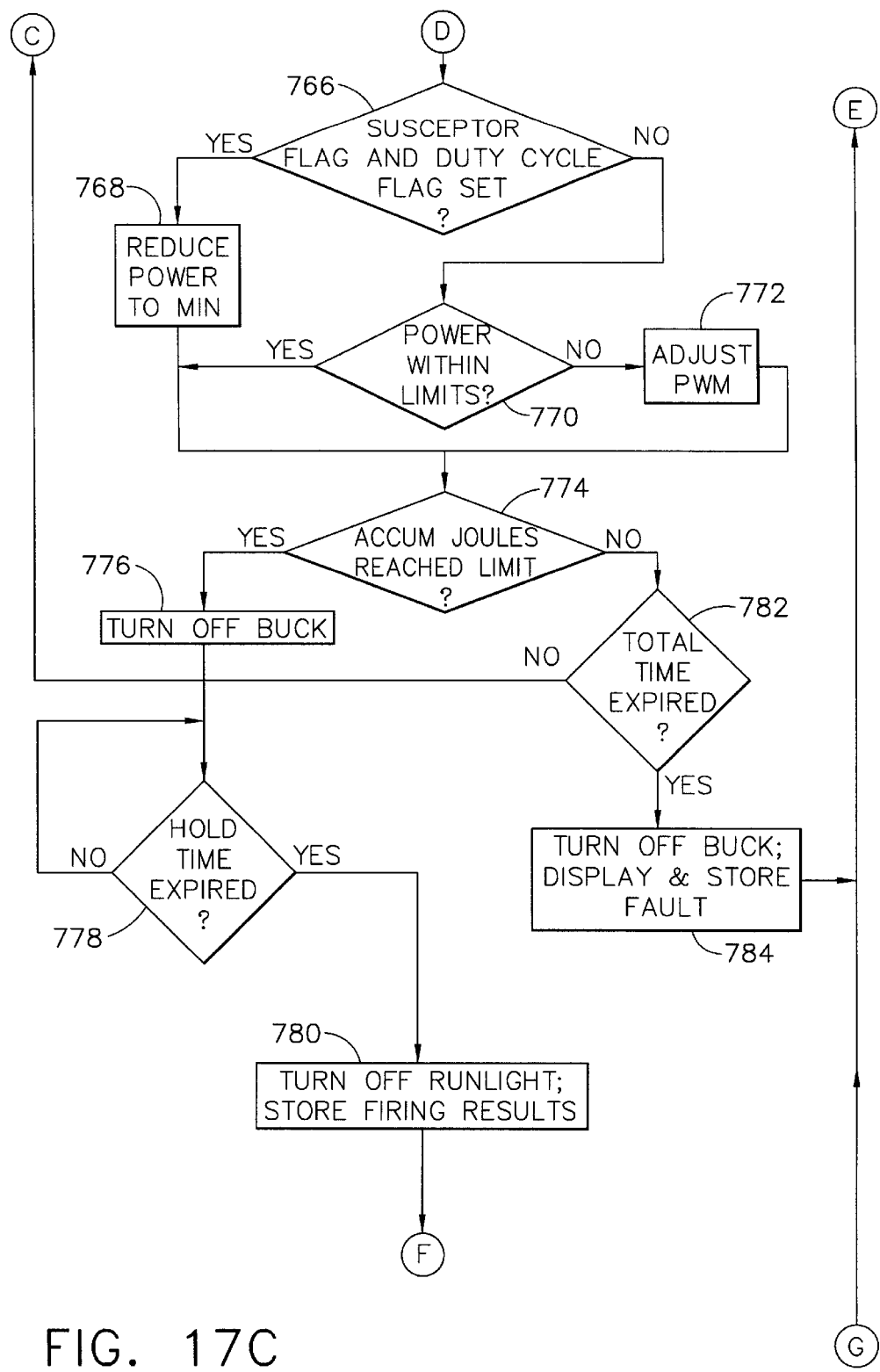
Figure 17D:
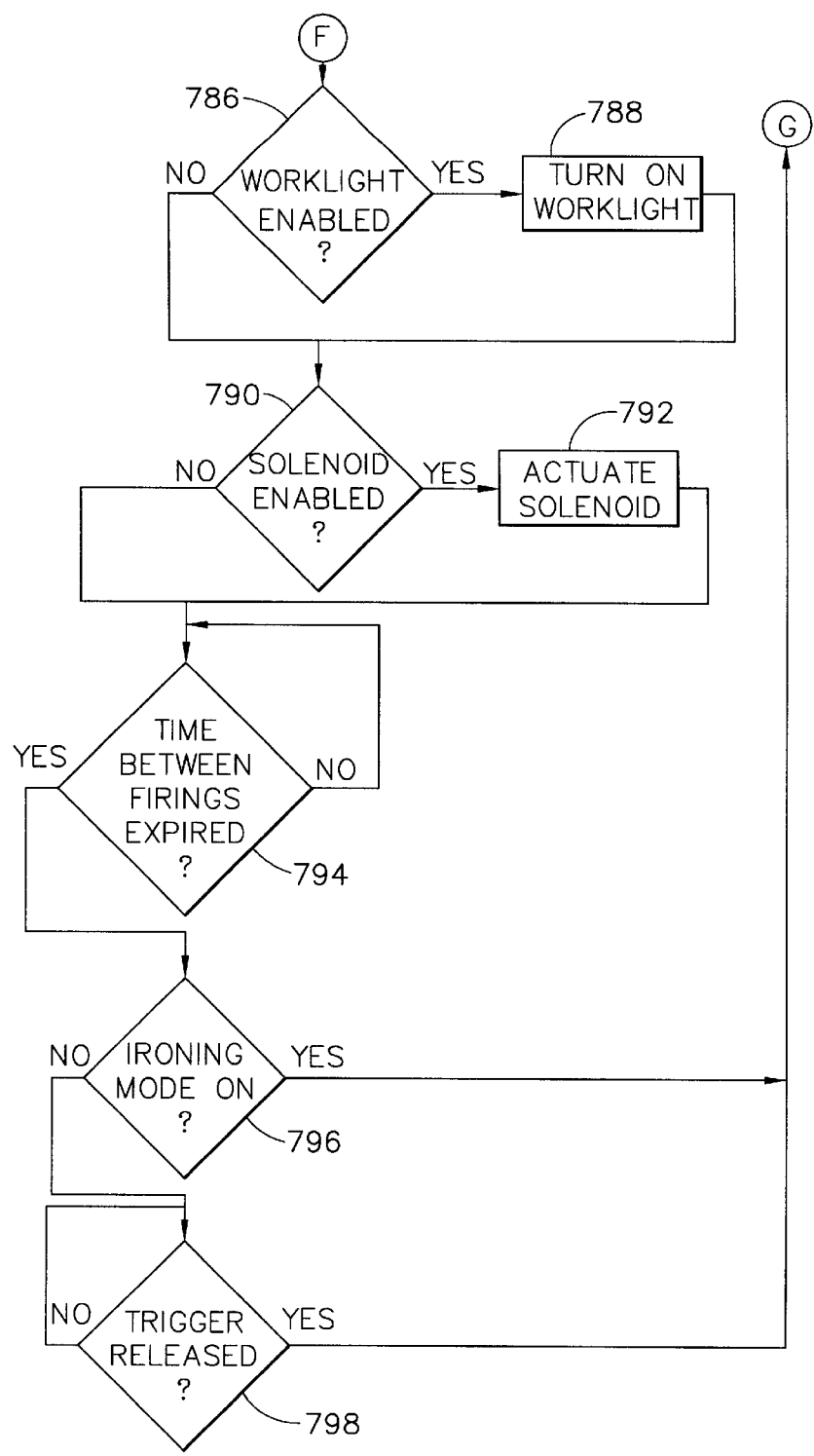

Referring now to FIG. 16, an analog controller circuit design is provided in a block diagram format. Pulling a trigger 610 (which is equivalent to the trigger 22 on FIG. 1) initiates the firing sequence. A timer 614 is activated and an input control device 612 for an integrator 620 applies a voltage to the input of this integrator 620. These actions start a voltage ramp at the output of integrator 620 which passes through a pulse-width modulator 622 and then to the voltage control of a pre-regulator circuit (not shown on FIG. 16) by way of a PWM signal at 624. The pre-regulator circuit (not shown on FIG. 16) provides an input voltage to be used by the output (power oscillator) inverter (not shown on FIG. 16).

During the ramping process, a comparator 644 monitors a "current sense" signal 650 from the pre-regulator input. An adjustable resistor (e.g., a potentiometer) 646 is provided to set a "ramp stop" threshold voltage. When the voltage level of the current sense signal 650 reaches the ramp-stopping threshold voltage, the output of the comparator 644 places the integrator 620 in a "hold" condition, at the present output voltage. This action signals the timer 614 to initiate the "power-tracking" mode of operation by enabling another integrator 634 in a sampled mode.

Integrator 634 is used to integrate the power sample generated by a multi-quadrant multiplier 630. The output of the multiplier 630 also feeds another comparator 640, which directs the input control 612 to increase or decrease the input voltage to integrator 620. This action regulates the power supplied by the pre-regulator (not shown) to the output (power oscillator) inverter (not shown), which in turn controls the power delivered to the susceptor (not shown on FIG. 16). An adjustable resistor (e.g., potentiometer) 642 is provided to set a "power track level" threshold voltage.

The present output-state of the first integrator 620 is also directed to a non-linear function generator 632, which generates a non-linear threshold voltage for a third comparator 636 that is used to terminate the firing cycle when sufficient energy has been delivered to the susceptor. The output of the comparator 636 disables the input control 612.

Depending upon the output level of the first integrator 620, the pulse-width modulator 622 will operate at 100% duty cycle or at a lower duty cycle percentage, according to a duty cycle controller 626. Duty-cycle controller 626 energizes the pulse-width modulator 622 at a given duty cycle depending upon the output level of the first integrator 620. This lengthens the total time of power application for susceptors that are in close proximity to the work coil. At least one adjustable resistor (e.g., a potentiometer) 628 is provided, which can be used to set a minimum duty cycle threshold voltage, and/or which can be used to set a maximum duty cycle threshold voltage.

Operating in the background during the tool heating cycle, is a watchdog timer output at 616, and also an over-current detector 654. The purpose of the watchdog timer is to control the maximum run time of a cycle in the event that the predetermined total energy limit is not reached. The over-current detector 654 disables the input control 612 in the event that the current-sense signal 650 from the pre-regulator exceeds a predetermined maximum limit. This predetermined maximum current limit is set by an adjustable resistor (e.g., potentiometer) 652.

FIGS. 17A–17D are a flow chart illustrating the major logical operations that are performed by the microprocessor circuit 540 on FIG. 14 of the second preferred embodiment of the induction heating tool of the present invention. It will be understood that a logic state machine could be employed to perform most, or all, of these logical operations in lieu of a sequential processing circuit, such as microprocessor 540. Of course, the logic state machine could be included in an integrated circuit that contains many of the other electrical components needed for interfacing to external digital or analog input and output signals.

At a step 700, power is applied by the connection of the tool to a standard 120 VAC outlet, or to a battery pack. Application of the power causes a supply voltage to be applied to the control microprocessor 540, which undergoes a reset sequence (using a power-on reset circuit that is built into the microprocessor 540), and then begins the code execution when the applied power is within limits and the oscillator has started.

An initialization procedure now occurs at a step 702. During this operation all of the input/output ports are defined and initialized, variables are assigned, and various configuration parameters are transferred from EEPROM. This process is not repeated unless the power is removed and reapplied.

After initialization, the software program controlling the microprocessor enters a main "waiting loop" where four different conditions are monitored. The first condition is a check of the head operating temperature, which occurs at a decision step 704. The cooling fan is turned on or off, depending upon the current temperature of the head. The on and off limits are user definable and stored in the EEPROM. If the result at decision step 704 is YES, in which case the head temperature is "high," then a step 708 turns the fan ON. Otherwise a step 706 turns (or leaves) the fan OFF. In both cases, the logic flow is directed to a decision step 710.

At decision step 710, the "work light timer" is examined to see if the light should be on or off. Both the enable/disable function, as well as the run time, are user-definable and stored in the EEPROM. If the result at decision step 710 is YES, in which case the work light timer has expired, then a step 714 turns the work light OFF. Otherwise a step 712 turns (or leaves) the work light ON. In both cases, the logic flow is now directed to a decision step 720.

At decision step 720, the program checks to see if there are any requests from the communications port 560. Requests from a remote computer may be for reading configuration or firing data, or in writing new configuration data to the EEPROM 546. If a request to service the communications port exists, then a step 722 will do so; otherwise the logic flow immediately is directed to a decision step 724.

At decision step 724, the program monitors the trigger 22 to see if it has been pulled by the user. If not, the program loops back to step 704 to check the head temperature, etc. If the trigger has been pulled the program proceeds to a "running" mode, starting at a decision step 726.

Before the induction heating tool 10 begins its "firing" sequence, the temperature of the head is measured and decision step 726 determines if an over-temperature condition exists. If the head temperature is too high, even though the fan may be running, the tool 10 will not fire until the temperature has dropped within limits. In that circumstance, a fault indication occurs at a step 728, and one of the LED's on the tool can be illuminated. On the other hand, if the head temperature is within range, the logic flow is directed to a step 730.

At step 730, the program reads the power-scaling pot and calculates a scale factor and various limits. The buck converter 514 (which could be a different type of power converter) is then enabled at a step 732, and the PWM (pulse-width-modulated) signal is set to output its starting voltage (e.g., 30 volts, or 50 volts). A ramping function is commenced, and the "run" lamps (LED's) are illuminated.

During the ramping operation the program monitors the DC current drawn by the buck converter and compares this at a decision step 734 to a ramp "stopping current." This is a limit that is user definable and preferably is stored in the EEPROM. If decision step 734 determines that the stopping current has been reached, then a step 736 starts a logical "interval timer," as discussed below. In one mode of the second preferred embodiment, the ramp stopping current is set to 1.7 Amperes, and the "ramp time" (i.e., the desired time interval during which the current-ramping from zero (0) to 1.7 Amps occurs) is about 50 msec.

On the other hand, if the stopping current has not been reached, the program checks at a decision step 740 to see if the DC current is above or below the normal limits. If the DC current is out of range, the program declares a fault at a step 744, turns off the buck converter, and gives a visual indication (at one or more of the LED's). The fault status is also stored in the EEPROM on a firing-by-firing basis. However, if the DC current is within its normal limits then the program increments the PWM at a step 742, which increases the voltage to the inverter. This process continues (in a loop through steps 734, 740, and 742) until the DC current is equal to or greater than the ramp stopping limit, at which time the program transitions to a "power track" mode.

To begin the power track mode, the interval timer is started at step 736 which will limit the overall run time of the firing and provide interval timing for the energy calculations. This interval timer operates with a 10 msec interval; the interval timer can run many times throughout a single heating operation, and could run using an 8-bit counter, for example, 255 times before the counter reaches a hexadecimal value of FF, thereby providing a "total time" limit of 2.55 seconds. A decision step 750 examines the relative position of the head to the susceptor to determine if the susceptor is sufficiently "close" to the head. If the susceptor is within a specified distance from the head, a step 752 sets a flag which will be used to control the duty cycle of the applied power.

The program continues by monitoring the interval timer at a step 754. During the monitoring procedure, several samples of DC current and DC voltage readings for the buck converter are summed (or otherwise accumulated) and stored at a step 758. Also during this interval, the DC current is examined by a decision step 756 to determine if an over-current condition exists. If an over-current condition is detected, the program disables the buck converter at a step 760, and displays and stores the fault. However, if the current is within normal limits, the DC current and DC voltage summing operations continue until the timer's time interval has expired (which is described below in greater detail). After the interval timer has expired the average values of DC current and DC voltage are computed at a step 762. These values are then used to calculate at a step 764 the present power draw and to accumulate the total energy for this operating cycle.

A decision step 766 next checks the susceptor "close" flag and a duty cycle flag to see if the power should be throttled back to its minimum value. If so, the logic flow is directed to a step 768 where power is reduced to the minimum value. If not, the logic flow is directed to a decision step 770. This full-power or minimum-power duty cycling can be used when the susceptor is quite close to the work piece, in order to somewhat lengthen the heating cycle. Under normal circumstances, a very fast bonding cycle is desirable; however, it is important to not allow the work coil's magnetic field to overpower the susceptor to an extent that the susceptor may literally melt very quickly and thus either burn the adhesive or cause the adhesive to crystallize, thereby forming a poor bond with the work piece. A reduction of the power, and corresponding lengthening of the heating cycle, is one method of preventing these occurrences.

During the full-power portion of the heating cycle, the "present power" is compared to the "tracking power" at decision step 770. The tracking power attribute can be made user programmable, and stored in the EEPROM. Corrections to this attribute are made as required at a step 772, in order to keep the power within the tracking limits. The voltage on the PWM (i.e., the duty cycle value, which ranges from count values 0-FF hexadecimal) is adjusted to keep the input power at a substantially constant value while continuing to heat the susceptor. The adjusted PWM value is used to infer the susceptor distance during the next 10-msec cycle.

A decision step 774 compares the accumulated total joules to a "total joule limit," which is stored in a look-up table in memory (which could be either the EEPROM or on-board EPROM within the microprocessor itself). This look-up table is addressed using the susceptor distance information, which links the accumulated total joules and "total joule limit" to the "susceptor distance;" the amount of joules for each 10-msec cycle is based upon the look-up table value. The look-up table values are typically derived empirically, and the "susceptor distance" terminology used in this description of operation is substantially equal to actual physical distance between a susceptor and the work coil while in operation, at least for appropriate styles of susceptors.

Each 10-msec cycle will produce a "new" value for the susceptor distance/total joule limit attribute, although the result may be the exact same value for many consecutive cycles. The process of "adjusting" the output energy level (by "adjusting" either or both of the current and/or voltage at a point in the power converter) could be simply a matter of maintaining the present output energy level for at least two consecutive cycles (or for "many" consecutive cycles, as noted above). On the other hand, the process of "adjusting" the output energy level could require a different output energy level for each consecutive 10-msec cycle, even perhaps over the entire heating event of a particular susceptor.

As noted above, the current and/or voltage adjustments can be made at the input of the power converter (e.g., a buck converter, an oscillator circuit, or an inverter), while the electrical characteristics being sensed (typically both the current and voltage) could be made at the input of the power converter (in a feed-forward mode), or these sensed electrical characteristics could be made at a downstream point of the power converter (in a feedback mode), including at the power converter's output, or directly at the work coil.

It will be understood that a mathematical calculation could be made in lieu of using a look-up table to determine the susceptor distance/total joule limit value. If a calculation is used as the control methodology, it should be noted that the expression is a non-linear function, including an exponential component. The analog circuit embodiment (see FIG. 16) also uses a similar non-linear function for this determination.

A decision step 782 determines whether or not the "total time" has expired, which is the time after the first 10-msec cycle commenced. If the total joule limit has not been reached, and if the total time has not been exceeded, then the computer program continues tracking the power, and the heating cycle continues by directing the logic flow back to step 754.

However, if the joule limit has been reached, a step 776 turns off the buck converter, and a decision step 778 waits for a "hold timer" to expire; the hold timer begins timing when power to the work coil is interrupted, in situations where it is desired each cycle time to be identical. After the hold timer has expired the run-light is turned off at a step 780, and the firing information is stored in the EEPROM.

The effect of steps 770, 772, 774, and 776 allows the induction heating tool 10 to run at its maximum predetermined power, as measured by its input power at the buck converter, while adjusting its effective output power by varying the PWM duty cycle as needed to maintain its input power at the predetermined maximum level, until reaching a time duration at which it is determined that the accumulated total joules insure that a bond has been made by the susceptor.

A decision step 786 determines whether or not a "work light" has been enabled by the user. If so, then a step 788 now turns on the "work light" and the logic flow is directed to a decision step 790 which determines whether or not the solenoid (or buzzer) has been enabled. If so, a step 792 now actuates the solenoid (or the buzzer) for the user-programmable time duration that has previously been stored in the EEPROM.

The user is able to select a programmable time delay, used to control a minimum time interval between firings. A decision step 794 determines whether or not this time interval (between firings) has yet occurred. The time interval "between" firings is based upon the end of the most recent previous firing and the beginning moment (or start) of the next firing. The software logic essentially waits for this time interval to occur before continuing to the next logical operation.

The user is also able to utilize an "ironing" mode of operation when using the induction heating tool of the present invention. This is useful when bonding two large sheets of material together, such as affixing a Formica top to a wood surface for a piece of furniture. A decision step 796 determines if the "ironing" mode of operation has been selected by the user, and if so, the program immediately returns to the main loop (regardless of whether the trigger 22 is currently being actuated).

On the other hand, if the ironing mode has not been selected by the user, then the logic flow is directed to a decision step 798 which determines if the trigger 22 has been released. If not, step 798 waits for the trigger to be released, and then the program returns to the main loop at decision step 704.

Figure 18:
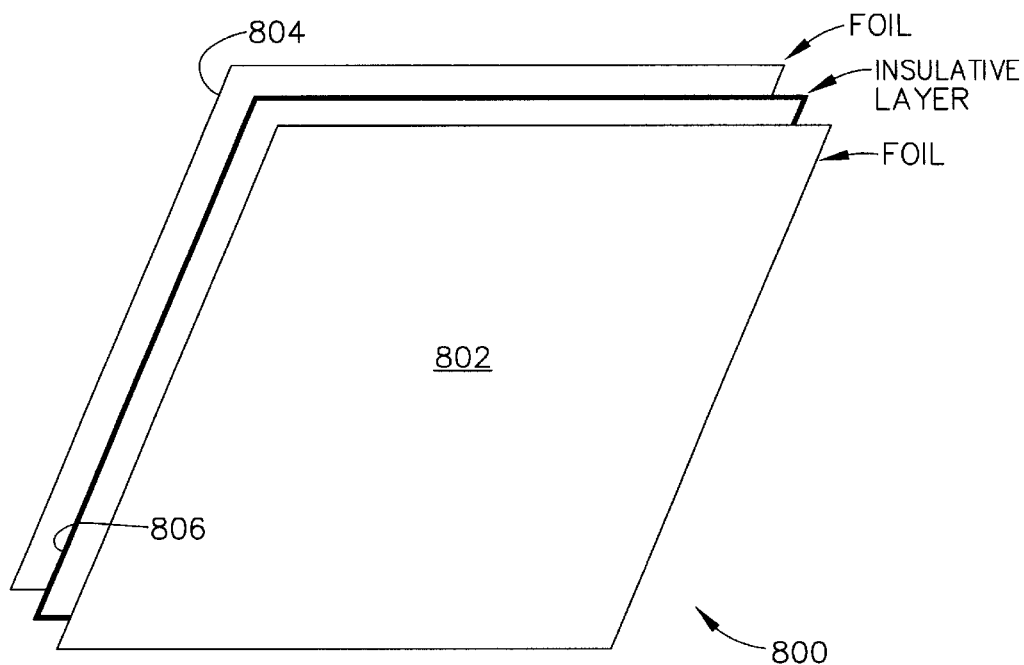
FIG. 18 is a perspective diagrammatic view of a double-foil susceptor, as according to the present invention.

FIG. 18 illustrates a double-foil susceptor 800, in which an insulative layer 806 is provided between two different layers of foil at 802 and 804. If the thin foil susceptor principle is utilized in the construction of this double-foil susceptor 800, then the magnetic field generated by the induction heating tool 10 of the present invention will produce eddy currents in both of the foil layers 802 and 804. This can be accomplished without requiring an increase in the magnetic field, which at first glance may be thought of as being required to induce the magnetic field in both foil layers. The main reason a larger magnetic field is not required is that the foil layers 802 and 804 are both quite thin, and the magnetic field fairly easily penetrates through the nearest foil layer into the farthest foil layer, thereby inducing eddy currents in both foil layers simultaneously.

In essence, given a constant intensity (alternating) magnetic field, the double-foil susceptor 800 will absorb approximately twice the energy that a single foil susceptor of similar dimensions would otherwise absorb, thereby inducing a much faster temperature rise in the overall susceptor by virtue of the additional eddy currents produced in the farther layer. Since one of the advantages of the present invention is to cause the susceptors to heat up quite rapidly so that their outer adhesive surfaces will rapidly melt, or at least soften, then it can be seen that the double-foil susceptor 800 can aid in accomplishing that task.

Figure 19:
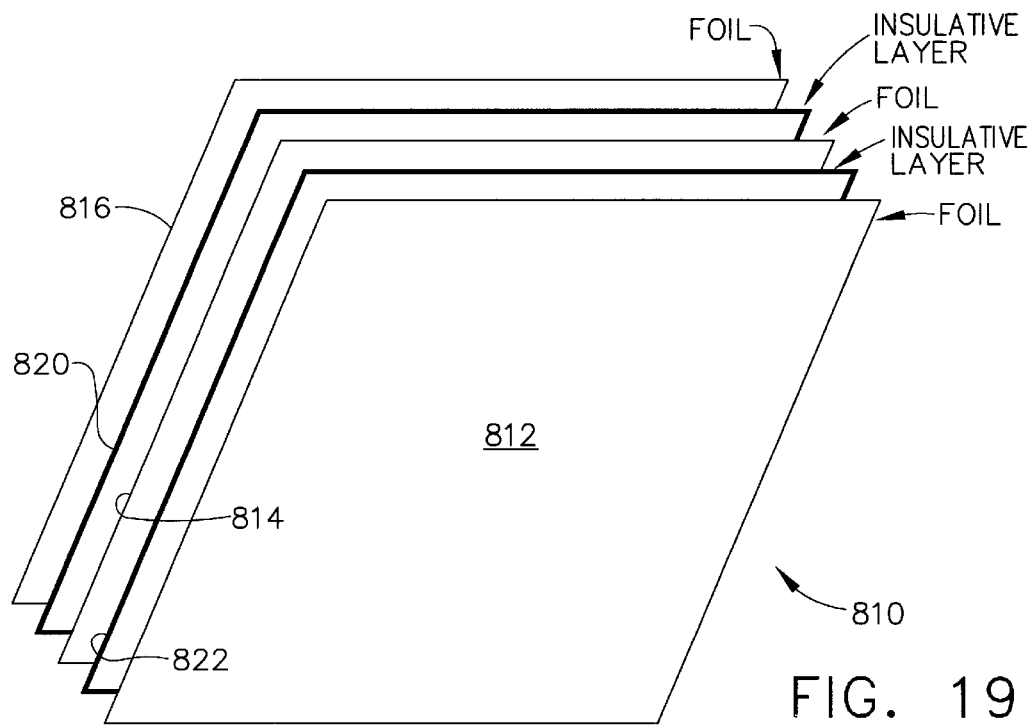
FIG. 19 is a perspective diagrammatic view of a triple-foil susceptor, as according to the present invention.

FIG. 19 shows a similar triple-foil susceptor design at 810, which includes two separate insulative layers at 820 and 822. Surrounding both of these insulative layers on their large surfaces are parallel thin foil layers 812, 814, and 816. Based upon the principle discussed above with respect to the double-foil susceptor 800, if the foil layers are of a sufficiently small thickness, then the magnetic field produced by the induction heating tool 10 of the present invention will penetrate into all three of the foil layers 812, 814, and 816, thereby inducing eddy currents in all three of these foil layers. When this actually occurs, the temperature rise is increased at a greater rate, thereby accomplishing one of the main tasks of the present invention in causing the outer layer of adhesive to rapidly either melt or soften so that it can quickly join two structural members together in a permanent bond. It will be understood that there is no theoretical limit to the number of separately insulated foil sheets that may be used together in a multiple-thickness susceptor structure.

As discussed above in connection to single layer foil susceptors, both the double-foil susceptor 800 and the triple-foil susceptor 810 can also be re-heated so as to allow a person to remove the same structure that was previously firmly bonded together.

Figure 20:
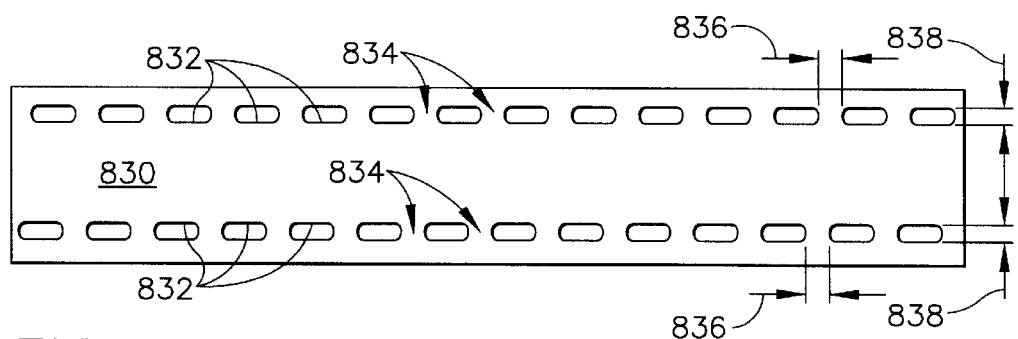
FIG. 20 is a diagrammatic view of a susceptor having fusible lengths, as according to the present invention.

FIG. 20 illustrates a (single-foil or multiple-foil) susceptor 830 that includes fusible portions or "links" that are depicted at the reference numerals 834. As can be seen in FIG. 20, there are multiple holes (openings) or cut-outs at 832 in the susceptor 830. The closest distance between two of these holes or cut-outs 832 is the distance indicated by the reference numeral 836. This distance could be equal throughout the entire susceptor, or it could be different from one set of cut-outs to another set, if desired.

When the susceptor 830 is subjected to a magnetic field, its foil layer will exhibit eddy currents that will cause the foil layer to increase in temperature quite rapidly. If the increase in temperature rises to a point that is not necessarily desired, then portions of the foil could literally melt and perhaps cause the adhesive outer layers to burn in some circumstances. The fusible links (portions) involve the areas at 834, such that if any melting is going to occur in the foil layers, it will likely occur in the areas that have the highest current density. This will be the areas at 834, and the current densities will be maximized within the short distances at 836 and 838.

The area created by the short distances 836 and 838 will observe the maximum current density and thus will melt first. When this melting occurs, the induction heating tool will observe a brief time interval where its input power readings will cause it to believe that it had provided a maximum, or more than sufficient, energy such that it should now reduce its duty cycle. After a short time interval, the eddy currents in the susceptor 830 will again settle down, as will the back-EMF, and the induction heating tool will observe an input power reading that allows it to again decide whether or not to increase power to a point that is sufficient to continue to raise the temperature of the foil layer of the susceptor 830. In the meantime, the foil temperature will briefly have been allowed to cool, and therefore, the adhesive outer layers will not tend to burn.

It will be understood that the susceptor 830 illustrated in FIG. 20 will not exhibit "even heating" when exposed to a magnetic field; in fact, quite the opposite will occur. This is in contrast to the Boeing methodologies of bonding, by which "even heating" is always an important criterion, both for structural strength and for air-tightness or liquid-tightness in particular portions of an aircraft. In the present invention, the susceptor 803 is more useful for bonding to building walls, floors, ceilings, etc. (denoted as "substrates," as discussed below in reference to FIG. 22), and the very even-heating aspect of bonding is not always required, so long as the necessary overall strength is achieved. The present invention is quite useful in creating bonds of such necessary overall strength, and "even heating" is usually not a requirement.

Figure 21:
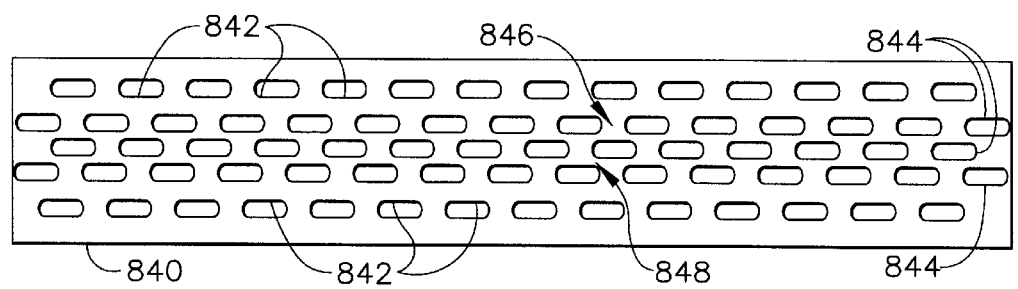
FIG. 21 is a diagrammatic view of a susceptor with fusible lengths and a current equalization hole pattern, as according to the present invention.

FIG. 21 illustrates another susceptor 840 that not only includes fusible links or portions, but also has a pattern of holes or cut-outs that will tend to create a more even heating distribution, by tending to cause the current density to be more equalized throughout the inner areas of the susceptor 840. Susceptor 840 includes two outer rows of holes or cut-outs at 842. In addition, there are three "new" rows of such holes or cut-outs at 844, which run down the longitudinal axis of the susceptor 840. There are fusible areas at 846 and 848 that will tend to control the current flow of the foil portion of the susceptor 840.

As described in reference to FIG. 20, if the current density increases too rapidly, then the areas of the foil having the highest current density will tend to melt and create an open circuit in those very same areas. When that occurs, the current density will observe a sudden change in certain areas of the susceptor 840, and moreover, another alternative embodiment of the present induction heating tool will observe a change in an attribute that can cause the magnetic field being output by the heating tool to temporarily reduce in magnitude. This prevents the outer adhesive layers from burning, which will result in a better bond of the adhesive materials.

Figure 22:
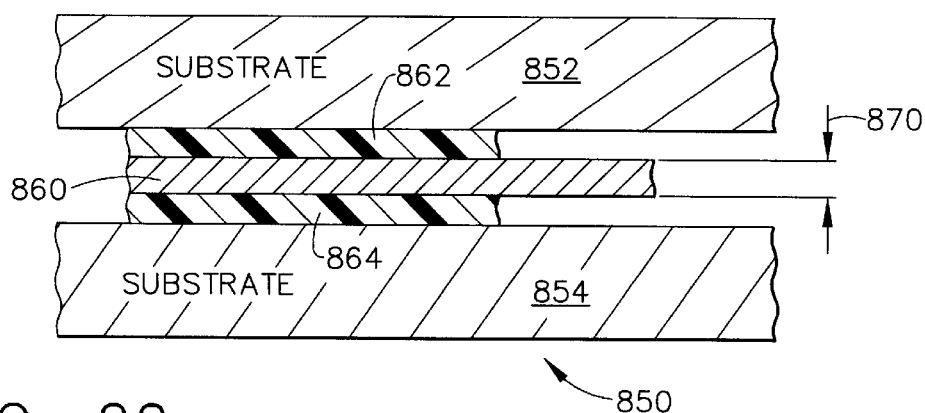
FIG. 22 is a side cut-away diagrammatic view of a susceptor used in the present invention after it has been bonded to two substrates.

Referring now to FIG. 22, a single-foil susceptor is illustrated, after it has been used to bond two different substrate structures together. The susceptor itself comprises the foil layer 860 and two adhesive coatings 862 and 864. It will be understood that FIG. 22 is not to scale.

After the heating has occurred, the adhesive surfaces 862 and 864 are bonded to the substrates 852 and 854, respectively. As discussed above, it is preferred that a thin foil susceptor be used, in which the thickness of the susceptor (at 870) is kept to a maximum of two (2) mils (51 microns), or perhaps as much as three (3) mils (76 microns) in certain applications. In many circumstances, the preferred thickness 870 of the susceptor foil layer 860 will be as small as (or even smaller than) one-half mil (13 microns).

Proper activation of the adhesive coating of the susceptor requires that the adhesive (at 862 and 864) reach a specified temperature, be held there for a minimum time, then cool down and "set" as quickly as possible. Inductive heating of a thin metallic susceptor results in energy deposition in the susceptor 860, and this energy conducts into the substrates 852, 854 and the adhesive 862, 864. The temperature reached depends on the power level of the deposition, the thermal conduction into the substrate and adhesive, and the duration of heating, and the power delivery profile.

If the deposition power level is high, then the specified temperature will be reached in a short time. Only a small portion of the energy will be conducted into the substrates 852, 854 and, if the power is turned off after only a very short energization time interval, the susceptor 860 and adhesives 862, 864 will cool down quickly due to continued conduction into the (mostly still cool) substrates 852, 854. If the power level is too high and for a very short application time interval, and the energy deposition is thus too low, the adhesives 862, 864 will be inadequately activated and a poor bond will result.

If the deposition power level is low, then the specified temperature will be reached only after a relatively long application time. A large amount of energy will be conducted into the substrates 852, 854 and large regions of the substrates proximal to the susceptor 860 will be heated. When the deposition power is turned off, the susceptor 860 and activated adhesives 862, 864 will fall slowly in temperature due to this large amount of energy now stored in the substrates 852, 854. So long as the application time interval is sufficiently long, an adequate bond will be formed between the susceptor 860 and substrates 852, 854.

However, if the deposition power level is too high, and the cool-down time too high, then the adhesives 862, 864 will not "set" quickly, and the work pieces (i.e., the substrates 852, 854) will have to be held in place long after the heating cycle has been completed. This is not a desired outcome since assembly time increases, and further the chance of human error increases that could result in poor assembly of the work pieces.

The heat transfer rate due to the thermal diffusion coefficients from the foil to adhesive and from the adhesive to the substrates, is very important. If the thermal diffusion coefficients are too large, then the substrates will not be sufficiently raised in temperature before the susceptor's foil (860) would melt, or the adhesives (862, 864) would burn or crystallize. On the other hand, if the application time interval is too long, then the substrates (852, 854) will become too hot for the adhesive to quickly set, as noted above.

There is an optimum power level and duration which adequately activates the adhesives 862, 864 while not incurring a long clamping-time penalty during cool down. This optimum depends on the thermal activity and heat capacity of the substrate 860, and in the activation characteristics of the adhesives 862, 864. It also, of course, depends upon the power level of the magnetic field being generated by the work coil of the induction heating tool 10, the distance between the work coil and the susceptor 860, and the application time interval during which the magnetic field is produced.

In the present invention, the most useful application time intervals range from 0.2 seconds to over ten (10) seconds. Of course, for quick assembly of work pieces, the shorter application times are desired. To achieve the desired quick-assembly times, a large amount of magnetic energy produced by the work coil is necessary, which thus produces relatively large amounts of thermal energy in the susceptor due to eddy currents. For thin foil susceptors, a maximum power of about two (2) kW per square inch of foil can be used as the average power over the entire heating event (i.e., during the application time interval). The susceptor 860 must be properly designed to handle this much power, since too much power for too long a time interval will certainly melt portions of the susceptor; in fact, too much power could literally make the susceptor explode.

The induction heating tool of the present invention has the capability of operating very effectively at distances of at least 0.75 inches (19 mm) between the work coil and the susceptor 860. At this range of distances, the application time for producing the magnetic field can be as little as 0.05 seconds. The present induction heating tool 10 can also be used at much greater distances if the application time interval is increased, including a distance of at least three (3) inches (76 mm). The preferred range of application time intervals can run from 0.05 second through 10 seconds, or more preferred from 0.10 seconds through 5 seconds, or most preferred from 0.15 seconds through 2 seconds.

Figure 23:
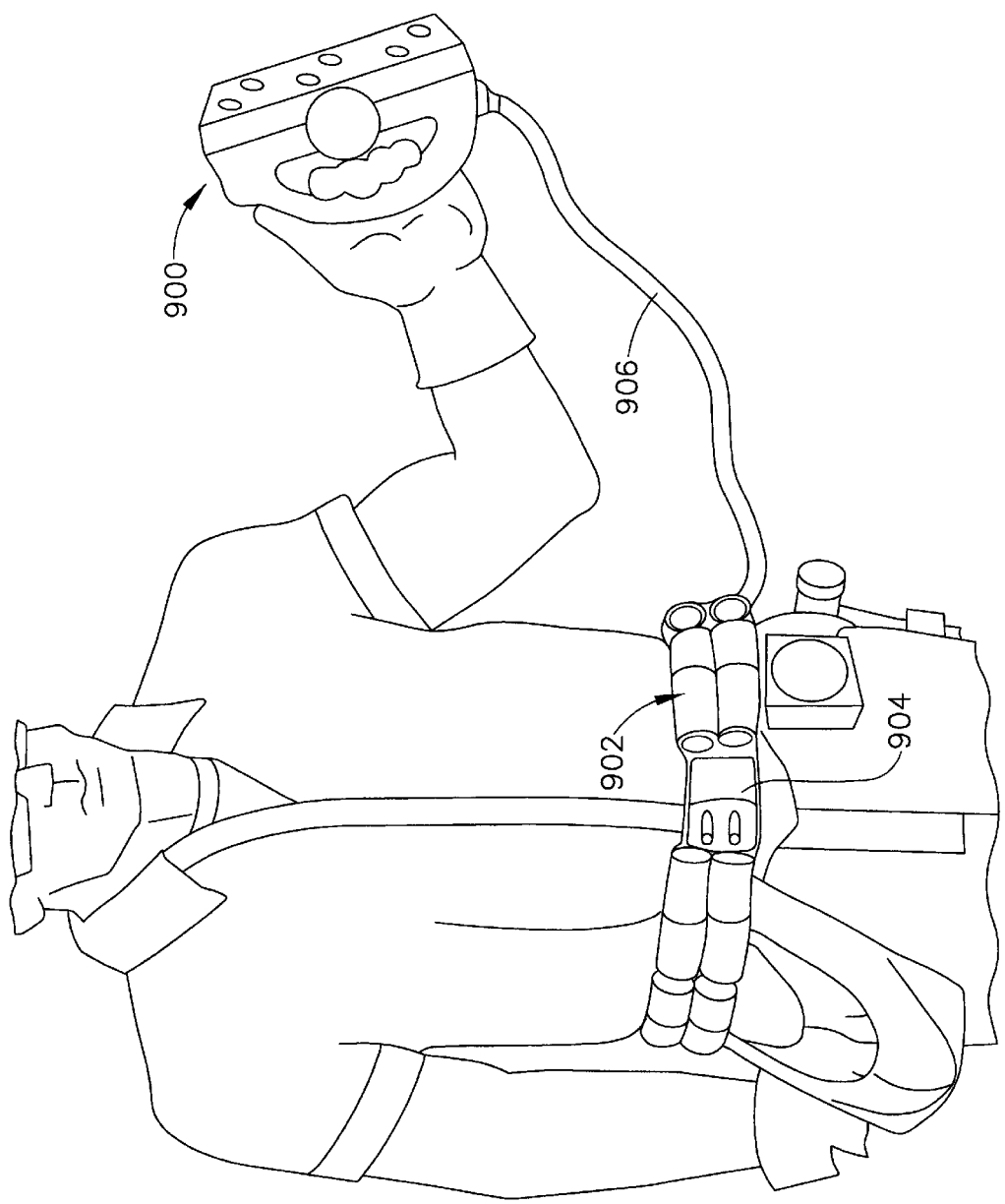
FIG. 23 is a diagrammatic view of the induction heating tool of the present invention with a battery pack worn on a belt.
Figure 24:
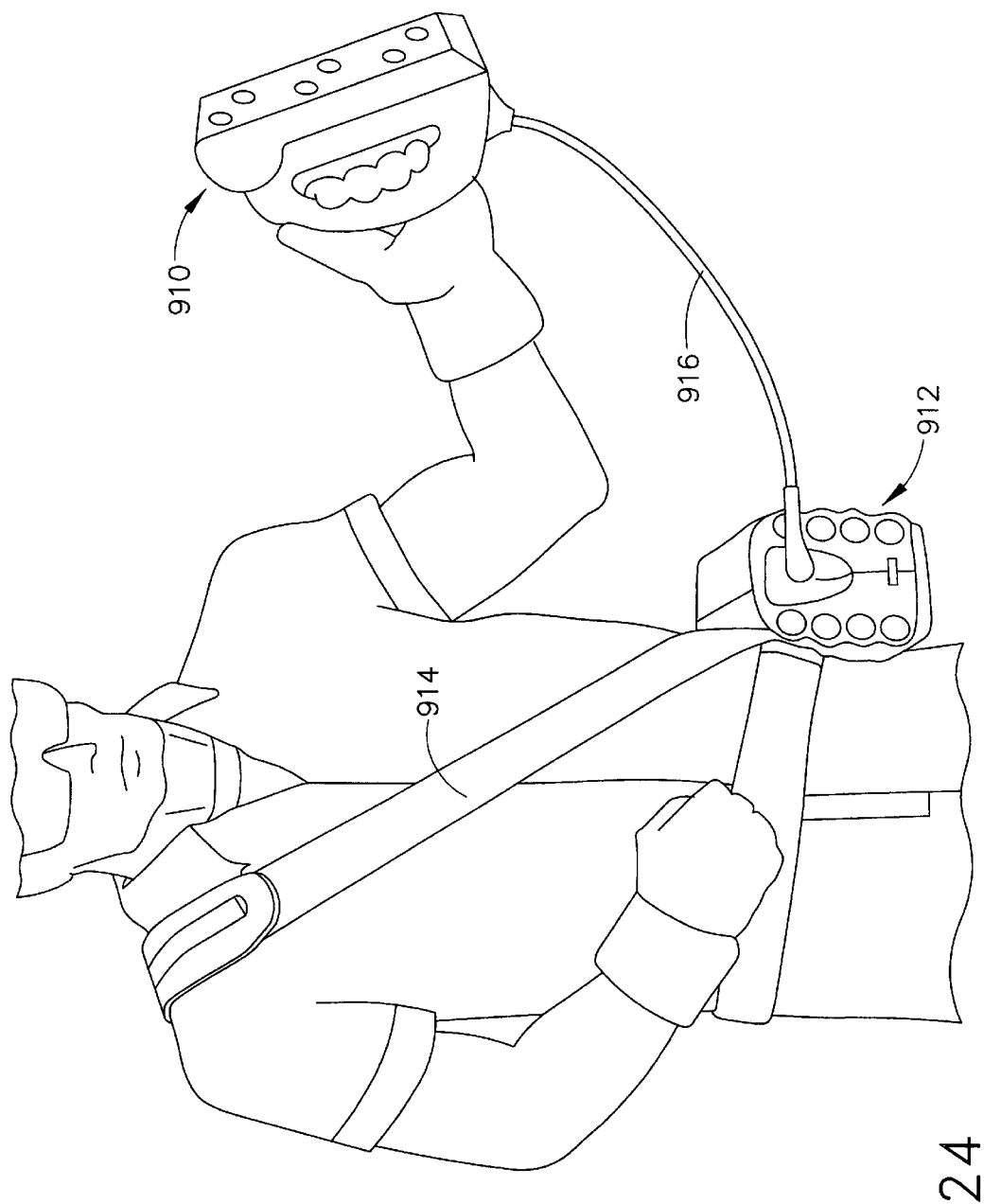
FIG. 24 is a diagrammatic view of the induction heating tool of the present invention with a battery pack worn on a shoulder harness.

FIG. 23 diagrammatically illustrates a person utilizing the induction tool, which can be broken out into more than one portion. In FIG. 23, the induction heating tool is generally depicted by the reference numeral 900, and has a battery pack at 902 that is worn around the waist of the human user on a belt 904. A power cable 906 provides the electrical power from the battery pack 902 to the induction heating tool 900. FIG. 24 shows a similar arrangement, however, the induction heating tool 910 is used with a battery pack 912 that is worn on a shoulder harness 914 that is slung crossways from the right shoulder to the left hip. A power cable 916 carries the battery power from the battery pack 912 to the induction heating tool 910.

Figure 25:
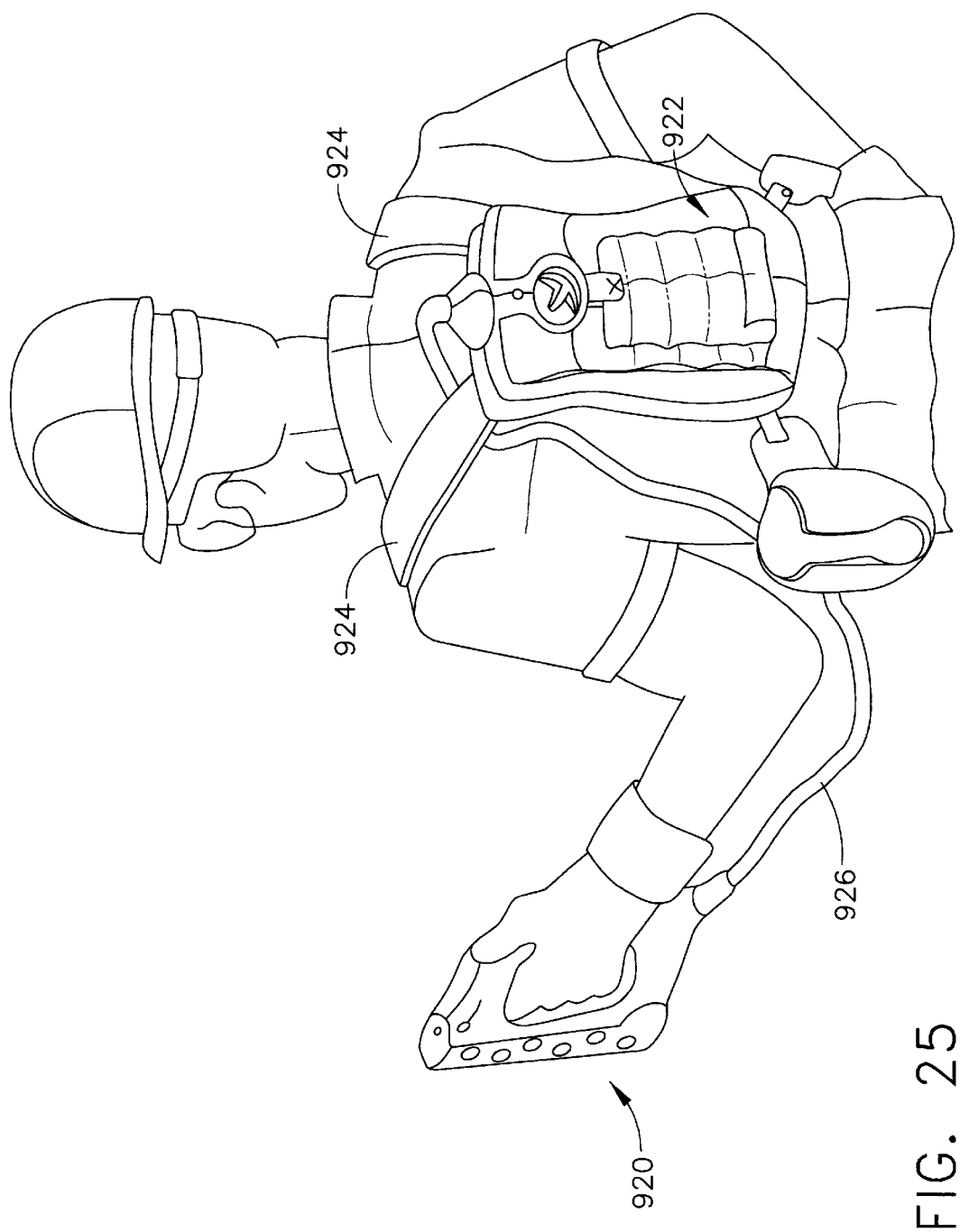
FIG. 25 is a diagrammatic view of the induction heating tool of the present invention with a battery pack worn on a backpack.

FIG. 25 again shows an induction heating tool 920 with a battery pack; in this case the battery pack 922 is worn on a backpack that is attached to a pair of shoulder harnesses 924. A battery cable 926 is provided between the battery pack 922 and the heating tool 920.

Figure 26:
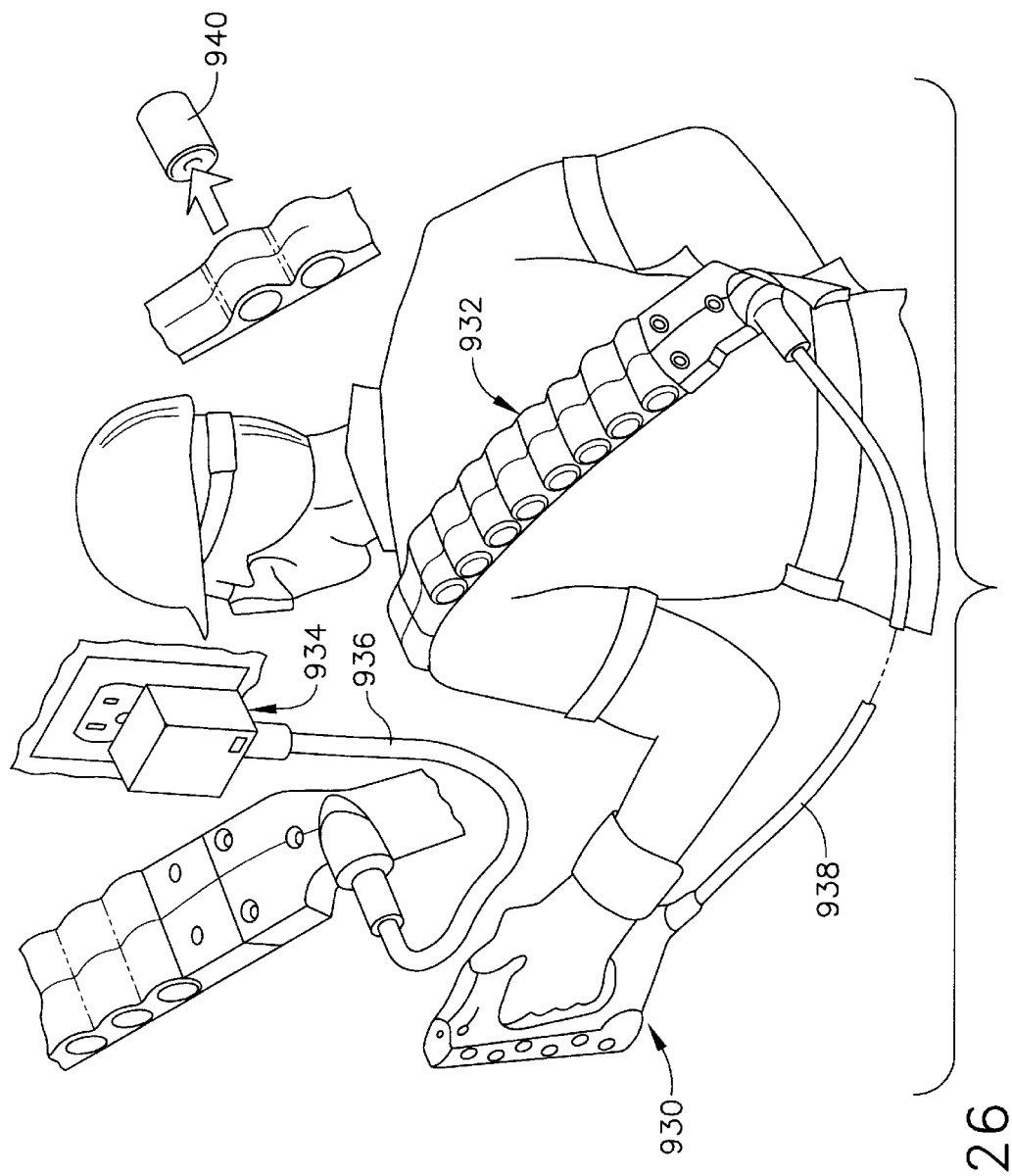
FIG. 26 is a diagrammatic view of the induction heating tool of the present invention with a battery pack worn on a bandoleer-type shoulder harness, and further including an AC adapter or battery charger.

Another example use of the induction heating tool is depicted in FIG. 26, in which the heating tool 930 can be utilized with either a battery pack or with AC line voltage. The battery pack at 932 is illustrated as a bandoleer-type belt, having a battery cable 938. Alternatively, a power cable 936 and a plug-in battery charger or AC adapter 934 are illustrated. Individual batteries 940 can be replaced on the bandoleer construction at 932.

It will be understood that the logical operations described in relation to the flow charts of FIGS. 17A–17D can be implemented using sequential logic, such as by using microprocessor technology or using a logic state machine; it even could be implemented using parallel logic. The preferred embodiments use a microprocessor to execute software instructions that are stored in memory cells. In fact, the entire microprocessor (or microcontroller) and certain memory cells could be contained within an ASIC, if desired. Of course, other circuitry could be used to implement these logical operations, without departing from the principles of the present invention, such as the analog circuit described in FIG. 16.

It will be further understood that the precise logical operations depicted in the flow charts of FIGS. 17A–17D and discussed above, could be somewhat modified to perform similar, although not exact, functions without departing from the principles of the present invention. The exact nature of some of the decision steps and other commands in these flow charts are directed toward specific embodiments of induction heating tools, and certainly similar, but somewhat different, steps would be taken for use with other sizes or shapes of heating systems in many instances, although the overall inventive results would be the same.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A heating apparatus, comprising:
  a work coil and an electronic circuit, said electronic circuit, upon a actuation of a cycle, being configured to determine both a current magnitude and a voltage magnitude input to a power converter stage over a plurality of sampled time intervals, then being configured to average said current and voltage magnitudes to calculate a power level being consumed by the power converter stage; and
  said electronic circuit being further configured to adjust said power level according to a predetermined energy delivery scheme until achieving a predetermined accumulated energy for said predetermined energy delivery scheme, and terminating said cycle.

2. The heating apparatus as recited in claim 1, wherein said predetermined energy delivery scheme comprises a profiled energy delivery scheme.

3. The heating apparatus as recited in claim 1 wherein said power converter stage comprises an inverter circuit.

4. The heating apparatus as recited in claim 1, wherein one of a continuous operating mode or a one-shot operating mode is selectable by a user; and wherein the continuous operating mode repeatedly self-triggers a subsequent energy delivery cycle for so long as said user maintains said actuation, while the one-shot operating mode requires a separate user actuation for each subsequent energy delivery cycle.

5. The heating apparatus as recited in claim 4, wherein said power level must fall between a low-load limit and an overload limit; otherwise if the power level is less than said low-load limit or greater than said overload limit, then in said one-shot operating mode said heating apparatus operation will be immediately halted.

6. The heating apparatus as recited in claim 4, wherein said power level must fall between a low-load limit and an overload limit; otherwise if the power level is less than said low-load limit or greater than said overload limit, then in said continuous operating mode said heating apparatus operation will continue for a predetermined number of subsequent said sampled time intervals at a minimum power level condition, until (a) said power level achieves a value between said low-load and overload limits, then continuing normal operation, or (b) if said power level fails to achieve a value between said low-load and overload limits, then halting said heating apparatus operation.

7. The heating apparatus as recited in claim 2, wherein said electronic circuit is further configured to determine whether a predetermined maximum time interval has occurred before said profiled energy delivery scheme has been achieved, and if so declaring a timeout error and halting said heating apparatus operation.

8. The heating apparatus as recited in claim 2, wherein said profiled energy delivery scheme comprises a plurality of successive time intervals during which said electronic circuit is configured to control said power level during each said time interval, and is further configured to adjust said power level in subsequent said time intervals until reaching said predetermined accumulated energy.

9. The heating apparatus as recited in claim 1, wherein the current and voltage magnitudes are determined during a portion of said cycle, and their average magnitudes are used to calculate said power level during said portion of the cycle; and said power level is adjusted for at least one subsequent portion of the cycle.

10. The heating apparatus as recited in claim 4, wherein an electrical current level must fall between a low-load limit and an overload limit; otherwise if the current level is less than said low-load limit or greater than said overload limit, then in said one-shot operating mode said heating apparatus operation will be immediately halted.

11. The heating apparatus as recited in claim 4, wherein an electrical current level must fall between a low-load limit and an overload limit; otherwise if the current level is less than said low-load limit or greater than said overload limit, then in said continuous operating mode said heating apparatus operation will continue for a predetermined number of subsequent said sampled time intervals at a minimum current level condition, until (a) said current level achieves a value between said low-load and overload limits, then continuing normal operation, or (b) if said current level fails to achieve a value between said low-load and overload limits, then halting said heating apparatus operation.

12. A heating apparatus, comprising:
a work coil and an electronic circuit, said electronic circuit, upon an actuation of a cycle, being configured to determine both a current magnitude and a voltage magnitude input to a power converter stage over a plurality of sampled time intervals, then being configured to average said current and voltage magnitudes to calculate a power level being consumed by the power converter stage; and
said electronic circuit being further configured to adjust said power level according to a profiled energy delivery scheme for delivering predetermined amounts of energy.

13. The heating apparatus as recited in claim 12, wherein said predetermined amounts of energy are delivered to a susceptor.

14. The heating apparatus as recited in claim 12, wherein said power level is adjusted until achieving a predetermined accumulated energy for said profiled energy delivery scheme, then said cycle is terminated.

15. The heating apparatus as recited in claim 12, wherein said power converter stage comprises an inverter circuit.

16. The heating apparatus as recited in claim 12, wherein one of a continuous operating mode or a one-shot operating mode is selectable by a user; and wherein the continuous operating mode repeatedly self-triggers a subsequent energy delivery cycle for so long as said user maintains said actuation while the one-shot operating mode requires a separate user actuation for each subsequent energy delivery cycle.

17. The heating apparatus as recited in claim 16, wherein said power level must fall between a low-load limit and an overload limit; otherwise if the power level is less than said low-load limit or greater than said overload limit, then in said one-shot operating mode said heating apparatus operation will be immediately halted.

18. The heating apparatus as recited in claim 16, wherein said power level must fall between a low-load limit and an overload limit; otherwise if the power level is less than said low-load limit or greater than said overload limit, then in said continuous operating mode said heating apparatus operation will continue for a predetermined number of subsequent said sampled time intervals at a minimum power level condition, until (a) said power level achieves a value between said low-load and overload limits, then continuing normal operation, or (b) if said power level fails to achieve a value between said low-load and overload limits, then halting said heating apparatus operation.

19. The heating apparatus as recited in claim 12, wherein said electronic circuit is further configured to determine whether a predetermined maximum time interval has occurred before said profiled energy delivery scheme has been achieved, and if so declaring a timeout error and halting said heating apparatus operation.

20. The heating apparatus as recited in claim 12, wherein said profiled energy delivery scheme comprises a plurality of successive time intervals during which said electronic circuit is configured to control said power level during each said time interval, and is further configured to adjust said power level in subsequent said time intervals until reaching said predetermined accumulated energy.

21. The heating apparatus as recited in claim 12, wherein the current and voltage magnitudes are determined during a portion of said cycle, and their average magnitudes are used to calculate said power level during said portion of the cycle; and said power level is adjusted for at least one subsequent portion of the cycle.

22. The heating apparatus as recited in claim 16, wherein an electrical current level must fall between a low-load limit and an overload limit; otherwise if the current level is less than said low-load limit or greater than said overload limit, then in said one-shot operating mode said heating apparatus operation will be immediately halted.

23. The heating apparatus as recited in claim 16, wherein an electrical current level must fall between a low-load limit and an overload limit; otherwise if the current level is less than said low-load limit or greater than said overload limit, then in said continuous operating mode said heating apparatus operation will continue for a predetermined number of subsequent said sampled time intervals at a minimum current level condition, until (a) said current level achieves a value between said low-load and overload limits, then continuing normal operation, or (b) if said current level fails to achieve a value between said low-load and overload limits, then halting said heating apparatus operation.

24. A heating apparatus, comprising:
a work coil and an electronic circuit, said electronic circuit, upon actuation of a cycle, being configured to determine both a current magnitude and a voltage magnitude input to a power converter stage over a plurality of sampled time intervals, then being configured to average said current and voltage magnitudes to calculate a power level being consumed by the power converter stage; and
said electronic circuit being further configured to adjust said power level according to a profiled energy delivery scheme until achieving a predetermined accumulated energy for said profiled energy delivery scheme, and terminating said cycle.

25. The heating apparatus as recited in claim 24, wherein said power converter stage comprises an inverter circuit.

26. The heating apparatus as recited in claim 24, wherein one of a continuous operating mode or a one-shot operating mode is selectable by a user; and wherein the continuous operating mode repeatedly self-triggers a subsequent energy delivery cycle for so long as said user maintains the original actuation of the heating apparatus, while the one-shot operating mode requires a separate user actuation for each subsequent energy delivery cycle.

27. The heating apparatus as recited in claim 26, wherein said power level must fall between a low-load limit and an overload limit; otherwise if the power level is less than said low-load limit or greater than said overload limit, then in said one-shot operating mode said heating apparatus operation will be immediately halted.

28. The heating apparatus as recited in claim 26, wherein said power level must fall between a low-load limit and an overload limit; otherwise if the power level is less than said low-load limit or greater than said overload limit, then in said continuous operating mode said heating apparatus operation will continue for a predetermined number of subsequent said sampled time intervals at a minimum power level condition, until (a) said power level achieves a value between said low-load and overload limits, then continuing normal operation, or (b) if said power level fails to achieve a value between said low-load and overload limits, then halting said heating apparatus operation.

29. The heating apparatus as recited in claim 24, wherein said electronic circuit is further configured to determine whether a predetermined maximum time interval has occurred before said profiled energy delivery scheme has been achieved, and if so declaring a timeout error and halting said heating apparatus operation.

30. The heating apparatus as recited in claim 24, wherein said profiled energy delivery scheme comprises a plurality of successive time intervals during which said electronic circuit is configured to control said power level during each said time interval, and is further configured to adjust said power level in subsequent said time intervals until reaching said predetermined accumulated energy.

31. The heating apparatus as recited in claim 24, wherein the current and voltage magnitudes are determined during a portion of said cycle, and their average magnitudes are used to calculate said power level during said portion of the cycle; and said power level is adjusted for at least one subsequent portion of the cycle.

* * * * *

UNITED STATES PATENT AND TRADEMARK OFFICE
CERTIFICATE OF CORRECTION

PATENT NO. : 6,639,198 B2
DATED : October 28, 2003
INVENTOR(S) : Edward A. Riess et al.

It is certified that error appears in the above-identified patent and that said Letters Patent is hereby corrected as shown below:

<u>Column 45,</u>
Line 67, delete "a" and insert -- an --.

<u>Column 48,</u>
Line 32, insert -- an -- after "upon".
Lines 50-51, delete "the origional actuation of the heating apparatus" and insert -- said actuation --.

Signed and Sealed this

Thirtieth Day of March, 2004

JON W. DUDAS
*Acting Director of the United States Patent and Trademark Office*